United States Patent

Osato et al.

Patent Number: 5,596,555
Date of Patent: Jan. 21, 1997

[54] MAGNETOOPTICAL RECORDING MEDIUM HAVING MAGNETIC LAYERS THAT SATISFY PREDETERMINED COERCIVE FORCE RELATIONSHIPS, AND RECORDING/REPRODUCTION METHOD FOR THE MEDIUM

[75] Inventors: Yoichi Osato, Yokohama; Katsumi Miyata, Tokyo, both of Japan

[73] Assignee: Canon Kabushiki Kaisha, Tokyo, Japan

[21] Appl. No.: 281,182

[22] Filed: Jul. 27, 1994

[30] Foreign Application Priority Data

| Jul. 29, 1993 | [JP] | Japan | 5-188386 |
| Aug. 6, 1993 | [JP] | Japan | 5-196277 |
| Mar. 25, 1994 | [JP] | Japan | 6-055348 |
| Jun. 24, 1994 | [JP] | Japan | 6-143199 |

[51] Int. Cl.$^6$ .................................................. G11B 11/00
[52] U.S. Cl. ........................ 369/13; 360/59; 428/694 ML
[58] Field of Search ................................. 369/13, 14, 110, 369/275.2; 360/59, 114; 765/122; 428/694 ML, 694 MT, 694 MM

[56] References Cited

U.S. PATENT DOCUMENTS

| 5,132,945 | 7/1992 | Osato et al. | 369/13 |
| 5,163,031 | 11/1992 | Osato | 369/13 |
| 5,210,724 | 5/1993 | Kobayashi | 369/13 |
| 5,265,073 | 11/1993 | Osato | 369/13 |
| 5,325,345 | 6/1994 | Shimokawato et al. | 369/13 |
| 5,420,833 | 5/1995 | Tanaka et al. | 369/13 |
| 5,440,531 | 8/1995 | Sato et al. | 369/13 |

FOREIGN PATENT DOCUMENTS

| 62-175948 | 8/1987 | Japan |
| 63-76135 | 4/1988 | Japan |
| 63-204532 | 8/1988 | Japan |

*Primary Examiner*—Tan Dinh
*Attorney, Agent, or Firm*—Fitzpatrick, Cella, Harper & Scinto

[57] ABSTRACT

A magnetooptical recording medium has first and second magnetic layers laminated in that order on a transparent substrate on which a received laser beam is incident. The coercive force of the second magnetic layer is greater than that of the first magnetic layer and is greater than $\sigma_w/2M_{s2}h_2$, where $\sigma_w$ is the magnetic wall energy between the first and second magnetic layers, $M_{s2}$ is the saturation magnetization of the second magnetic layer, and $h_2$ is the film thickness of the second magnetic layer. The coercive force of the first magnetic layer is greater that $\sigma_w/2M_{s1}h_1$, where $M_{s1}$ is the saturation magnetization of the first magnetic layer and $h_1$ is the film thickness of the first magnetic layer. The compensation temperature of the first magnetic layer is smaller than the Curie temperature of the first magnetic layer. Recording is performed by selectively applying a laser spot, having either a high power or a low power.

23 Claims, 16 Drawing Sheets

TEMPERATURE RISE

TEMPERATURE RISE

MAGNETOOPTICAL RECORDING MEDIUM HAVING MAGNETIC LAYERS THAT SATISFY PREDETERMINED COERCIVE FORCE RELATIONSHIPS, AND RECORDING/REPRODUCTION METHOD FOR THE MEDIUM

BACKGROUND OF THE INVENTION

1. Field of the Invention

The present invention relates to a magnetooptical recording medium on which information is recorded, and from which information is reproduced, and erased using a laser beam, and a magnetooptical recording/reproduction method.

2. Related Background Art

A conventional magnetooptical recording method is time-consuming since it requires three processes, i.e., erasing, recording, and collation processes to be performed upon the recording of information. In order to solve this problem, the following overwrite methods have been proposed.

① Magnetic Field Modulation Method

In this method, the intensity of an irradiation laser beam is maintained constant, and the polarity of a magnetic field to be applied is inverted at a high speed in correspondence with recording information, thereby achieving recording (Japanese Laid-Open Patent Application Nos. 63-204532 and 63-76135, and the like). In this method, the polarity of the magnetic field to be applied must be inverted at a high speed. For this reason, high electric power must be input in order to generate a recording magnetic field from a position separated from the medium surface by a given distance so as to prevent collision between a recording head for generating the magnetic field and the medium surface, and it is technically difficult to realize this method. Also, a method of bringing a magnetic head very close to the medium surface is proposed. However, with this method, the original advantage of an optical disk, i.e., non-contact recording/reproduction, is not utilized.

② Exchange-coupled Two-layered Film Method

In this method, a magnetooptical recording medium which comprises, as a recording layer, a two-layered film consisting of a rare earth-transition metal amorphous alloy, is used, and an overwrite operation is performed by utilizing the exchange-coupling force between the two layers (Japanese Laid-Open Patent Application No. 62-175948, and the like). More specifically, a magnetooptical medium, which comprises a recording layer consisting of, e.g., TbFe, and an auxiliary layer consisting of TbFeCo, is used. After initialization for aligning the direction of magnetization of the auxiliary layer is performed, a recording bias magnetic field is applied, and a laser beam of binary power irradiates the medium, thus realizing an overwrite operation. With this method, there is a case of providing a magnetic wall between the two layers when information is recorded, and a problem associated with stability of recorded information, a problem associated with a large magnetic field required in initialization, and the like still remain unsolved.

SUMMARY OF THE INVENTION

The present invention has been made to solve the problems arising from using conventional techniques and has as its object to provide a magnetooptical recording medium and a recording/reproduction method, which can improve the stability of recorded information and at the same time, can improve the reproduction characteristics and recording density in a method of performing an overwrite operation by utilizing an exchange-coupled two-layered film.

In order to achieve the above object, there is provided a method of recording information on a magnetooptical recording medium, which is constituted by laminating at least a first magnetic layer and a second magnetic layer in this order on a substrate which has transparency and on which a laser beam is incident, and which satisfies the following relations (1) to (4):

$$H_{c2} > H_{c1} \tag{1}$$

$$H_{c2} > \sigma_w/2M_{s2}h_2 \tag{2}$$

$$H_{c1} > \sigma_w/2M_{s1}h_1 \tag{3}$$

$$T_{comp1} < T_{c1} \tag{4}$$

(where $H_{c1}$ and $H_{c2}$ are the coercive forces of the first and second magnetic layers; $T_{c1}$ and $T_{c2}$, the Curie temperatures of the first and second magnetic layers; $M_{s1}$ and $M_{s2}$, saturation magnetizations of the first and second magnetic layers; $h_1$ and $h_2$, the film thicknesses of the first and second magnetic layers; $T_{comp1}$, the compensation temperature of the first magnetic layer; and $\sigma_w$, the interface magnetic wall energy between the first and second magnetic layers), the method comprising:

the step of aligning a direction of a magnetic moment of the first magnetic layer in one direction by an external magnetic field;

the step of irradiating the medium with a laser spot of low power while applying a recording bias magnetic field in the same direction as the direction of the external magnetic field so as to form a first recording bit only in a high-temperature region in the laser spot;

the step of irradiating the medium with a laser spot of high power while applying the recording bias magnetic field so as to form a second recording bit, in which a magnetic wall is present between the first and second magnetic layers, only in the high-temperature region in the laser spot; and the step of selecting one of the first recording bit forming step and the second recording bit forming step in correspondence with information.

In order to achieve the above object, there is also provided a method of reproducing information from a magnetooptical recording medium, which is constituted by laminating at least a first magnetic layer and a second magnetic layer in this order on a substrate having transparency, and which satisfies the following relations (1) to (4):

$$H_{c2} > H_{c1}, \tag{1}$$

$$H_{c2} > \sigma_w/2M_{s2}h_2, \tag{2}$$

$$H_{c1} > \sigma_w/2M_{s1}h_1, \text{ and} \tag{3}$$

$$T_{comp1} < T_{c1}, \tag{4}$$

(where $H_{c1}$ and $H_{c2}$ are the coercive forces of the first and second magnetic layers; $T_{c1}$ and $T_{c2}$, the Curie temperatures of the first and second magnetic layers; $M_{s1}$ and $M_{s2}$, saturation magnetizations of the first and second magnetic layers; $h_1$ and $h_2$, the film thicknesses of the first and second magnetic layers; $T_{comp1}$, the compensation temperature of the first magnetic layer; and $\sigma_w$, the interface magnetic wall energy between the first and second magnetic layers), the method comprising:

the step of irradiating the medium with a laser spot from the transparent substrate side;

the step of applying a magnetic field in a direction opposite to a direction of a magnetic moment of the first magnetic layer so as to change the direction of the magnetic moment of the first magnetic layer only in a high-temperature region in the laser spot to a state wherein no magnetic wall is present between the first and second magnetic layers; and the step of reproducing recorded information by detecting reflected light of the laser spot.

In order to achieve the above object, there is also provided a magnetooptical recording medium in which at least a first magnetic layer and a second magnetic layer each consisting of a rare earth-transition metal alloy are laminated in this order on a substrate having transparency, and which satisfies the following conditions (1) and (2) and relations (3) to (8):

(1) a sublattice magnetization of the first magnetic layer is rare earth element-dominant, (2) a composition of the first magnetic layer has a gradient in a direction of film thickness, such that a transition metal composition increases at a side near the substrate, $$H_{c2} > Hi > H_{c1}, \quad (3)$$

$$H_{c2} > \sigma_w/2M_{s2}h_2, \quad (4)$$

$$H_{c1} > \sigma_w/2M_{s1}h_1, \quad (5)$$

$$\text{Room Temperature} < T_{comp1} < T_{c1}, \quad (6)$$

$$T_{c2} < T_{c1}, \text{ and} \quad (7)$$

$$H_{c1}(RT) - \sigma_w(RT)/2M_{s1}(RT)h_1 \text{ (at room temperature)} > H_{c1}(R) - \sigma_w(R)/2M_{s1}(R)h_1 \text{ (upon reproduction)} \quad (8)$$

(where $H_{c1}$ and $H_{c2}$ are respectively the coercive forces of the first and second magnetic layers; $T_{c1}$ and $T_{c2}$, are the Curie temperatures of the first and second magnetic layers; $h_1$ and $h_2$, are the film thicknesses of the first and second magnetic layers; $T_{comp1}$, is the compensation temperature of the first magnetic layer; and $\sigma_w$, is the interface magnetic wall energy between the first and second magnetic layers. $H_{c1}(RT)$ and $M_{s1}(RT)$ respectively represent the coercive force and saturation magnetization of the first magnetic layer at room temperature. $H_{c1}(R)$ and $M_{s1}(R)$ respectively represent the coercive force and saturation magnetization of the first magnetic layer at a temperature upon reproduction. $\sigma_w(RT)$ and $\sigma_w(R)$ represent the interface magnetic wall energy at room temperature and at a temperature upon reproduction, respectively.)

In order to achieve the above object, there is also provided a magnetooptical recording medium in which at least a third magnetic layer, a first magnetic layer, and a second magnetic layer are laminated in this order on a substrate having transparency, and which satisfies the following relations (1) to (8):

$$H_{c2} > Hi > H_{c1}, \quad (1)$$

$$H_{c3} > H_{c1}, \quad (2)$$

$$H_{c1} > \sigma_w 12/2M_{s1}h_1, \sigma_w 13/2M_{s1}h_1, \quad (3)$$

$$H_{c2} > \sigma_w 12/2M_{s2}h_2, \quad (4)$$

$$H_{c3} < \sigma_2 13/2M_{s3}h_3, \quad (5)$$

$$\text{Room Temperature} < T_{comp1} < T_{c1}, \quad (6)$$

$$H_{c1}(RT) - \sigma_w 12(RT)/2M_{s1}(RT)h_1 \text{ (at room temperature)} > H_{c1}(R) - \sigma_w 12(R)/2M_{s1}(R)h_1, \quad (7)$$

$$T_{c1} > T_{c2}, T_{c3} \text{ are} \quad (8)$$

(where $H_{c1}$, $H_{c2}$, and $H_{c3}$ are respectively the coercive forces of the first, second, and third magnetic layers; $T_{c1}$, $T_{c2}$, and $T_{c3}$, the Curie temperatures of the first, second, and third magnetic layers; $h_1$, $h_2$, and $h_3$, are the film thicknesses of the first, second, and third magnetic layers; $T_{comp1}$, is the compensation temperature of the first magnetic layer; and $\sigma_w 12$ and $\sigma_w 13$, are the interface magnetic wall energies between the first and second magnetic layers and between the first and third magnetic layers. $H_{c1}(RT)$ and $M_{s1}(RT)$ respectively represent the coercive force and saturation magnetization of the first magnetic layer at room temperature. $H_{c1}(R)$ and $M_{s1}(R)$ respectively represent the coercive force and saturation magnetization of the first magnetic layer at a temperature upon reproduction. $\sigma_w 12(RT)$ and $\sigma_w 12(R)$ represent the interface magnetic wall energies between the first and second magnetic layers at the room temperature and at a temperature upon reproduction, respectively.)

In order to achieve the above object, there is also provided a magnetooptical recording medium in which at least a third magnetic layer, a first magnetic layer, and a second magnetic layer are laminated in this order named on a substrate having transparency, and which satisfies the following relations (1) to (9):

$$H_{c2} > Hi > H_{c1}, \quad (1)$$

$$H_{c3} > H_{c1}, \quad (2)$$

$$H_{c1} > \sigma_w 12/2M_{s1}h_1, \sigma_w 13/2M_{s1}h_1, \quad (3)$$

$$H_{c2} > \sigma_w 12/2M_{s2}h_2, \quad (4)$$

$$H_{c3} < \sigma_w 13/2M_{s3}h_3, \quad (5)$$

$$\text{Room Temperature} < T_{comp1} < T_{c1}, \quad (6)$$

$$T_{comp3} < T_{comp1}, \text{ is} \quad (7)$$

$$H_{c1}(RT) - \sigma_w 12(RT)/2M_{s1}(RT)h_1 \text{ (at room temperature)} > H_{c1}(R) - \sigma_w 12(R)/2M_{s1}(R)h_1 \text{ (upon reading), and} \quad (8)$$

$$T_{c1} > T_{c2}, T_{c3} \quad (9)$$

(where $H_{c1}$, $H_{c2}$, and $H_{c3}$ are respectively the coercive forces of the first, second, and third magnetic layers; $T_{c1}$, $T_{c2}$, and $T_{c3}$, are the Curie temperatures of the first, second, and third magnetic layers; $h_1$, $h_2$, and $h_3$, are the film thicknesses of the first, second, and third magnetic layers; $T_{comp1}$ and $T_{comp3}$, are the compensation temperatures of the first and third magnetic layers; and $\sigma_w 12$ and $\sigma_w 13$, are the interface magnetic wall energies between the first and second magnetic layers and between the first and third magnetic layers. $H_{c1}(RT)$ and $M_{s1}(RT)$ respectively represent the coercive force and saturation magnetization of the first magnetic layer at room temperature. $H_{c1}(R)$ and $M_{s1}(R)$ respectively represent the coercive force and saturation magnetization of the first magnetic layer at a temperature upon reading. $\sigma_w 12(RT)$ and $\sigma_w 12(R)$ represent the interface magnetic wall energies between the first and second magnetic layers at the room temperature and at a temperature upon reading, respectively.)

In order to achieve the above object, there is also provided a magnetooptical recording medium which is constituted by laminating at least two magnetic layers on a transparent substrate, wherein a first magnetic layer, which exhibits in-plane magnetic anisotropy at room temperature and exhibits perpendicular magnetic anisotropy when a temperature rises, and a second magnetic layer exhibiting perpendicular magnetic anisotropy are laminated in this order on the substrate, and the first and second magnetic layers satisfy the following relations (I) to (IV):

$$H_{c2} > H_{c1}, \quad (I)$$

$$H_{c2} > \sigma_w/(2M_{s2} \cdot h_2), \quad (II)$$

$$H_{c1} > \sigma_w/(2M_{s1} \cdot h_1), \text{ and} \quad (III)$$

$$RT < T_{comp1} < T_{c1}, \quad (IV)$$

(where $H_{c1}$ is the coercive force of the first magnetic layer; $T_{c1}$, is the Curie temperature of the first magnetic layer; $T_{comp1}$, is the compensation temperature of the first magnetic layer; $M_{s1}$, is the saturation magnetization of the first magnetic layer; $h_1$, is the film thickness of the first magnetic layer; $H_{c2}$, is the coercive force of the second magnetic layer; $T_{c2}$, is the Curie temperature of the second magnetic layer; $M_{s2}$, is the saturation magnetization of the second magnetic layer; $h_2$, is the film thickness of the second magnetic layer; $\sigma_w$, is the interface magnetic wall energy between the first and second magnetic layers; and RT, is room temperature.)

In order to achieve the above object, there is also provided a method of reproducing, from a magnetooptical recording medium which is constituted by laminating at least a first magnetic layer and a second magnetic layer in turn on a substrate, and which satisfies the following conditions:

$$H_{c2} > H_{c1}, \quad (1)$$

$$H_{c2} > \sigma_w/(2M_{s2}h_2), \quad (2)$$

$$H_{c1} > \sigma_w/(2M_{s1}h_1), \text{ and} \quad (3)$$

$$T_r < T_{comp1} < T_{c1} \quad (4)$$

(where $H_{c1}$ and $H_{c2}$ are the coercive forces of the first and second magnetic layers; $\sigma_w$, is the interface magnetic wall energy between the first and second magnetic layers; $M_{s1}$ and $M_{s2}$, are the saturation magnetizations of the first and second magnetic layers; $h_1$ and $h_2$, are the film thicknesses of the first and second magnetic layers; $T_r$, room temperature; $T_{comp1}$, is the compensation temperature of the first magnetic layer; and $T_{c1}$, is the Curie temperature of the first magnetic layer).

Binary information is recorded by selectively executing:

(1) the step of aligning a direction of a magnetic moment of the first magnetic layer in one direction by an external magnetic field, and thereafter, irradiating the medium with a laser spot of low power while applying a recording bias magnetic field in the same direction as the direction of the external magnetic field so as to form a state, wherein no interface magnetic wall is present between the first and second magnetic layers, only in a portion of the laser spot; and (2) the step of aligning a direction of a magnetic moment of the first magnetic layer in one direction by an external magnetic field, and thereafter, irradiating the medium with a laser spot of high power while applying a recording bias magnetic field in the same direction as the direction of the external magnetic field so as to form a state, wherein an interface magnetic wall is present between the first and second magnetic layers, only in a portion of the laser spot, by applying a reproduction magnetic field while irradiating the medium with a laser spot of power lower than the low power to transfer recorded information in the second magnetic layer to portion of the first magnetic layer corresponding to portion in the laser spot, thereby reproducing the recorded information.

The method comprising:

the determination step of, prior to reproduction of the recorded information, recording a pit string including at least a shortest mark pit corresponding to recording information at a predetermined position of the magnetooptical recording medium, reproducing the pit string while changing the reproduction magnetic field and reproduction laser power, and determining an optimal combination of the reproduction magnetic field and reproduction laser power by detecting the reproduced signal.

The above and other objects will become apparent from the following detailed description of the embodiments.

DETAILED DESCRIPTION OF THE PREFERRED EMBODIMENTS

[First Embodiment]

The present invention will be described in detail below with reference to its embodiment.

Figure 1:
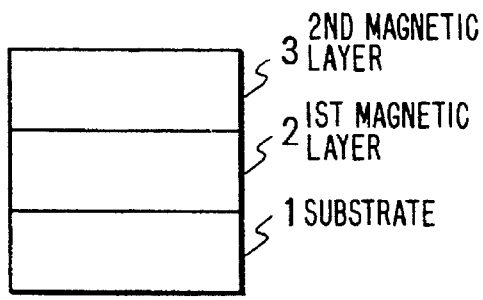
FIG. 1 is a schematic sectional view showing an example of the layer structure of a magnetooptical recording medium used in the first embodiment of the present invention.

FIG. 1 is a schematic sectional view showing an example of the layer structure of a magnetooptical recording medium according to the present invention. The magnetooptical recording medium shown in FIG. 1 is constituted by directly laminating first and second magnetic layers 2 and 3 in turn on a substrate 1. In this recording medium, a recording/reproduction laser beam is incident from the substrate 1 side.

Each of the first and second magnetic layers 2 and 3 comprises a perpendicular magnetization film consisting of an amorphous alloy of a rare earth element (Tb, Dy, Gd, Nd, Ho, or the like) and an iron-group transition metal (Fe, Co, Ni, or the like), and an exchange-coupling force acts between these two layers. As the substrate 1, known materials such as glass, a glass member with a guide track consisting of an ultraviolet setting resin, polycarbonate, polymethyl methacrylate, an epoxy-based resin, and the like can be used without any limitations.

The magnetooptical recording medium of the present invention satisfies the following conditions:

$$H_{c2} > H_{c1} \tag{1}$$

$$H_{c2} > \sigma_w/2M_{s2}h_2 \tag{2}$$

$$H_{c1} > \sigma_w/2M_{s1}h_1 \tag{3}$$

$$T_{comp1} < T_{c1} \tag{4}$$

(where $H_{c1}$ and $H_{c2}$ are respectively the coercive forces of the first and second magnetic layers; $T_{c1}$ and $T_{c2}$, are the Curie temperatures of the first and second magnetic layers; $M_{s1}$ and $M_{s2}$, are the saturation magnetizations of the first and second magnetic layers; $h_1$ and $h_2$, are the film thicknesses of the first and second magnetic layers; $T_{comp1}$, is the compensation temperature of the first magnetic layer; and $\sigma_w$, is the interface magnetic wall energy between the first and second magnetic layers.).

Furthermore, the preferred example of the present invention is a medium which satisfies the following conditions.

$$H_{c2} - \sigma_w/2M_{s2}h > Hi > H_{c1} + \sigma_w/2H_{c1}h \quad (1')$$

$$H_{c2} > \sigma_w/2M_{s2}h_2 \quad (2)$$

$$H_{c1} > \sigma_w/2M_{s1}h_1 \quad (3)$$

$$\text{Room Temperature } (RT) < T_{comp1} < T_{c1} \quad (4')$$

Relation (1') above is a condition for magnetizing only the first magnetic layer in one direction by an external (initialization) magnetic field Hi. Relations (2) and (3) above are conditions for allowing an interface magnetic wall to be stably present between the two layers. Relation (4') above is a condition for the second magnetic layer to have a compensation temperature, and allowing Curie-temperature recording while the external magnetic field and a recording magnetic field have the same direction (after the temperature rises beyond the compensation temperature and the direction of the spontaneous magnetization is reversed, the direction of magnetization is reversed (i.e., information is recorded) by the recording magnetic field at a temperature near the Curie temperature).

Figure 2:
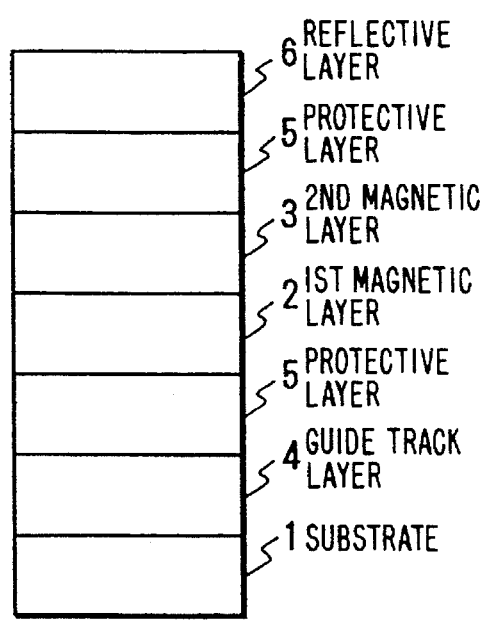
FIG. 2 is a schematic sectional view showing another example of the layer structure of the magnetooptical recording medium used in the first embodiment of the present invention.

FIG. 2 is a schematic sectional view showing another example of the layer structure of the magnetooptical recording medium of the present invention. The magnetooptical recording medium shown in FIG. 2 is constituted by laminating a guide track layer 4, a protective layer 5, first and second magnetic layers 2 and 3, another protective layer 5, and a reflective layer 6, in turn, on a substrate 1. Furthermore, an intermediate layer having a function of adjusting the exchange-coupling force may be arranged, and third and fourth magnetic layers for adding another function may be arranged. Moreover, two media each having the above-mentioned structure may be adhered to each other to constitute a double-sided recordable medium.

Figure 3:
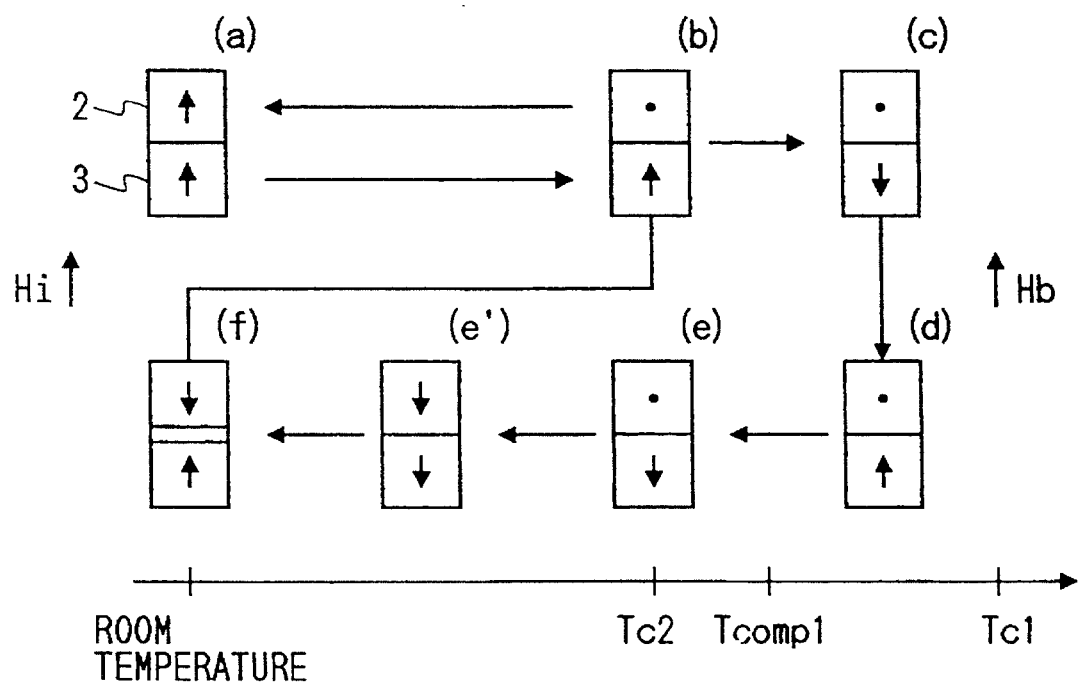
FIG. 3 is a state transition chart showing an example of a magnetooptical recording method according to the first embodiment of the present invention.

FIG. 3 is a state transition chart showing an example of a magnetooptical recording method of the present invention. Note that the sublattice magnetization of the rare earth element is dominant in both the first and second magnetic layers 2 and 3. When the magnetic moments of the two layers are parallel to each other, no interface magnetic wall is formed between the two layers.

Prior to magnetooptical recording, an external magnetic field Hi of 200 to 5,000 Oe is applied to align the magnetic moment of the first magnetic layer 2 in one direction (upward in this case), thus performing so-called initialization [(a), (f) of FIG. 3]. When the strength of the magnetic field Hi required for initialization is smaller than, e.g., 500 Oe, a recording magnetic field Hb may be commonly used in place of the external magnetic field Hi.

Then, a laser beam whose laser power is changed between binary levels in correspondence with a recording signal irradiates the medium while applying the recording magnetic field Hb of about 50 to 500 Oe in the same direction (upward) as the external magnetic field, thus achieving recording as follows.

When a laser beam of a low level Pb irradiates the medium (to be referred to as an L process hereinafter), the temperature of only a magnetic layer portion corresponding to the high-temperature portion of a laser spot rises to a temperature equal to or higher than the Curie temperature $T_{c2}$ of the second magnetic layer, and the magnetic moment of the second magnetic layer 3 disappears [(b) of FIG. 3]. When the laser spot moves and the temperature of the magnetic layer falls to room temperature, the state shown in (a) of FIG. 3 is restored.

Note that the high-temperature portion of the laser spot is a portion of the laser spot including the highest-temperature portion of the laser spot.

On the other hand, when a laser beam of a high level Pa is irradiated (to be referred to as an H process hereinafter), the temperature of only a magnetic layer portion corresponding to the high-temperature portion of the laser spot rises to a temperature equal to or higher than the compensation temperature $T_{comp1}$ of the first magnetic layer, and the sublattice magnetization of the transition metal becomes dominant in the first magnetic layer 2. As a result, the direction of the magnetic moment of the first magnetic layer 2 is reversed [(c) of FIG. 3]. At this time, the direction of magnetization of the first magnetic layer 2 is reversed by the recording bias magnetic field Hb [(d) of FIG. 3]. When the laser spot moves and the temperature of the corresponding portion falls to a temperature equal to or lower than the compensation temperature $T_{comp1}$ of the first magnetic layer, the sublattice magnetization of the rare earth element becomes dominant again in the first magnetic layer 2, and the direction of the magnetic moment of the first magnetic layer 2 is reversed [(e) of FIG. 3]. When the temperature of the magnetic layer portion further falls to a temperature equal to or lower than the Curie temperature $T_{c2}$ of the second magnetic layer, magnetization appears in the second magnetic layer in the same direction as that of the sublattice magnetization of the first magnetic layer (so as not to form an interface magnetic wall) [(e') of FIG. 3]. When the magnetooptical recording medium is rotated and the magnetic layer portion passes the external magnetic field Hi, the direction of magnetization of the first magnetic layer is aligned in the upward direction, as shown in a state (f) of FIG. 3.

Figure 4:
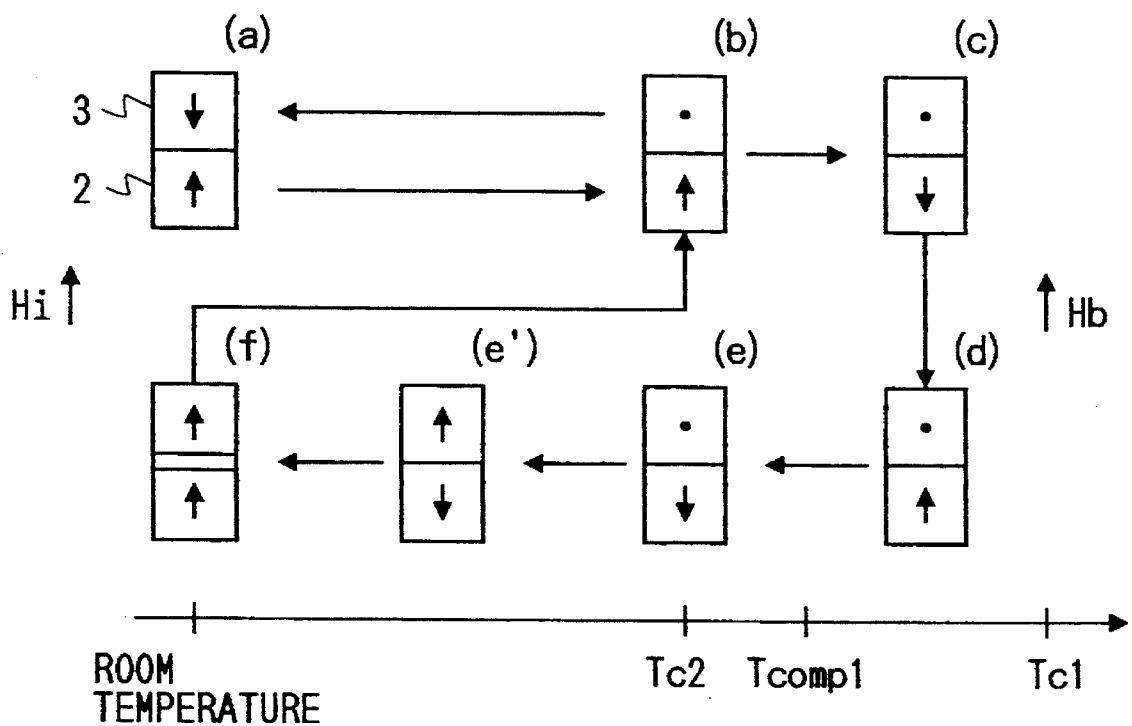
FIG. 4 is a state transition chart showing another example of the magnetooptical recording method according to the first embodiment of the present invention.

FIG. 4 is a state transition chart showing another example of the magnetooptical recording method of the present invention. In this method, substantially the same recording operation as that shown in FIG. 3 is performed, except that a magnetooptical recording medium in which the sublattice magnetization of the rare earth element is dominant in the first magnetic layer 2 and the sublattice magnetization of the transition metal is dominant in the second magnetic layer 3 is used. In this case, when the magnetic moments of the two layers are anti-parallel to each other, no interface magnetic wall is formed between the two layers.

As shown in FIG. 4, in the recording method in this case, states [(e) to (f) of FIG. 4] in a process wherein the temperature of the magnetic layer returns from the Curie temperature $T_{c2}$ of the second magnetic layer to room temperature in the H process are different from those shown in FIG. 3. This is because the sublattice magnetization of the rare earth element is dominant in the first magnetic layer 2 and the sublattice magnetization of the transition metal is dominant in the second magnetic layer 3, as described above. Therefore, in a portion recorded in the H process, the magnetic moments of the two magnetic layers are parallel to each other (in the upward direction in this case), and an interface magnetic wall is formed between the two layers, as shown in (f) of FIG. 4.

With the above-mentioned recording method, according to the present invention, a recording bit having a size equal to or smaller than the diffraction limit of the laser beam can be formed by an overwrite method.

Figure 5A:
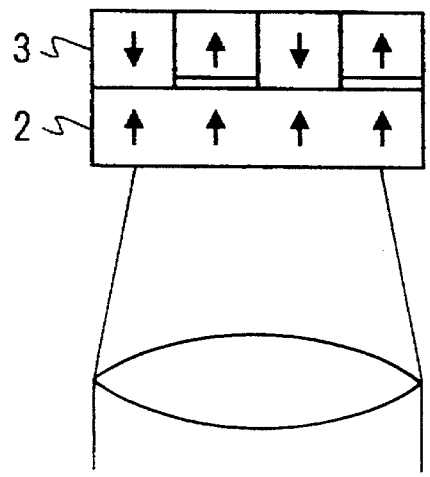
FIGS. 5A and 5B are views for explaining a reproduction method of magnetooptically recorded information according to the first embodiment of the present invention.
Figure 5B:
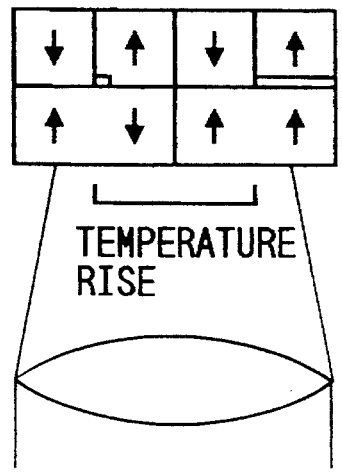

FIGS. 5A and 5B show an example of a reproduction method of magnetooptically recorded information according to the present invention. Upon completion of the above-mentioned recording operation shown in (a) to (f) of FIG. 4, the magnetic moments in all the recorded portions of the first magnetic layer are aligned upward, as shown in FIG. 5A, and it is difficult to reproduce recorded information from the second magnetic layer 3 even when a reproduction beam irradiates the medium. For this reason, upon irradiation by the reproduction beam, the direction of the recording magnetic field Hb shown in FIG. 4 is reversed to the downward direction, and the strength of the magnetic field is set to satisfy a condition $H_{c1} - \sigma_w/2M_{s1}h_1 > Hb > H_{c1}(t) - \sigma_w(t)/2M_{s1}(t)h_1$. Note that $H_{c1}(t)$, $\sigma_w(t)$, and $M_{s1}(t)$ respectively represent the coercive force, interface magnetic wall energy, and saturation magnetization of the first magnetic layer at a temperature t.

Of the conditions of the magnetic field Hb given by the above relation, a condition $H_{c1} - \sigma_w/2M_{s1}h_1 > Hb$ defines a condition for preventing the magnetic moment of the first magnetic layer from being reversed by only the magnetic field applied upon reproduction.

Of the conditions of the magnetic field Hb given by the above relation, a condition $Hb > H_{c1}(t) - \sigma_w(t)/2M_{s1}(t)h_1$ defines the following condition. With the reproduction beam to be described in detail later, the central portion of the beam spot has the highest temperature, and the temperature rise of a portion around the spot is small. When the power of the reproduction beam is gradually increased to increase the temperature t in the above relation, if t is equal to room temperature, $H_{c1}(t) - \sigma_w(t)/2M_{s1}(t)h_1$ equals $H_{c1} - \sigma_w/2M_{s1}h_1$, and means a margin for the stable presence of a magnetic wall. The margin is a positive value (e.g., 200 to 500 Oe). For this reason, when the value Hb is set to be slightly smaller than the value $H_{c1} - \sigma_w/2M_{s1}h_1$, if the temperature rises and the value $H_{c1}(t) - \sigma_w(t)/2M_{s1}(t)h_1$ decreases even slightly, $Hb > H_{c1}(t) - \sigma_w(t)/2M_{s1}(t)h_1$ is satisfied. As a result, the magnetic moment of the first magnetic layer is reversed by the applied magnetic field Hb, and recorded information in the second magnetic layer is transferred to the first magnetic layer.

Figure 6:
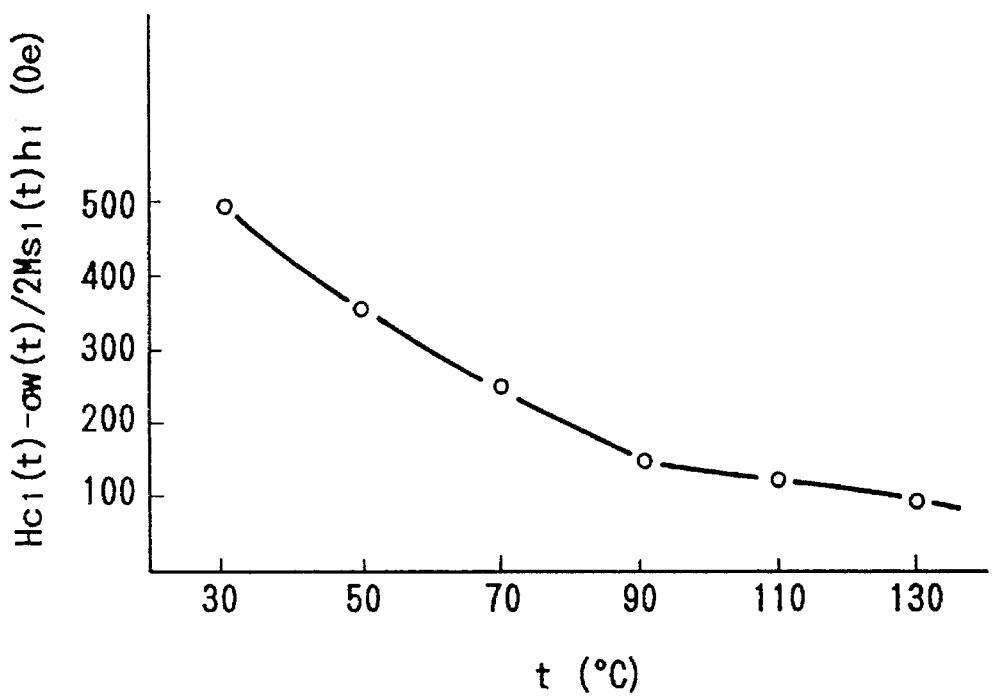
FIG. 6 is a graph showing the temperature dependence of the first magnetic layer stability margin in the reproduction method according to the first embodiment of the present invention.

FIG. 6 is a graph showing the measurement results of the value $H_{c1}(t) - \sigma_w(t)/2M_{s1}(t)h_1$ obtained by changing the temperature t.

A measurement sample had the following arrangement. A 1,800-Å thick $Gd_{25}Fe_{75}$ film (at %: sublattice magnetization=Gd dominant, the coercive force $H_{c1}=1,000$ Oe, the compensation temperature=150° C., and the Curie temperature=245° C.) was formed on a slide glass substrate. Furthermore, a 400-Å thick $Tb_{22}Fe_{70}Co_8$ film (at %: sublattice magnetization=FeCo dominant, the coercive force $H_{c2}=15,000$ Oe, and the Curie temperature=175° C.) was formed on the GdFe film. Thereafter, an 800-Å thick $Si_3N_4$ film was formed as a protective film.

The measurement method was as follows. The sample was set in a VSM (vibrating sample type magnetometer) with a variable measurement temperature, and a magnetic field of 15 kOe or higher was applied to magnetize the TbFeCo film (corresponding to the second magnetic layer) upward. Then, a magnetic field having a strength of about 3 kOe which did not reverse the direction of magnetization of the TbFeCo film was applied while changing its polarity so as to magnetize the GdFe film (corresponding to the first magnetic layer) upward (to form an interface magnetic wall). Thereafter, the strength of the magnetic field which could reverse the direction of magnetization of the GdFe film was checked while applying a downward magnetic field. More specifically, the value to be measured corresponds to $H_{c1}(t) - \sigma_w(t)/2M_{s1}(t)h_1$. FIG. 6 is the graph showing the measurement results which were obtained while changing the temperature.

As can be seen from the results shown in FIG. 6, a margin $(H_{c1}(t) - \sigma_w(t)/2M_{s1}(t)h_1)$ which is about 500 Oe at room temperature decreases to about 150 Oe at 90° C. to 110° C. For this reason, when the temperature of the magnetic layer portion at the central portion of the beam spot of the reproduction laser beam rises to 90° C. to 110° C., and the temperature of a portion around the spot is, e.g., 70° C. or less, if the strength of the downward magnetic field to be applied is set to be, e.g., 200 Oe, the magnetization of the second magnetic layer (TbFeCo film) at only the central portion of the reproduction beam can be transferred and read out. In other words, FIG. 6 shows the temperature dependence of the first magnetic layer stability margin in the reproduction method of the present invention.

Therefore, when information is reproduced using a beam of small power while applying a magnetic field in the recorded state shown in FIG. 5A (reproduction power is set to be a proper value and the magnetic field to be applied is set to have a proper strength), recorded information in the second magnetic layer 3 at only the spot central portion is transferred to the first magnetic layer 2, as shown in FIG. 5B. Then, when a change in magnetooptical effect of reflected light of the spot at that time is detected, a recording bit having a size smaller than the diffraction limit of the beam can be reproduced. When the state shown in FIG. 5B is realized, crosstalk of reproduction signals from neighboring tracks and crosstalk from recording bits before and after a recording bit of interest upon reproduction can be eliminated, and a satisfactory reproduction signal can be obtained when high-density recording is performed.

[Experimental Example 1]

An example of the present invention will be described in detail below.

An 80-nm thick dielectric protective film consisting of $Si_3N_4$ was formed on a polycarbonate substrate having a thickness of 1.2 mm and a diameter of 130 mm by a sputtering method. A 180-nm thick first magnetic layer consisting of $Gd_{25}Fe_{75}$ (at %) was formed on the protective film, and a 40-nm thick second magnetic layer consisting of $Tb_{22}Fe_{70}Co_8$ (at %) was formed on the first magnetic layer. Furthermore, an 80-nm thick dielectric protective film consisting of $Si_3N_4$ was formed on the second magnetic layer, thus ending sputtering. Finally, an acrylate-based resin was coated using a spinner to form a protective coat layer, thus obtaining a magnetooptical recording medium.

The characteristics and the like of this recording medium are as follows:

Coercive force ($H_{c1}$) of first magnetic layer: 1,000 Oe
Curie temperature ($T_{c1}$) of first magnetic layer: 245° C.
Saturation magnetization ($M_{s1}$) of first magnetic layer: 200 emu/cc
Film thickness ($h_1$) of first magnetic layer: 180 nm
Compensation temperature ($T_{comp1}$) of first magnetic layer: 150° C.
Coercive force ($H_{c2}$) of second magnetic layer: 15,000 Oe
Curie temperature ($T_{c2}$) of second magnetic layer: 175° C.
Saturation magnetization ($M_{s2}$) of second magnetic layer: 35 emu/cc
Film thickness ($h_2$) of second magnetic layer: 40 nm
Interface magnetic wall energy ($\sigma_w$): 2.0 erg/cm²

This magnetooptical recording medium was rotated at 1,800 rpm, and recording was performed using binary recording power (Pb: 5 mW, Pa: 12 mW) at a frequency of 3.7 MHz at a radial position of 35 mm while applying a magnetic field of 300 Oe upward. Note that the strength of the external magnetic field for magnetizing (initializing) the first magnetic layer upward was 2 kOe.

Thereafter, although it was attempted to reproduce the initial signal using a continuous beam of 1 mW, reproduced information could not be confirmed. Then, a downward magnetic field of 600 Oe was applied while reproducing a recorded signal using a continuous beam of 1 mW. Recorded information in the second magnetic layer was transferred to the first magnetic layer, and a satisfactory reproduction signal having a C/N ratio of 45 dB could be obtained.

The strength of the downward magnetic field was changed while reproducing a recorded signal using a continuous beam of 1 mW. Recorded information in the second magnetic layer began to be transferred from about 100 Oe, and a reproduction signal having a C/N ratio 47 dB was confirmed when the magnetic field of 150 to 350 Oe was applied. When the magnetic field of 500 Oe or higher was applied, the C/N ratio was lowered to 45 dB.

Similarly, the power of the reproduction beam was increased from 1 mW while applying a downward magnetic field of 200 Oe. Until when the reproduction power was increased to 2.5 mW, the C/N ratio was 47 dB. However, when the reproduction power was increased to 3 mW, the C/N ratio was lowered to 44 dB.

As can be understood from the above embodiment, after information is overwritten on the magnetooptical recording medium of the present invention using binary power, when a magnetic field is applied in a direction opposite to that of the external magnetic field, recorded information in the second magnetic layer can be transferred to the first magnetic layer, and can be satisfactorily read out. Also, as can be understood from the above embodiment, when the magnetization upon reproduction and the reproduction power are properly selected, information recorded at high density can be reproduced with a high C/N ratio using only the central portion (high-temperature portion) of the beam.

[Second Embodiment]

In this embodiment, a magnetooptical recording/reproduction method using a three-layered magnetooptical recording medium will be described.

Figure 7:
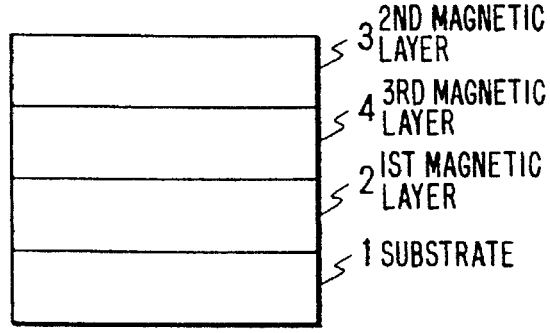
FIG. 7 is a schematic sectional view showing an example of the basic structure of a magnetooptical recording medium used in the second embodiment of the present invention.

FIG. 7 illustrates the layer structure of the magnetooptical recording medium of this embodiment. As shown in FIG. 7, this recording medium is constituted by laminating, in turn, a first magnetic layer 2, a third magnetic layer 4, and a second magnetic layer 3 on a substrate 1. A recording/reproduction laser beam is incident from the substrate 1 side.

Each of the first, second, and third magnetic layers 2, 3, and 4 comprises a perpendicular magnetization film consisting of an amorphous alloy of a rare earth element (Tb, Dy, Gd, Nd, Ho, or the like) and an iron-group transition element (Fe, Co, Ni, or the like), and an exchange-coupling force acts between the first and second magnetic layers 2 and 3 via the third magnetic layer 4.

The first to third magnetic layers of this recording medium satisfy conditions given by relations (1) and (4) of the first embodiment and the following relations (5) to (8).

$$H_{c2} > \sigma_w^* / (2M_{s2} \cdot h_2) \quad (5)$$

$$H_{c1} > \sigma_w^* / (2M_{s1} \cdot h_1) \quad (6)$$

$$\sigma_w > \sigma_w^* \quad (7)$$

$$H_{c2} - \sigma_w / (2M_{s2} \cdot h_2) > Hi > H_{c1} + \sigma_w / (2M_{s1} \cdot h_1) \quad (8)$$

where $\sigma_w^*$ is the apparent interface magnetic wall energy between the first and second magnetic layers when the third magnetic layer is inserted, and Hi is the strength of the external magnetic field. Other parameters are the same as those in relations (1) to (4) of the first embodiment.

Of these relations, relation (8) represents a condition for allowing the external magnetic field Hi to magnetize only the first magnetic layer in one direction. Relations (5) and (6) represent conditions for the stable presence of an interface magnetic wall between the two layers. Relation (7) indicates that the interface magnetic wall energy between the first and second magnetic layers decreases from $\sigma_w$ to $\sigma_w^*$ upon insertion of the third magnetic layer.

As the substrate 1, glass, a glass member with a guide track consisting of an ultraviolet setting resin, polycarbonate, polymethyl methacrylate, an epoxy-based resin, and the like can be used.

Figure 8:
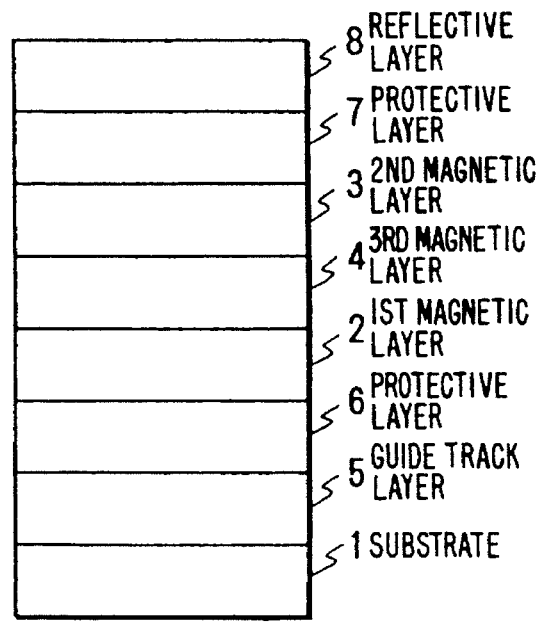
FIG. 8 is a schematic sectional view showing another example of the basic structure of the magnetooptical recording medium used in the second embodiment of the present invention.

In addition to the layer structure shown in FIG. 7, protective layers 6, 7 neighboring the magnetic layers, a reflective layer 8, a guide track layer 5, and the like may be formed, as shown in FIG. 8. Furthermore, a fourth magnetic layer for adding another function may be formed. Moreover, two media each having the above-mentioned structure may adhere to each other to constitute a double-sided recordable medium.

The recording/reproduction method using the magnetooptical recording medium with the above-mentioned structure will be described below. A recording process will be explained with reference to the state transition chart shown in FIG. 9.

In this case, assume a case wherein the sublattice magnetization of the rare earth element is dominant in both the first and second magnetic layers. Under this condition, when the magnetic moments of the two layers are parallel to each other, no interface magnetic wall is formed.

Furthermore, also assume a case wherein the sublattice magnetization of the rare earth element is dominant in the third magnetic layer. The third magnetic layer has a larger saturation magnetization and a smaller coercive force than those of the remaining two layers.

Prior to magnetooptical recording, an external magnetic field Hi of 200 to 5,000 Oe is applied to align the magnetic moment of the first magnetic layer 2 in one direction (initialization; upward in this case). When the strength of the magnetic field Hi required for initialization is smaller than, e.g., 500 Oe, a recording magnetic field Hb may be commonly used in place of the external magnetic field Hi.

Then, laser power is changed between binary levels in correspondence with a recording signal while applying the recording magnetic field Hb of about 50 to 500 Oe in the same direction (upward) as the external magnetic field, thus achieving recording.

Figure 9:
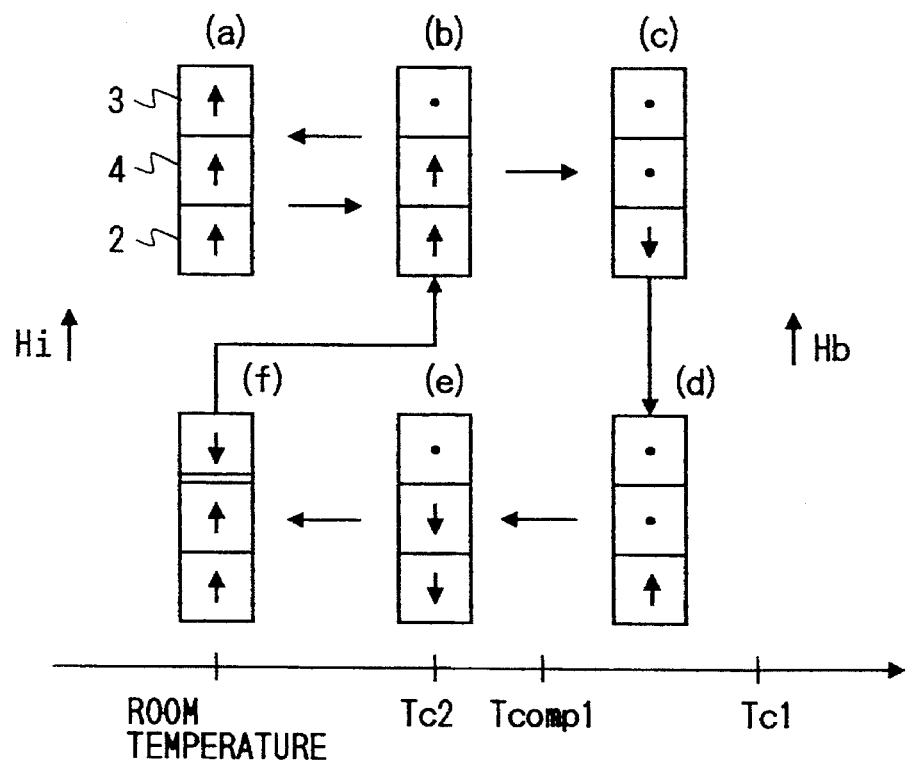
FIG. 9 is a state transition chart of a magnetic layer in one example of a recording process of a recording/reproduction method according to the second embodiment of the present invention.

States (a) and (f) in FIG. 9 correspond to states after or before recording.

When a laser beam of a low level $P_B$ is irradiates the recording medium at room temperature (L process), the temperature of only a magnetic layer portion corresponding to the high-temperature portion of the laser spot rises to a temperature equal to or higher than $T_{c2}$, and the magnetic moment of the second magnetic layer 3 disappears, as shown in the state (b) of FIG. 9. When the laser spot moves and the temperature of the magnetic layer portion falls to room temperature, the magnetic layer portion has the state (a).

When a laser beam of a high level $P_A$ irradiates the medium (H process), the temperature of only a magnetic layer portion corresponding to the high-temperature portion of the laser spot rises to a temperature equal to or higher than the compensation temperature $T_{comp1}$, and the sublattice magnetization of the transition metal becomes dominant in the first magnetic layer 2. As a result, the magnetic moment of the first magnetic layer 2 is reversed (state (c)). In this state, the direction of magnetization of the first magnetic layer 2 is reversed by the recording bias magnetic field Hb, as shown in a state (d).

When the laser spot moves and the temperature of the magnetic layer portion falls to a temperature equal to or lower than the compensation temperature $T_{comp1}$ of the first magnetic layer 2, the sublattice magnetization of the rare earth element becomes dominant again in the first magnetic layer 2, and the magnetic moment of the first magnetic layer 2 is reversed (state (e)).

When the temperature further falls to a temperature equal to or lower than the Curie temperature $T_{c2}$ of the second magnetic layer, magnetization appears in the second magnetic layer in the same direction as that of the sublattice magnetization of the first magnetic layer (so as not to form an interface magnetic wall) via the third magnetic layer which is similarly oriented. When the magnetooptical recording medium is further rotated and the magnetic layer portion passes the external magnetic field Hi, the direction of magnetization of the first magnetic layer is aligned in the upward direction, as shown in a state (f) of FIG. 9.

Figure 10:
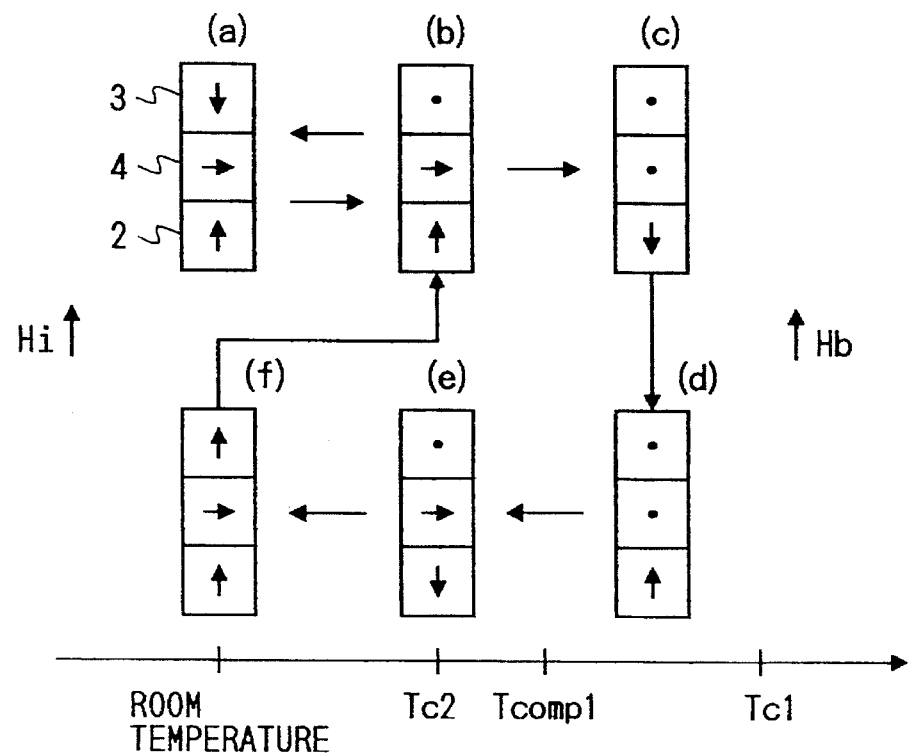
FIG. 10 is a state transition chart of the magnetic layer in another example of the recording process of the recording/reproduction method according to the second embodiment of the present invention.

FIG. 10 is a state transition chart of the similar recording process when the sublattice magnetization of the rare earth element in the third magnetic layer is still larger, and the third magnetic layer has in-plane magnetic anisotropy at room temperature.

Another example of the recording process will be described below.

Assume a case wherein the sublattice magnetization of the rare earth element is dominant in the first and third magnetic layers, and the sublattice magnetization of the transition metal is dominant in the second magnetic layer. In this case, when the magnetic moments of the first and second magnetic layers are anti-parallel to each other, no interface magnetic wall is formed between the two layers.

Figure 11:
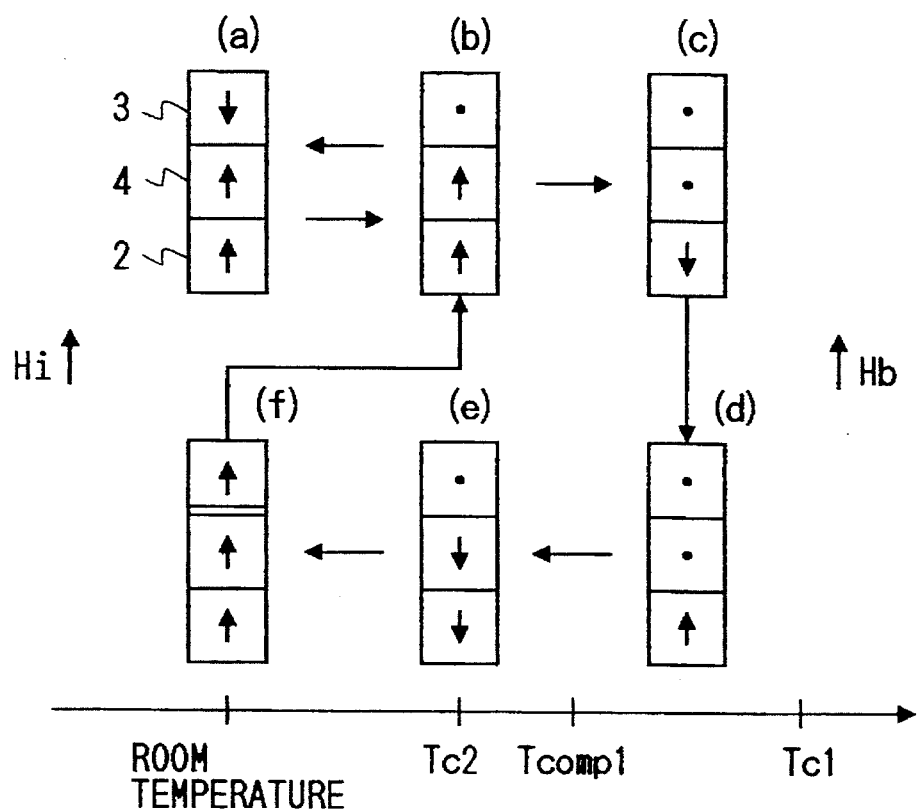
FIG. 11 is a state transition chart of the magnetic layer in still another example of the recording process of the recording/reproduction method according to the second embodiment of the present invention.

The recording process is the same as that shown in FIG. 9, and its state transition chart is as shown in FIG. 11.

With the above-mentioned recording method, a recording bit having a size equal to or smaller than the diffraction limit of the laser beam can be formed by an overwrite method.

A reproduction process will be described below with reference to the state transition charts shown in FIGS. 12A and 12B.

Figure 12A:
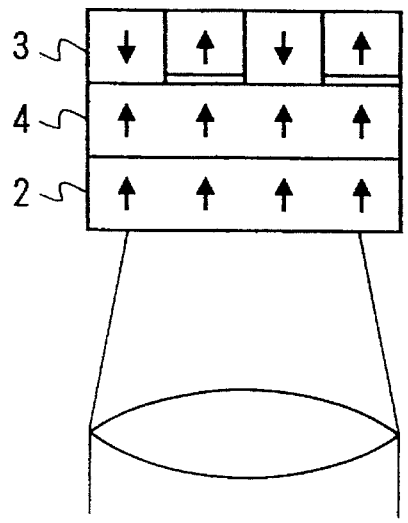
FIGS. 12A and 12B are views for explaining a reproduction method of magnetooptically recorded information according to the second embodiment of the present invention.
Figure 12B:
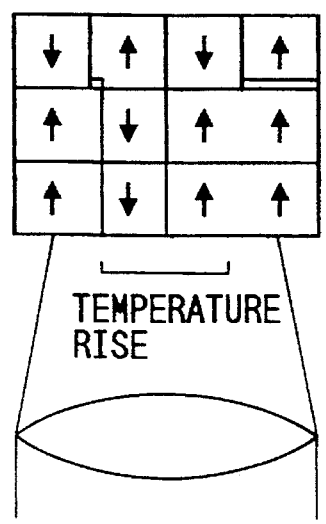

Upon completion of recording, all recorded portions in the first magnetic layer, which have passed the external magnetic field Hi, have upward magnetization, as shown in FIG. 12A, and recorded information in the second magnetic layer cannot be confirmed even by irradiating a reproduction beam. Thus, upon irradiation by the reproduction beam, the direction of the recording magnetic field Hb is reversed to the downward direction, and the strength of the magnetic field Hb is set to satisfy the following condition:

$$H_{c1} - \sigma_w^*/(2M_{s1} \cdot h_1) > Hb > H_{c1}(t) - \sigma_w^*(t)/(2M_{s1}(t) \cdot h_1)$$

where $H_{c1}(t)$, $\sigma_w^*(t)$, and $M_{s1}(t)$ respectively represent the coercive force, interface magnetic wall energy, and saturation magnetization of the first magnetic layer at a temperature t.

Under the following condition in this relation:

$$H_{c1} - \sigma_w^*/(2M_{s1} \cdot h_1) > Hb$$

the magnetic moment of the first magnetic layer will not be reversed by only a magnetic field applied in reproduction.

Furthermore, under the following condition:

$$Hb > H_{c1}(t) - \sigma_w^*(t)/(2M_{s1}(t) \cdot h_1)$$

the following fact is indicated:

With the reproduction beam, the central portion of the beam spot has the highest temperature, and the temperature rise of a portion around the spot is small. When the power of the reproduction beam is gradually increased to increase the temperature t in the above relation, if t is equal to room temperature, $\{H_{c1}(t) - \sigma_w^*(t)/(2M_{s1}(t) \cdot h_1)\}$ equals $\{H_{c1} - \sigma_w^*/(2M_{s1} \cdot h_1)\}$, and its value represents a margin for the stable presence of a magnetic wall. This value is a positive value (e.g., 200 to 500 Oe). For this reason, when Hb is set to be slightly smaller than the value $\{H_{c1} - \sigma_w^*/(2M_{s1} \cdot h_1)\}$ at room temperature, if the temperature rises and the value $\{(H_{c1}(t) - \sigma_w^*(t)/(2M_{s1}(t) \cdot h_1)\}$ decreases even slightly, the following condition is satisfied:

$$Hb > H_{c1}(t) - \sigma_w^*(t)/(2M_{s1}(t) \cdot h_1)$$

As a result, the magnetic moment of the first magnetic layer is reversed by the applied magnetic field Hb, and recorded information in the second magnetic layer can be transferred to the first magnetic layer.

Figure 13:
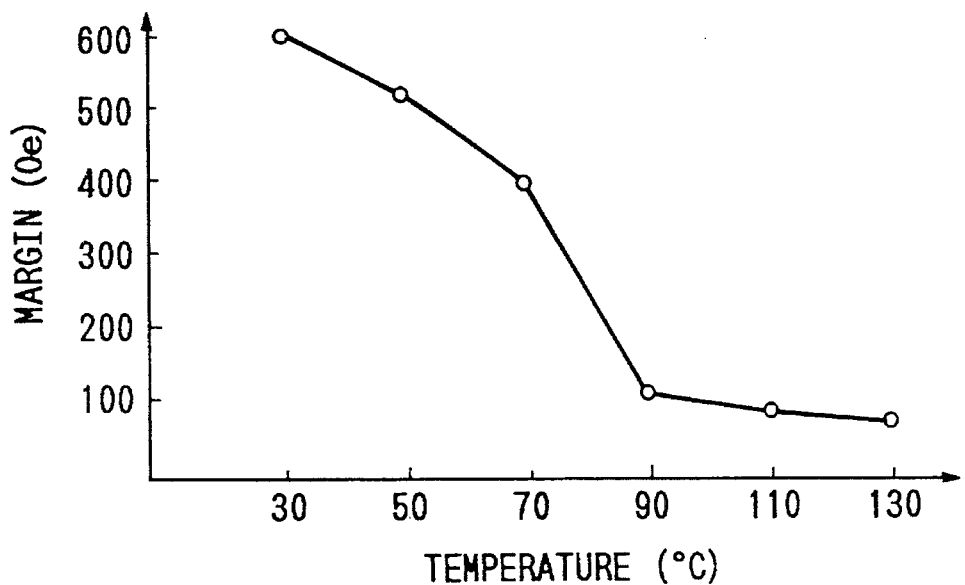
FIG. 13 is a graph showing the temperature dependence of the first magnetic layer stability margin in the reproduction process of the recording/reproduction method according to the second embodiment of the present invention.

FIG. 13 shows the measurement results of the value $\{H_{c1}(t) - \sigma_w^*(t)/(2M_{s1}(t) \cdot h_1)\}$ obtained by changing the temperature t.

A measurement sample with the following arrangement was used. That is, a 1,800-Å thick $Gd_{25}Fe_{75}$ film (at %: sublattice magnetization=Gd dominant, the coercive force $H_{c1}$=1,000 Oe, the compensation temperature=150° C., and the Curie temperature=245° C.) was formed as the first magnetic layer on a slide glass substrate. Then, a 200-Å thick $Gd_{32}Fe_{68}$ film (at %: sublattice magnetization=Gd dominant, the coercive force=100 Oe, the Curie temperature=190° C., and the layer exhibited in-plane anisotropy at room temperature) was formed as the third magnetic layer on the first magnetic layer. Furthermore, a 400-Å thick $Tb_{22}Fe_{70}Co_8$ film (at %: sublattice magnetization=FeCo dominant, the coercive force $H_{c2}$=15,000 Oe, and the Curie temperature=175° C.) was formed as the second magnetic layer on the third magnetic layer. Finally, a 800-Å thick $Si_3N_4$ film was formed as a protective film.

The measurement method is as follows.

The sample was set in a VSM (vibrating sample type magnetometer) with a variable measurement temperature, and a magnetic field of 15 kOe or higher was applied to magnetize the TbFeCo film (corresponding to the second magnetic layer) upward. Then, a magnetic field having a strength of about 3 kOe which did not reverse the direction of magnetization of the TbFeCo film was applied while changing its polarity so as to magnetize the GdFe film (corresponding to the first magnetic layer) upward (to form an interface magnetic wall). Thereafter, the strength of the magnetic field which could reverse the direction of magnetization of the GdFe film was checked while applying a downward magnetic field. More specifically, the value corresponding to $\{H_{c1}(t) - \sigma_w^*(t)/(2M_{s1}(t) \cdot h_1)\}$ was measured.

FIG. 13 shows the measurement results obtained while changing the temperature.

As can be seen from the results shown in FIG. 13, a margin, i.e., $\{H_{c1}(t) - \sigma_w^*(t)/(2M_{s1}(t) \cdot h_1)\}$, which is about 600 Oe at room temperature decreases to about 100 Oe at 90° C. to 110° C.

For this reason, when the temperature of the magnetic layer portion at the central portion of the beam spot of the reproduction laser beam rises to 90° C. to 110° C., and the temperature of a portion around the spot is, e.g., 70° C. or less, if the strength of the downward magnetic field to be applied is set to be, e.g., 200 Oe, the magnetization of the second magnetic layer (TbFeCo film) at only the central portion of the reproduction beam can be transferred and read out.

FIG. 12A shows a case wherein information is reproduced using a beam of small power after the first magnetic layer is magnetized upward in the above-mentioned reproduction process. FIG. 12B shows a case wherein the reproduction power and the magnetic field to be applied are properly selected. In FIG. 12B, recorded information in the second magnetic layer at only the central portion of the spot is transferred to the first magnetic layer. In this case, crosstalk of reproduction signals from neighboring tracks and crosstalk from recording bits before and after a recording bit of interest upon reproduction can be eliminated, and a satisfactory reproduction signal is expected to be obtainable even when high-density recording is performed.

[Experimental Example 2]

An 80-nm thick dielectric protective film consisting of $Si_3N_4$ was formed on a polycarbonate substrate having a thickness of 1.2 mm and a diameter of 130 mm by a sputtering method, and a 180-nm thick first magnetic layer consisting of $Gd_{25}Fe_{75}$ (at %) was formed on the protective film. Furthermore, a 10-nm thick third magnetic layer consisting of $Gd_{20}Tb_{15}Co_{65}$ (at %) was formed on the first magnetic layer.

Then, a 35-nm thick second magnetic layer consisting of $Tb_{22}Fe_{63}Co_{10}Cr_5$ (at %) was formed on the third magnetic layer. Furthermore, an 80-nm thick dielectric protective film consisting of $Si_3N_4$ was formed on the second magnetic layer, thus ending sputtering. Finally, an acrylate-based resin was coated using a spinner to form a protective coat.

The sample disk medium was rotated at 1,800 rpm, and recording was performed using binary recording power ($P_B$: 5 mW, $P_A$: 12 mW) at a frequency of 8.0 MHz at a radial position of 35 mm while applying an upward magnetic field of 300 Oe. Note that the strength of the external magnetic field for magnetizing (initializing) the first magnetic layer upward was 2 kOe.

Thereafter, it was attempted to reproduce the recorded signal using a continuous beam of 1 mW. However, no reproduced signal could be confirmed. Then, a downward magnetic field of 600 Oe was applied while reproducing a recorded signal using a continuous beam of 1 mW. Recorded information in the second magnetic layer was transferred to the first magnetic layer, and a satisfactory reproduction signal having a C/N ratio of 40 dB could be obtained.

The strength of the downward magnetic field was changed while reproducing a recorded signal using a continuous beam of 1 mW. Recorded information in the second magnetic layer began to be transferred from about 100 Oe, and a reproduced signal having a C/N ratio 45 dB was confirmed when the magnetic field of 150 to 350 Oe was applied. When a magnetic field of 500 Oe or higher was applied, the C/N ratio was lowered to 40 dB.

Similarly, the power of the reproduction beam was increased from 1 mW while applying a downward magnetic field of 200 Oe. Until when the reproduction power was increased to 2.5 mW, the C/N ratio was 46 dB. However, when the reproduction power was increased to 3 mW, the C/N ratio was lowered to 42 dB.

[Third Embodiment]

Figure 14:
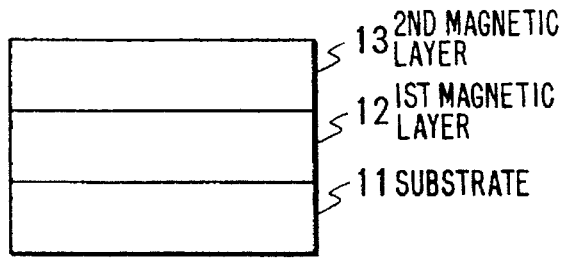
FIG. 14 is a schematic sectional view showing an example of the basic structure of a magnetooptical recording medium used in the third embodiment of the present invention.

FIG. 14 is a schematic sectional view showing the layer structure of a magnetooptical recording medium used in the present invention. Referring to FIG. 14, first and second magnetic layers 12 and 13 are laminated on a substrate 11, and a recording/reproduction laser is incident from the substrate 11 side.

Each of the first and second magnetic layers 12 and 13 comprises a perpendicular magnetic film consisting of an amorphous alloy of a rare earth element (Tb, Dy, Gd, Nd, Ho, or the like) and an iron-group transition metal (Fe, Co, Ni, or the like), and an exchange-coupling force acts between the two layers 12 and 13.

Note that the first magnetic layer 12 is an in-plane magnetic film at room temperature, and becomes a perpendicular magnetic film when the temperature rises.

The first and second magnetic layers satisfy relations (1) to (4) in the first embodiment.

As the substrate 11, glass, a glass member with a guide track consisting of an ultraviolet setting resin, polycarbonate, polymethyl methacrylate, an epoxy-based resin, and the like can be used.

Figure 15:
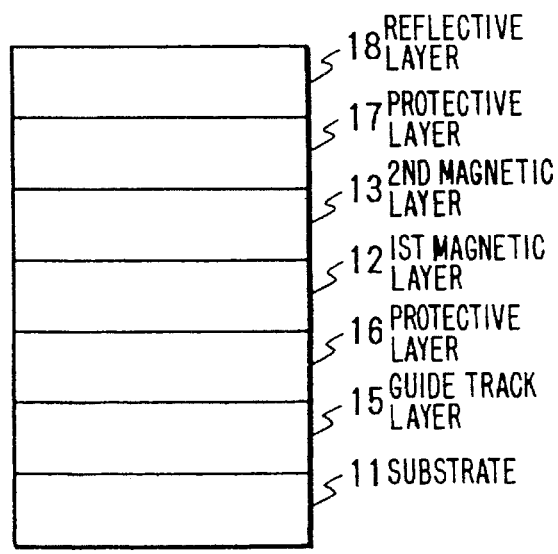
FIG. 15 is a schematic sectional view showing another example of the basic structure of the magnetooptical recording medium used in the third embodiment of the present invention.

In addition to the layer structure shown in FIG. 14, protective layers 16, 17 formed adjacent to the magnetic layers, a reflective layer 18, a guide track layer 15, and the like may be formed, as shown in FIG. 15. Further, an intermediate layer may be formed between the first and second magnetic layers so as to adjust the exchange-coupling force. Furthermore, two media each having the above-mentioned structure may be adhered to each other to constitute a double-sided recordable medium.

The recording/reproduction method using the magnetooptical recording medium with the above-mentioned structure will be described below. The recording process will be described below with reference to the state transition chart shown in FIG. 16.

Assume a case wherein the sublattice magnetization of the rare earth element is dominant in the first magnetic layer, and the sublattice magnetization of the transition metal is dominant in the second magnetic layer. In this case, when the magnetic moments of the two layers are anti-parallel to each other, no interface magnetic wall is formed between the two layers.

Recording is performed by changing the laser power between binary levels in correspondence with a recording signal while applying a recording magnetic field Hb of about 50 to 500 Oe in the same direction (upward) as that of an external magnetic field.

Figure 16:
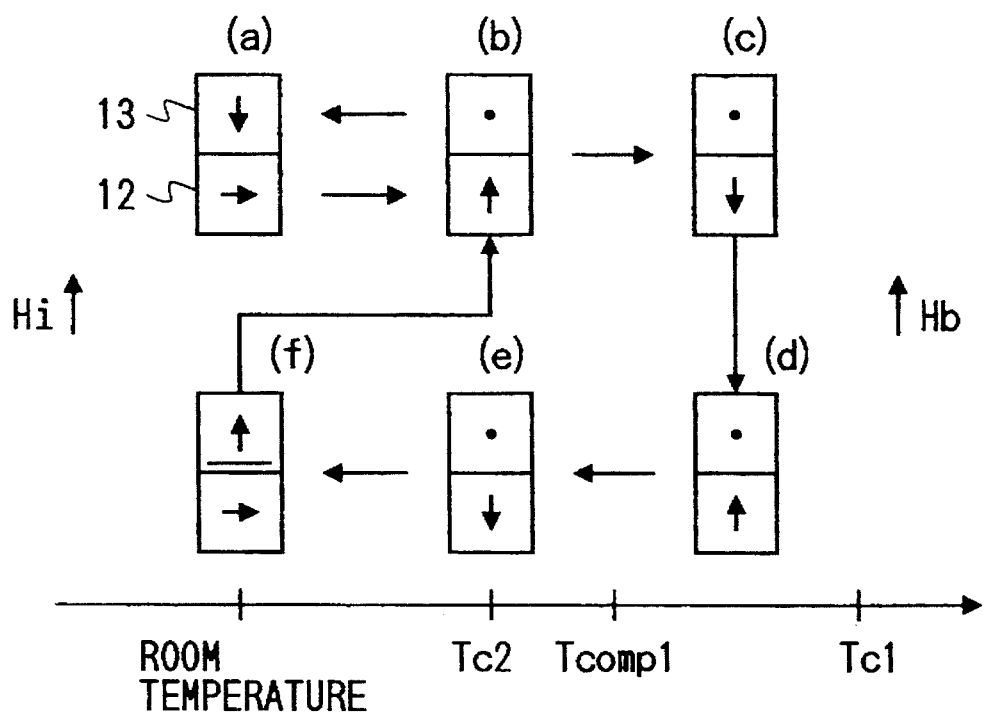
FIG. 16 is a state transition chart of a magnetic layer in one example of a recording process of a recording/reproduction method according to the third embodiment of the present invention.

States (a) and (f) of FIG. 16 correspond to states after or before recording.

When a laser beam of a low level $P_B$ irradiates the recording medium at room temperature (L process), the temperature of only a magnetic layer portion corresponding to the high-temperature portion of the laser spot rises to a temperature equal to or higher than the Curie temperature $T_{c2}$ of the second magnetic layer, and the magnetic moment of the second magnetic layer 13 disappears, as shown in the state (b) of FIG. 16. At this time, the magnetization of the first magnetic layer 12 is perpendicular magnetization, and is aligned in the direction of the recording magnetic field Hb.

When the laser spot moves and the temperature of the magnetic layer portion falls to room temperature, magnetization appears in the second magnetic layer 13 (downward magnetization) not to form an interface magnetic wall with the first magnetic layer 12, as shown in the state (a).

When a laser beam of a high level $P_A$ irradiates the recording medium at room temperature (H process), the temperature of only a magnetic layer portion corresponding to the high-temperature portion of the laser spot rises to a temperature equal to or higher than the compensation temperature $T_{comp1}$ of the first magnetic layer, the sublattice magnetization of the transition metal becomes dominant in the first magnetic layer 12 in the state of the perpendicular magnetic film, and the magnetic moment of the first magnetic layer 12 is reversed (state (c)). In this state, the direction of magnetization of the first magnetic layer is reversed by the recording bias magnetic field Hb, as shown in a state (d) of FIG. 16.

When the laser spot moves and the temperature of the magnetic layer portion falls to a temperature equal to or lower than the compensation temperature $T_{comp1}$ of the first magnetic layer 12, the sublattice magnetization of the rare earth element becomes dominant again in the first magnetic layer 12, and the magnetic moment of the first magnetic layer 12 is reversed (state (e)).

When the temperature further falls to a temperature equal to or lower than the Curie temperature $T_{c2}$ of the second magnetic layer, magnetization appears in the second magnetic layer in the same direction as that of the sublattice magnetization of the first magnetic layer (so as not to form an interface magnetic wall). When the temperature further falls to a temperature near room temperature, the magnetization of the first magnetic layer is aligned in the in-plane direction, as shown in a state (f) of FIG. 16.

Figure 18:
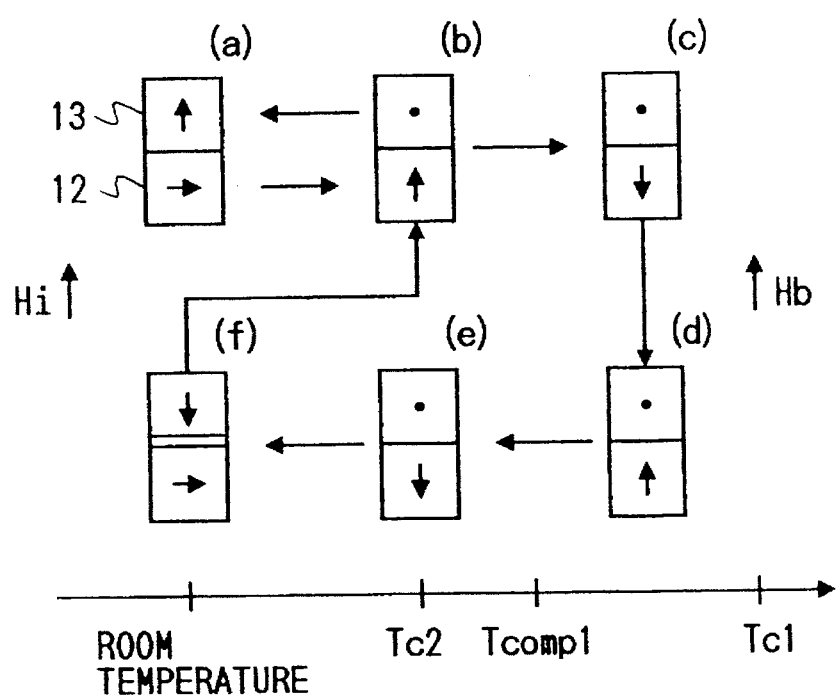
FIG. 18 is a state transition chart of the magnetic layer in another example of the recording process of a recording/reproduction method according to the third embodiment of the present invention.

The state transition chart of FIG. 18 shows another recording process.

Assume a case wherein the sublattice magnetization of the rare earth element is dominant in the first magnetic layer, and the sublattice magnetization of the rare earth element is also dominant in the second magnetic layer. In this case, when the magnetic moments of the first and second magnetic layers are parallel to each other, no interface magnetic wall is formed between the two layers.

With the above-mentioned recording method, a recording bit having a size equal to or smaller than the diffraction limit of the laser beam can be formed by an overwrite method.

A reproduction process will be described below with reference to the state transition charts shown in FIGS. 17A and 17B.

Figure 17A:
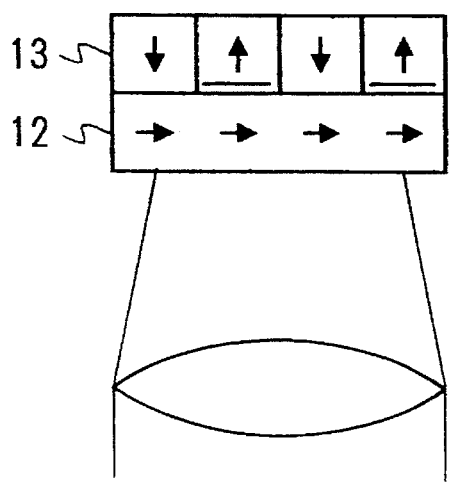
FIGS. 17A and 17B are views for explaining an example of a reproduction method of magnetooptically recorded information according to the third embodiment of the present invention.
Figure 17B:
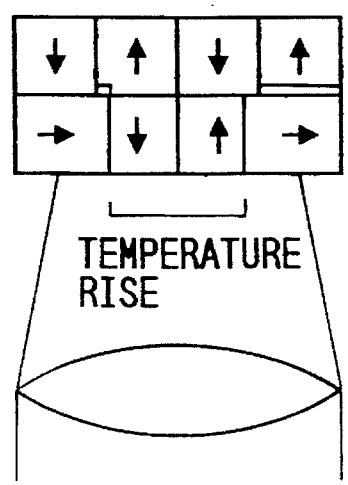

Upon completion of recording, the directions of magnetization of all recorded portions in the first magnetic layer are aligned in the in-plane direction, as shown in FIG. 17A. Upon irradiation by a reproduction beam, the central portion of the beam spot has the highest temperature, and a portion around the spot has a small temperature rise.

At the portion around the spot, a bit formed in the second magnetic layer cannot be seen since the magnetization of the first magnetic layer is the in-plane magnetization. However, at the central portion of the spot, the magnetization of the first magnetic layer becomes perpendicular magnetization, a bit formed in the second magnetic layer is transferred to the first magnetic layer by exchange coupling so as not to form an interface magnetic wall between the first and second magnetic layers, and the transferred bit can be confirmed.

FIG. 17A shows a case wherein information is reproduced using a beam of small power in the reproduction process. FIG. 17B shows a case wherein both the reproduction power and the magnetic field to be applied are properly selected. In FIG. 17B, recorded information in the second magnetic layer at only the central portion of the spot is transferred to the first magnetic layer. With this reproduction method, crosstalk of reproduction signals from neighboring tracks and crosstalk from recording bits before and after a recording bit of interest upon reproduction can be eliminated, and a satisfactory reproduction signal is expected to be obtainable even when high-density recording is performed.

Figure 19:
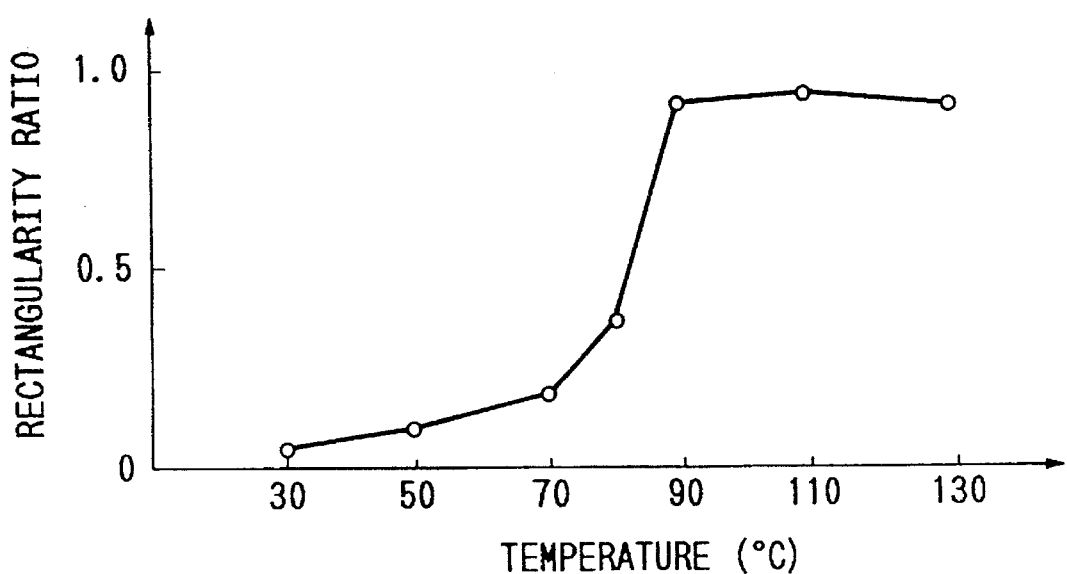
FIG. 19 is a Graph showing the temperature dependence of the rectangularity ratio of a first magnetic layer in the reproduction process of the recording/reproduction method according to the third embodiment of the present invention.

FIG. 19 shows a change in rectangularity ratio (residual magnetization/saturation magnetization) in the perpendicular direction of the first magnetic layer obtained when a temperature t is changed. A measurement sample has the following arrangement.

As the measurement sample, a sample prepared as follows was used. That is, a 1,800-Å thick $Gd_{29}Fe_{51}Co_{20}$ film (at %: sublattice magnetization=Gd dominant, the coercive force $H_{c1}$=100 Oe, the compensation temperature=170° C., and the Curie temperature=265° C.) was formed on a slide glass substrate, and an 800-Å thick $Si_3N_4$ film as a protective film was formed thereon.

The measurement is performed as follows.

The sample is set in a VSM (vibrating sample type magnetometer) with a variable measurement temperature, and a magnetic field of 15 kOe or higher is applied to magnetize the GdFeCo film (corresponding to the first magnetic layer) upward. In this state, the saturation magnetization is measured. Then, the applied magnetic field is set to be zero, and the residual magnetization is measured. The ratio of the residual magnetization/the saturation magnetization is the rectangularity ratio.

FIG. 19 shows the results of the above-mentioned measurement obtained while changing the temperature.

As can be seen from this graph, the rectangularity ratio which is almost zero at room temperature (no magnetization remains in the perpendicular direction in the first magnetic layer) becomes almost 1 at 90° C. to 110° C., and the first magnetic layer becomes a perpendicular magnetic film.

For this reason, when the temperature of the magnetic layer portion at the central portion of the beam spot of the reproduction laser beam rises to 90° C. to 110° C., and the temperature of a portion around the spot is, e.g., 70° C. or less, the magnetization of the second magnetic layer at only the central portion of the reproduction beam can be transferred and read out.

[Text Example 3]

An 80-nm thick dielectric protective film consisting of $Si_3N_4$ was formed by a sputtering method on a polycarbonate substrate having a thickness of 1.2 mm and a diameter of 130 mm, a 180-nm thick first magnetic layer consisting of $Gd_{29}Fe_{51}Co_{20}$ (at %) was formed on the protective film, and a 40-nm thick second magnetic layer consisting of $Tb_{22}Fe_{70}Co_8$ (at %) was formed on the first magnetic layer. Furthermore, an 80-nm thick dielectric protective film consisting of $Si_3N_4$ was formed on the second magnetic layer, thus ending sputtering. Finally, an acrylate-based resin was coated using a spinner to form a protective coat.

The sample disk medium was rotated at 1,800 rpm, and recording was performed using binary recording power ($P_B$: 5 mW, $P_A$: 12 mW) at a frequency of 3.7 MHz at a radial position of 35 mm while applying a magnetic field of 400 Oe upward.

Thereafter, it was attempted to reproduce the recorded signal using a continuous beam of 1 mW. However, no reproduced signal could be confirmed.

Then, a magnetic field whose strength was gradually changed was applied downward while reproducing a recorded signal using a continuous beam of 1 mW. Recorded information in the second magnetic layer began to be transferred from about 100 Oe, and a reproduced signal having a C/N ratio of 47 dB could be confirmed using a magnetic field of 150 to 350 Oe. When the strength of the magnetic field was further increased, the C/N ratio was lowered to 45 dB at 500 Oe or higher.

Similarly, the power of the reproduction beam was increased from 1 mW while applying a magnetic field of 200 Oe downward. Until when the reproduction power was increased to 2.5 mW, the C/N ratio was 47 dB. However, when the reproduction power was increased to 3 mW, the C/N ratio was lowered to 44 dB.

Thereafter, when the power of the reproduction beam was increased from 1 mW without applying any magnetic field, the C/N ratio became large, i.e., the C/N ratio was 42 dB at reproduction power of 2 mW and was 47 dB at power of 2.5 mW to 3.5 mW. When the reproduction power exceeded 3.5 mW, the C/N ratio was lowered.

[Fourth Embodiment]

Figure 20:
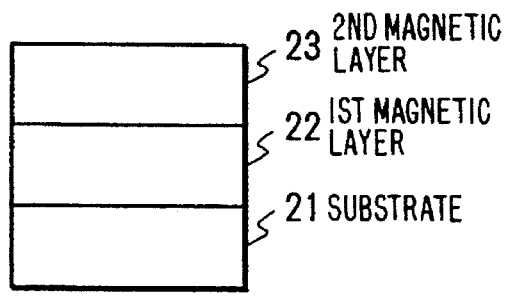
FIG. 20 is a schematic sectional view showing an example of a magnetooptical recording medium according to the fourth embodiment of the present invention.

FIG. 20 is a schematic sectional view showing an example of a magnetooptical recording medium according to the present invention. In this example, first and second magnetic layers 22 and 23 are laminated in turn on a substrate 21. A laser beam for recording and reproduction is incident from the substrate 21 side.

Each of the first and second magnetic layers 22 and 23 comprises a perpendicular magnetic film consisting of an amorphous alloy of a rare earth element such as Tb, Dy, Gd, Nd, Ho, or the like and an iron-group transition metal element such as Fe, Co, Ni, or the like, and an exchange-coupling force acts between these two layers.

As the material of the substrate 21, known materials such as glass, a glass member with a guide track consisting of an ultraviolet setting resin, polycarbonate, polymethyl methacrylate, an epoxy-based resin, and the like can be used without any limitations.

Figure 21:
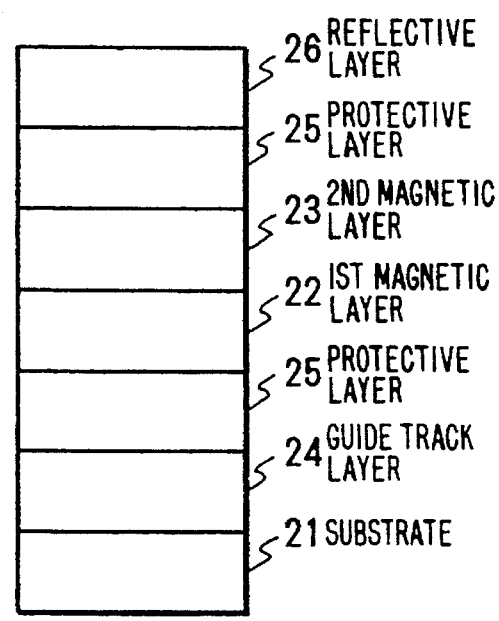
FIG. 21 is a schematic sectional view showing another example of the magnetooptical recording medium according to the fourth embodiment of the present invention.

FIG. 21 is a schematic sectional view showing another example of the magnetooptical recording medium according to the present invention. In this example, a guide track layer 24, a protective layer 25, first and second magnetic layers 22 and 23, another protective layer 25, and a reflective layer 26 are laminated in turn on a substrate 21. Furthermore, an intermediate layer having an exchange-coupling adjustment function may be formed between the first and second magnetic layers. Furthermore, a third magnetic layer which has a function of enhancing the magnetooptical effect upon reproduction and has a high Curie temperature may be provided on the side of the substrate 21 to be exchange-coupled to the first magnetic layer 22. Moreover, a fourth magnetic layer which has a low coercive force and a low Curie temperature may be formed on the side opposite to the substrate to be exchange-coupled to the second magnetic layer, so as to provide a function of reducing the initializing magnetic field upon recording. In addition, two media each having the above-mentioned structure may be adhered to each other to constitute a double-sided recordable recording medium.

As the material of the guide track layer 24, a polymethyl methacrylate-based ultraviolet setting resin can be used.

As the material of the protective layer 25, nitrides, oxides, carbides, and the like of organic materials such as SiN, AlN, SiC, SiO, $Ta_2O_5$, and the like can be used.

As the material of the reflective layer 26, metals such as Al, Au, Pt, and the like can be used.

Figure 22:
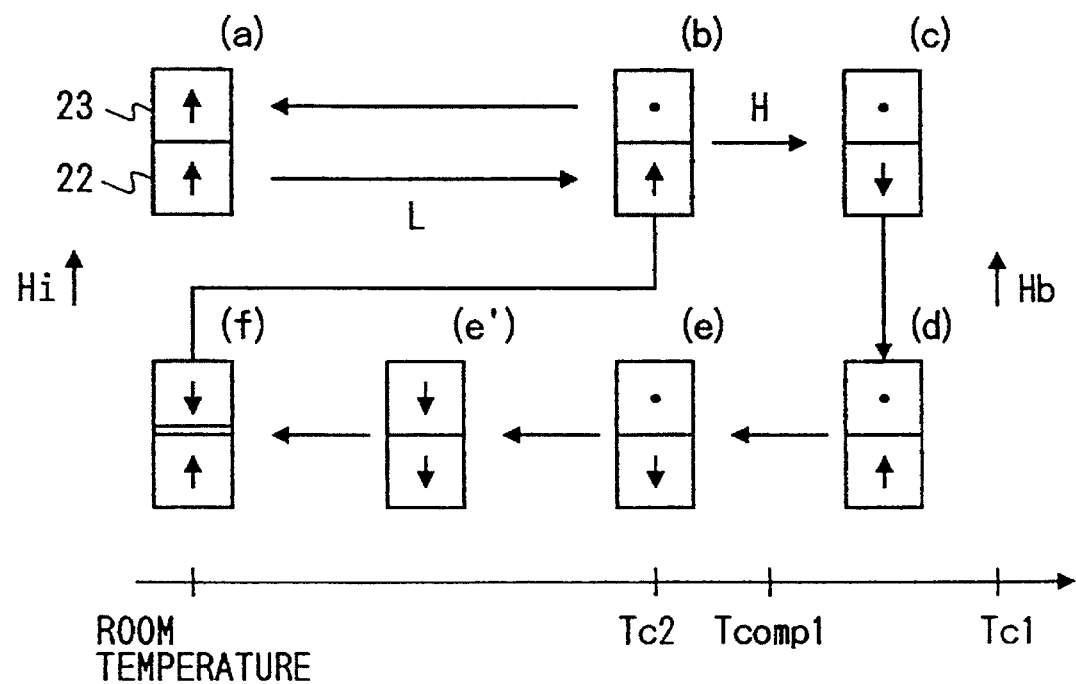
FIG. 22 is a state transition chart showing an example of a magnetooptical recording method according to the fourth embodiment of the present invention.

FIG. 22 is a state transition chart showing an example of a magnetooptical recording method according to the present invention. In this example, assume that the sublattice magnetization of the rare earth element is dominant in both the first and second magnetic layers 22 and 23. In this case, when the magnetic moments of the two layers are parallel to each other, no interface magnetic wall is formed between the two layers.

Prior to magnetooptical recording, an external magnetic field Hi of 200 to 5,000 Oe is applied to align the magnetic moment of the first magnetic layer 22 in one direction (upward in FIG. 22), thus performing so-called initialization, as shown in a state (a) of FIG. 22. When the strength of the magnetic field Hi required for initialization is smaller than, e.g., 500 Oe, a recording magnetic field Hb may be commonly used in place of the external magnetic field Hi.

Then, a laser beam output whose power is changed between binary levels in correspondence with a recording signal irradiates the medium while applying the recording magnetic field Hb of about 50 to 500 Oe in the same direction (upward) as the external magnetic field, thus achieving recording as follows.

When a laser beam of a low level Pb irradiates the medium (to be referred to as an L process hereinafter), the temperature of only a magnetic layer portion corresponding to the high-temperature portion of a laser spot rises to a temperature equal to or higher than the Curie temperature $T_{c2}$ of the second magnetic layer 23, and the magnetic moment of the second magnetic layer 23 disappears, as shown in a state (b) of FIG. 22. When the laser spot moves and the temperature of the magnetic layer falls to room temperature, the state (a) of FIG. 22 is restored.

On the other hand, when a laser beam of a high level Pa irradiates the medium (to be referred to as an H process hereinafter), the temperature of only a magnetic layer portion corresponding to the high-temperature portion of the laser spot rises to a temperature equal to or higher than the compensation temperature $T_{comp1}$ of the first magnetic layer, and the sublattice magnetization of the transition metal element becomes dominant in the first magnetic layer 22. As a result, the direction of the magnetic moment of the first magnetic layer 22 is reversed, as shown in a state (c) of FIG. 22. At this time, the direction of magnetization of the first magnetic layer 22 is reversed by the recording bias magnetic field Hb, as shown in a state (d) of FIG. 22. When the laser spot moves and the temperature of the corresponding portion falls to a temperature equal to or lower than the compensation temperature $T_{comp1}$ of the first magnetic layer 22, the sublattice magnetization of the rare earth element becomes dominant again in the first magnetic layer 22, and the direction of the magnetic moment is reversed, as shown in a state (e) in FIG. 22. When the temperature of the magnetic layer portion further falls to a temperature equal to or lower than the Curie temperature $T_{c2}$ of the second magnetic layer 23, magnetization appears in the second magnetic layer 23 in the same direction as that of the sublattice magnetization of the first magnetic layer (so as not to form an interface magnetic wall), as shown in a state (e') of FIG. 22. When the magnetooptical recording medium is rotated and the magnetic layer portion passes the external magnetic field Hi, the direction of magnetization of the first magnetic layer 22 is aligned in the upward direction, as shown in a state (f) of FIG. 22.

Figure 23:
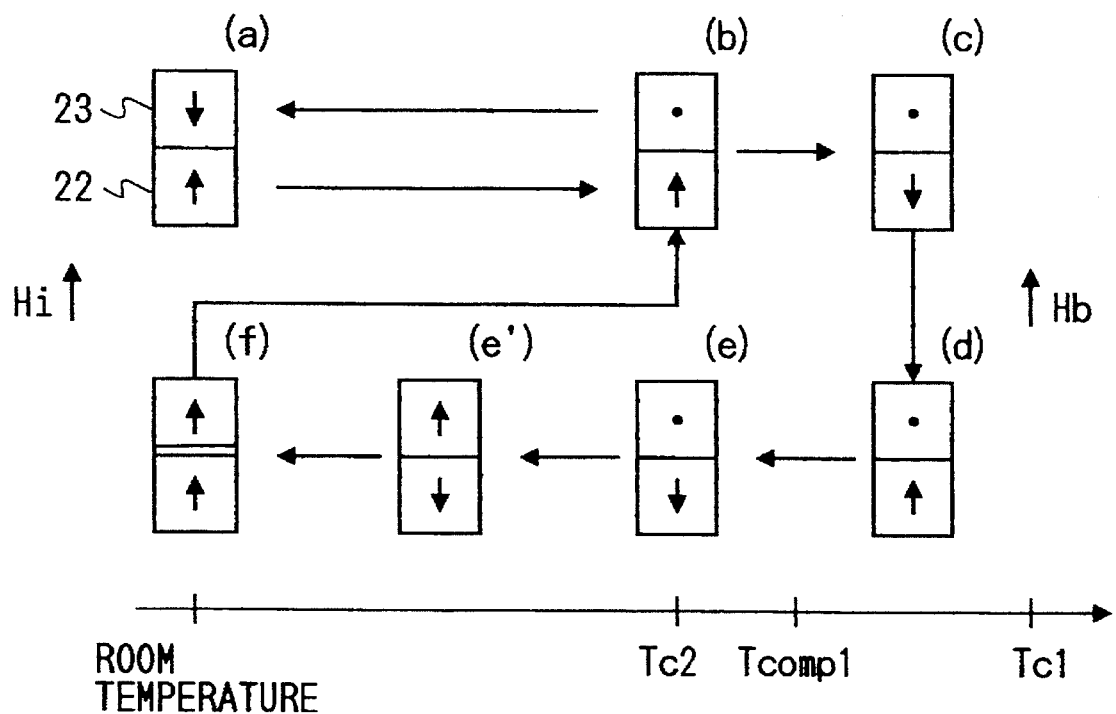
FIG. 23 is a state transition chart showing another example of the magnetooptical recording method according to the fourth embodiment of the present invention.

FIG. 23 is a state transition chart showing another example of the magnetooptical recording method according to the present invention. In this method, substantially the same recording operation as that shown in FIG. 22 is performed, except that a magnetooptical recording medium in which the sublattice magnetization of the rare earth element is dominant in the first magnetic layer 22 and the sublattice magnetization of the transition metal element is dominant in the second magnetic layer 23 is used. In this case, when the magnetic moments of the two layers are anti-parallel to each other, no interface magnetic wall is formed between the two layers.

In the recording method shown in FIG. 23, states in a process wherein the temperature of the magnetic layer returns from the Curie temperature $T_{c2}$ of the second magnetic layer to room temperature in the H process are different from those shown in FIG. 22, as shown in states (e) to (f). This is because the sublattice magnetization of the rare earth element is dominant in the first magnetic layer 22 and the sublattice magnetization of the transition metal is dominant in the second magnetic layer 23, as described above. Therefore, in a portion recorded in the H process, the magnetic moments of the two magnetic layers are parallel to each other (in the upward direction in this case), and an interface magnetic wall is formed between the two layers, as shown in a state (f) of FIG. 23.

With the above-mentioned recording method, according to the present invention, a recording bit having a size equal to or smaller than the diffraction limit of the laser beam can be formed by an overwrite method.

Figure 24A:
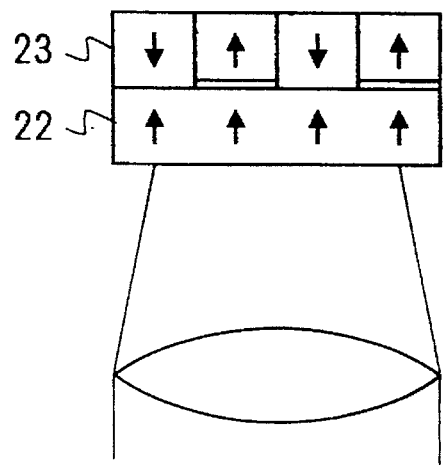
FIGS. 24A and 24B are views showing an example of a reproduction method according to the fourth embodiment of the present invention and showing a change in magnetic moment.
Figure 24B:
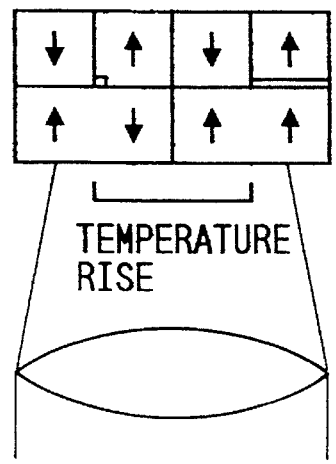

FIGS. 24A and 24B are schematic views showing the states of magnetic moments when information is reproduced by transferring information recorded in the second magnetic layer 23 to the first magnetic layer 22 in the state (f) of FIG. 23. Upon completion of a series of recording processes shown in FIG. 23, the magnetic moments of all the recorded portions in the first magnetic layer 22 are aligned in the upward direction, and it is difficult to reproduce recorded information in the second magnetic layer 23 even by irradiating the medium with a reproduction beam. Thus, upon irradiation the medium with the reproduction beam, the recording magnetic field Hb in FIG. 23 is reversed to the downward direction, and the strength of the magnetic field is set to satisfy a condition $H_{c1}-\sigma_w/2M_s h1_1 > Hb > H_{c1}(t)-\sigma_w(t)/2Ms1(t)h1$. Note that Hc1(t), σw(t), and $M_{s1}(t)$ are respectively the coercive force, interface magnetic wall energy, and saturation magnetization of the first magnetic layer 22 at a temperature t.

Of the conditions of the magnetic field Hb given by the above relation, a condition $H_{c1}-\sigma_w/2M_s h1_1 > Hb$ defines a condition for preventing the magnetic moment of the first magnetic layer from being reversed by only the magnetic field applied upon reproduction.

Of the conditions of the magnetic field Hb given by the above relation, a condition $Hb > H_{c1}(t)-\sigma_w(t)/2M_{s1}(t)h_1$ defines the following condition. More specifically, upon irradiation of the medium with a laser beam, the central portion of the beam spot has the highest temperature, and the temperature rise of a portion around the spot is small. Assume a case wherein the laser beam output upon reproduction is gradually increased (i.e., the temperature t in the above relation is increased).

If t is equal to room temperature, $H_{c1}(t)-\sigma_w(t)/2M_{s1}(t)h_1$ equals $H_{c1}-\sigma_w/2M_s h1_1$, and this value is a margin for the stable presence of a magnetic wall. This value is a positive value (e.g., 200 to 500 Oe).

For this reason, when the value Hb is set to be slightly smaller than the value of the margin, i.e., $H_{c1}-\sigma_w/2M_{s1}(t)h_1$, if the temperature rises and the value $H_{c1}(t)-\sigma_w(t)/2M_{s1}(t)h_1$ decreases even slightly, $Hb > H_{c1}(t)-\sigma_w(t)/2M_{s1}(t)h_1$ is satisfied. As a result, the magnetic moment of the first magnetic layer is reversed by the applied magnetic field Hb, and recorded information in the second magnetic layer can be transferred to the first magnetic layer.

When the value of the term of the margin for the stable presence of a magnetic wall, i.e., $H_{c1}(t)-\sigma_w(t)/2M_{s1}(t)h_1$, is relatively large at room temperature and changes largely along with the temperature rise, if the strength of a reproduction magnetic field and the laser beam output are properly selected, information recorded in the second magnetic layer is transferred to the first magnetic layer at only the central portion of the beam spot where the temperature increases upon reproduction, and reproduction with a super resolution can be realized.

Figure 25:
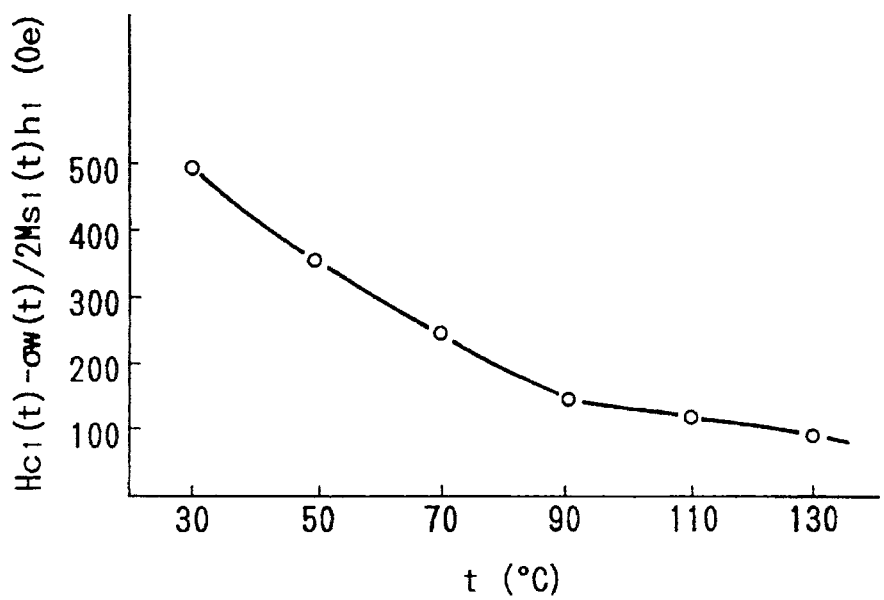
FIG. 25 is a graph showing the relationship between a margin $H_{c1}(t)-\sigma_w(t)/2M_{s1}(t)h_1$ for stabilizing a magnetic wall and the temperature.

FIG. 25 is a graph showing the measurement results of the value $H_{c1}(t)-\sigma_w(t)/2M_{s1}(t)h_1$ at respective temperatures. A method of measuring $H_{c1}(t)-\sigma_w(t)/2M_{s1}(t)h_1$ will be described below.

A measurement sample was prepared as follows. An 80-nm thick $Gd_{12}Dy_{13}Fe_{60}Co_{15}$ film (at %: sublattice magnetization=GdDy dominant, the coercive force $H_{c1}$ (room temperature)=1,000 Oe, the compensation temperature= 160° C., and the Curie temperature=230° C.) was sputtered on a slide glass substrate. A 30-nm thick $Dy_{22}Fe_{70}Co_8$ film (at %: sublattice magnetization=FeCo dominant, the coercive force $H_{c2}$ (room temperature) =12,000 Oe, and the Curie temperature=180° C.) was then sputtered. Finally, an 80-nm thick $Si_3N_4$ film was laminated as a protective film.

In the measurement method, the sample was set in a VSM (vibrating sample type magnetometer) with a variable measurement temperature, and a magnetic field of 20 kOe or higher was applied to magnetize the DyFeCo film (corresponding to the second magnetic layer) upward. Then, a magnetic field having a strength of about 3 kOe which did not reverse the direction of magnetization of the DyFeCo film was applied while changing its polarity so as to magnetize the GdDyFeCo film (corresponding to the first magnetic layer) upward. Thereafter, the strength of the magnetic field which could reverse the direction of magnetization of the GdDyFeCo film, i.e., the value $H_{c1}(t)-\sigma_w(t)/2M_{s1}(t)h_1$, was checked while applying a magnetic field downward. FIG. 25 is a graph showing the measurement results obtained while changing the temperature.

As can be understood from the results shown in FIG. 25, the margin ($H_{c1}(t)-\sigma_w(t)/2M_{s1}(t)h_1$) which is about 500 Oe at room temperature decreases to about 150 Oe at 90° C. to 110° C. For this reason, when the temperature of the magnetic layer portion at the spot central portion of the laser beam rises to 90° C. to 110° C., and the temperature of a portion around the spot is, e.g., 70° C. or less, if the strength of the downward magnetic field to be applied is set to be, e.g., 200 Oe, the magnetization of the second magnetic layer (DyFeCo film) at only the central portion of the reproduction beam can be transferred to the first magnetic layer (GdDyFeCo film) and can be read out. In other words, FIG. 25 shows the temperature dependence of the margin for the stable presence of an interface magnetic wall between the two magnetic layers.

Therefore, when information is reproduced while properly selecting the laser beam output and the magnetic field to be applied in the recording state shown in FIG. 24A, recorded information in the second magnetic layer 23 at only the spot central portion is transferred to the first magnetic layer 22, as shown in FIG. 24B. When the state shown in FIG. 24B is realized, crosstalk of reproduction signals from neighboring tracks and crosstalk from recording pits before and after a recording pit of interest upon reproduction can be eliminated, and a satisfactory reproduction signal can be obtained when high-density recording is performed.

In this manner, when a change in magnetic characteristics of the recording film due to a change in temperature is measured in detail to accurately determine the temperature distribution in the reproduction spot, the recorded information reproduction method of the present invention can be realized. However, for example, this method cannot cope with a case wherein the inner temperature of a recording/ reproduction apparatus changes or the medium linear velocity upon reproduction changes depending on a use area (i.e., an inner or outer peripheral portion of the disk) of the magnetooptical recording medium. Thus, a method of solving this problem will be described in detail below using an experimental example.

[Experimental Example 4]

A 60-nm thick dielectric protective film consisting of $Si_3N_4$ was formed by a sputtering method on a polycarbonate substrate having a thickness of 1.2 mm and a diameter of 130 mm. Then, a 50-nm thick first magnetic layer consisting of $Gd_{20}Tb_5Fe_{70}Co_5$ (at %) and a 20-nm thick second magnetic layer consisting of $Dy_{12}Tb_{10}Fe_{70}Co_8$ (at %) were formed in turn on the protective film. Furthermore, a 40-nm thick Al heat sink layer was formed on the second magnetic layer, and a 60-nm thick dielectric protective film consisting of $Si_3N_4$ was formed on the heat sink layer, thus ending sputtering. Finally, an acrylate-based resin was coated as a protective layer using a spinner, thus obtaining a magnetooptical recording medium.

The characteristics of the recording medium prepared as described above are as follows:

Coercive force ($H_{c1}$) of first magnetic layer: 500 Oe
Curie temperature ($T_{c1}$) of first magnetic layer: 230° C.
Saturation magnetization ($M_{s1}$) of first magnetic layer: 220 emu/cc
Film thickness ($h_1$) of first magnetic layer: 50 nm
Compensation temperature ($T_{comp1}$) of first magnetic layer: 180° C.
Coercive force ($H_{c2}$) of second magnetic layer: 15,000 Oe
Curie temperature ($T_{c2}$) of second magnetic layer: 160° C.
Saturation magnetization ($M_{s2}$) of second magnetic layer: 40 emu/cc
Film thickness ($h_2$) of second magnetic layer: 20 nm
Interface magnetic wall energy ($\sigma_w$): 2.2 erg/cm$^2$ This magnetooptical recording medium was rotated at 1,800 rpm, and as preliminary recording for optimizing the reproduction conditions, recording was performed at a radial position of 35 mm using binary laser beam outputs (Pb: 5 mW, Pa: 12 mW) while applying a magnetic field of 200 Oe upward. Note that the wavelength of a semiconductor laser was 780 nm. Note that the strength of the external magnetic field for magnetizing (initializing) the first magnetic layer upward was 2 kOe. The frequency of the recording signal was changed from 1.8 MHz to 7.4 MHz.

The recorded signal was reproduced while changing the output of the reproduction beam from 1 mW to 3 mW.

At this time, the reproduction beam output was set to be constant, and a magnetic field was applied downward while its strength was changed from 0 to 500 Oe. The inner temperature of the apparatus at that time was 40.5° C.

When the strength of the magnetic field which was applied downward was changed while reproducing the recorded signal using a constant reproduction beam of 1 mW, recorded information in the second magnetic layer began to be transferred from about 100 Oe (the amplitude of a reproduced signal began to increase), and when a magnetic field of 150 to 200 Oe was applied, the amplitude of the reproduced signal became maximal at all recording frequencies from 1.8 MHz to 7.4 MHz. When the strength of the magnetic field was further increased, a decrease in amplitude of the reproduced signal (a decrease in carrier level) and an increase in noise in the reproduced signal (an increase in noise level) occurred, and the tendency of a decrease in C/N ratio at the respective recording frequencies was observed. In particular, as the signal had a higher recording frequency, a decrease in C/N ratio became more conspicuous. For example, since the mark length of a recording signal pit of 7.4 MHz is about 0.4 μm, and is considerably smaller than the reproduction beam spot size, the transfer area of recorded information in the second magnetic layer is widened, and a mask effect (super resolution effect) is reduced, thus causing an interference between recording pits.

It was found that, in order to confirm if the reproduction magnetic field to be applied and the reproduction laser output are optimized and the super-resolution reproduction is realized, a reproduction signal of a recording pit string in a frequency range including the highest frequency (a pit with the shortest mark length) need only be checked. Similarly, a recording pit string at a frequency of 7.4 MHz was reproduced while increasing the reproduction beam output from 1 mW to 3 mW at 0.5-mW intervals. At the same time, a magnetic field was applied downward while changing its strength from 0 to 300 Oe.

The amplitudes of reproduced signals and the magnitudes of noise components under the respective conditions were evaluated. As the reproduction beam output increases, both the amplitude of the reproduced signal and the magnitude of noise increase. For this reason, evaluation was made on the basis of a value (arbitrary value) obtained by dividing the amplitude and noise width on an oscilloscope with the output value of the reproduction beam, i.e., a modulation factor.

At the same time, the C/N ratios at respective reproduced signal frequencies were measured and evaluated using a spectrum analyzer.

Within the ranges of the magnetic field and the laser beam output, in which a value obtained by normalizing the reproduced signal amplitude, i.e., the modulation factor became maximal, the measured C/N ratio was 42 dB or higher, and super-resolution reproduction was satisfactorily performed. The results are summarized in Table 1 below.

TABLE 1

| Magnetic Field Strength (Oe) | 150 | 200 |
|---|---|---|
| Laser Beam Output (mW) | 1.0 to 2.0 | 1.0 to 1.5 |

When the laser beam output was 2.5 mW or higher, a recording pit in the second magnetic layer was influenced by heat, and a decrease in carrier level and an increase in noise occurred.

When the bias magnetic field upon reproduction was 250 Oe or higher, transfer of the magnetization of the second magnetic layer to the first magnetic layer also occurred in a portion around the beam spot, and a super-resolution effect could not be obtained, thus causing a decrease in carrier and an increase in noise.

As can be seen from Table 1, a good C/N ratio can be obtained by setting the reproduction magnetic field strength to fall within a range from 150 to 200 Oe, and by setting the laser beam output to fall within a range from 1.0 to 2.0 mW when the reproduction magnetic field strength is 150 Oe; or by setting the laser beam output to fall within a range from 1.0 to 1.5 mW when the reproduction magnetic field strength is 200 Oe.

Then, the same reproduction experiments as described above were conducted by changing the inner temperature of a recording/reproduction apparatus from 10° C. to 50° C. by adjusting the air temperature in a thermostatic laboratory. Table 2 below summarizes the ranges of the magnetic field and the laser beam in which the value obtained by dividing the reproduction signal amplitude with the reproduction laser output value become maximal, and a C/N ratio of 42 dB or higher is obtained.

TABLE 2

| Inner Temperature (°C.) | Laser Beam Output (mW) | Magnetic Field Strenght (Oe) |
|---|---|---|
| 10 | 1.0 to 2.0 | 150 to 200 |
| 20 | 1.0 to 1.5 | 150 to 200 |
| 30 | 1.0 to 1.5 | 150 |
| 40 | 1.0 | 100 to 200 |
| 50 | 1.0 | 100 to 150 |

As can be seen from Table 2, as the inner temperature increases, the laser beam output and the magnetic field strength must be set to be smaller. The same reproduction experiments as described above were conducted by changing the rotational speed of the magnetooptical recording medium. Note that the reproduction radial position was 35 mm. Table 3 below summarizes the ranges of the magnetic field and the laser beam in which the value obtained by dividing the reproduction signal amplitude with the reproduction laser output value become maximal, and a C/N ratio of 42 dB or higher is obtained.

TABLE 3

| Rotational Speed (rpm) | Laser Beam Output (mW) | Magnetic Field Strength (Oe) |
| --- | --- | --- |
| 900 | 1.0 | 150 to 200 |
| 1,200 | 1.0 to 1.5 | 150 to 200 |
| 1,800 | 1.0 to 1.5 | 150 to 200 |
| 2,400 | 1.0 to 1.5 | 150 to 200 |
| 3,600 | 1.5 to 2.0 | 150 to 250 |

As can be seen from Table 3, as the rotational speed (linear velocity) increases, the laser beam output must be increased. Also, as can be seen from Table 3, the magnetic field strength need not be changed so largely even when the rotational speed changes.

In order to optimize the magnetic field and laser power upon reproduction, jitter (a shift of a reproduced signal from a reference time) of the reproduced signal may be evaluated in place of evaluation of the reproduced signal amplitude.

A pit string as a reference for a reproduced signal is formed in advance as pre-pits on the substrate at a predetermined position (a radial position of 35 mm in this example) on the magnetooptical recording medium.

The inner temperature of the apparatus is set to be constant (37° C. in this example) by adjusting the air temperature in a thermostatic laboratory, and a predetermined pit string for preliminary recording, which string includes a pit with the shortest mark length, is recorded at the predetermined position in synchronism with time signals of the pre-pits under the recording conditions which can minimize reproduction jitter at the predetermined inner temperature of 37° C. (in this example, Pb: 5 mW, Pa: 12 mW, and the recording bias magnetic field: 200 Oe).

Then, the edges of pits of the reproduced signals are detected by changing the magnetic field and laser output upon reproduction as in the above-mentioned experiments. These edges correspond to points which yield zeros upon calculation of quadratic differentials of the reproduced signals with respect to time.

Similarly, the central positions of pits of the reproduced signals are detected while changing the magnetic field and laser output upon reproduction. These positions correspond to maximal and minimal points in a change in reproduction signal over time.

Conditions which can minimize a time difference between these detected reproduced pit positions and the positions of the predetermined pit string including the pit with the shortest mark length as recording signals can be selected as optimal conditions upon reproduction.

As the pit string including the shortest mark, a pit string (a signal pattern of 0/1 information) as information to be recorded in preliminary recording, and a pit string as a magnetic domain pattern on the medium obtained by recording preliminary recording information on the medium are present. Upon evaluation of jitter, a shift between these patterns (as for the magnetic domain pattern, based on signals obtained by reproducing the pattern) along the time base is checked.

Table 4 below shows the measurement results. In this case, a continuous pit string each pit having a mark length of 0.65 µm was reproduced at a rotational speed of 1,800 rpm.

It is possible to record a pit string by setting the inner temperature to be a predetermined temperature if it is done upon, e.g., delivery inspection of magnetooptical recording media.

TABLE 4

| Edge Shift (nsec) | Postion Shift (nsec) | Magnetic Field (Oe) | Laser Power (mW) |
| --- | --- | --- | --- |
| 10 | 8 | 50 | 1.0 |
| 8 | 6 | 100 | 1.0 |
| 5 | 3 | 150 | 1.0 |
| 5 | 3 | 200 | 1.0 |
| 8 | 5 | 300 | 1.0 |
| 20 | 12 | 300 | 2.0 |

As can be understood from the results shown in Table 4, jitter can be small under conditions of, e.g., a reproduction magnetic field of 150 to 200 Oe and a reproduction laser power of 1.0 mW. These results also agree with optimal reproduction conditions obtained based on the reproduced signal amplitude.

In this example, signals as a time reference for reproduced signals were recorded as pre-pits. In this case, it is desirable that a magnetooptical signal pit string for determining reproduction conditions be recorded in a given temperature environment so as not to increase jitter upon recording.

On the other hand, when a magnetooptical signal pit string for determining reproduction conditions is recorded immediately before reproduction, it is desirable to simultaneously write signals as a time reference for reproduced signals as magnetooptical pits.

By utilizing the above-mentioned results, the following control is possible to achieve.

A magnetooptical recording medium is prepared. The following data are recorded as information on a predetermined area.

TABLE 5-1

Inner Temperature 20° C.

| Radial Position | Reproduction Laser Power (mW) | Reproduction Magnetic Field (Oe) |
| --- | --- | --- |
| 35 mm | 2.0 | 150 |
| 40 mm | 2.0 | 150 |
| 45 mm | 2.2 | 150 |
| 50 mm | 2.2 | 150 |
| 55 mm | 2.4 | 150 |
| 60 mm | 2.4 | 150 |

TABLE 5-2

Inner Temperature 30° C.

| Radial Position | Reproduction Laser Power (mW) | Reproduction Magnetic Field (Oe) |
| --- | --- | --- |
| 35 mm | 1.8 | 150 |
| 40 mm | 1.8 | 150 |
| 45 mm | 2.0 | 150 |
| 50 mm | 2.0 | 150 |
| 55 mm | 2.2 | 150 |
| 60 mm | 2.2 | 150 |

After information is recorded on this magnetooptical recording medium, the inner temperature of a recording/reproduction apparatus is detected by a temperature sensor arranged inside the apparatus. At the same time, optimal values of the reproduction laser power and magnetic field at respective inner temperatures, which are recorded in advance in the predetermined area, are read, and are set as reproduction conditions. As the temperature sensor for detecting the inner temperatures, a thermocouple, a thermistor, or the like can be used, and can detect the inner temperature as a voltage signal.

Since optimal reproduction conditions (the reproduction power and reproduction magnetic field) change depending on the radial position and the inner temperature, if detailed data are recorded in correspondence with various conditions, a huge amount of data must be recorded. In this case, coarse data may be recorded, and reproduction conditions may be determined by calculating data at the corresponding radial position and inner temperature by, e.g., an interpolation method.

For example, if the inner temperature is 25° C., in order to reproduce information at the radial position of 37.5 mm, since 1.9 mW and 150 Oe at 25° C. and a radial position of
  35 mm, and 1.9 mW and 150 Oe at 25° C. and a radial position of 40 mm by interpolation,
there are obtained 1.9 mW and 150 Oe at 25° C. at the radial position of 37.5 mm by interpolation.

From the above-mentioned results, it is effective to determine reproduction conditions of recorded information by the following methods.

(1) Prior to reproduction of recorded information, a pit string including the shortest mark is recorded at a predetermined position on a magnetooptical recording medium, and the reproduced signal amplitude is detected while changing the reproduction magnetic field to be applied and the reproduction laser power, thereby determining a reproduction magnetic field to be applied and reproduction laser power.

(2) Prior to reproduction of recorded information, a pit string including the shortest mark is recorded at a predetermined position on a magnetooptical recording medium, and jitter of the reproduced signal is detected while changing the reproduction magnetic field to be applied and the reproduction laser power, thereby determining a reproduction magnetic field to be applied and reproduction laser power.

(3) Prior to reproduction of recorded information, a pit string to be recorded at a predetermined position of a magnetooptical recording medium is formed to have accurate shapes upon, delivery inspection of the magnetooptical recording medium in an environment in which the inner temperature of a recording/reproduction apparatus is controlled to be constant, and the laser power and the bias magnetic field upon recording are controlled to be constant.

(4) As can be seen from the results of this example, an optimal reproduction magnetic field and reproduction laser power can be determined if the linear velocity of the magnetooptical recording medium and the inner temperature of a recording/reproduction apparatus are determined. Thus, the values of optimal reproduction laser power and reproduction magnetic field corresponding to changes in inner temperature and linear velocity are recorded as data at a predetermined position of a magnetooptical recording medium without performing write tests as in the methods (1) to (3). Prior to reproduction of a series of recorded information, the inner temperature and the radial position of the medium are detected to determine an optimal reproduction magnetic field to be applied and reproduction laser power, and thereafter, information is reproduced.

[Fifth Embodiment]

Figure 27:
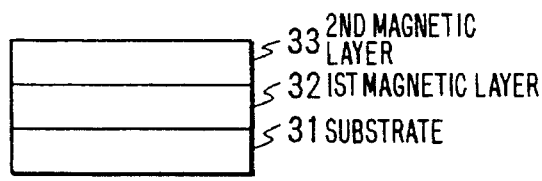
FIG. 27 is a schematic sectional view showing an example of the layer structure of a magnetooptical recording medium according to the fifth embodiment of the present invention.

FIG. 27 is a schematic sectional view showing an example of the layer structure of a magnetooptical recording medium according to the present invention. The magnetooptical recording medium shown in FIG. 27 is constituted by laminating first and second magnetic layers 32 and 33 in turn on a substrate 31. In this recording medium, a recording/reproduction laser beam is incident from the substrate 31 side. Note that these layers satisfy the following conditions:

$H_{c2} > H_i > H_{c1}$ $H_{c2} > \sigma_w / 2M_{s2} h_2$ $H_{c1} > \sigma_w / 2M_{s1} h_1$ Room Temperature $< T_{comp1} < T_{c1}$ $T_{c2} < T_{c1}$ $H_{c1}(RT) - \sigma_w(RT)/2M_{s1}(RT)h_1$ (at room temperature) $> H_{c1}(R) - \sigma_w(R)/2M_{s1}(R)h_1$ (upon reproduction)

where $H_{c1}$ and $H_{c2}$ are respectively the coercive forces of the first and second magnetic layers; $T_{c1}$ and $T_{c2}$, are the Curie temperatures of the first and second magnetic layers; $h_1$ and $h_2$, are the film thicknesses of the first and second magnetic layers; $T_{comp1}$, is the compensation temperature of the first magnetic layer; and $\sigma_w$, is the interface magnetic wall energy between the first and second magnetic layers. $H_{c1}(RT)$ and $M_{s1}(RT)$ respectively represent the coercive force and saturation magnetization of the first magnetic layer at room temperature. $H_{c1}(R)$ and $M_{s1}(R)$ respectively represent the coercive force and saturation magnetization of the first magnetic layer at a temperature upon reproduction. $\sigma_w(RT)$ and $\sigma_w(R)$ represent the interface magnetic wall energy at the room temperature and at a temperature upon reproduction, respectively.

Each of the first and second magnetic layers 32 and 33 comprises a perpendicular magnetic film consisting of an amorphous alloy of a rare earth element (Tb, Dy, Gd, Nd, Ho, or the like) and an iron-group transition metal (Fe, Co, Ni, or the like), and an exchange-coupling force acts between these two layers.

As the substrate 31, known materials such as glass, a glass member with a guide track consisting of an ultraviolet setting resin, polycarbonate, polymethyl methacrylate, an epoxy-based resin, and the like can be used without any limitations.

Figure 29:
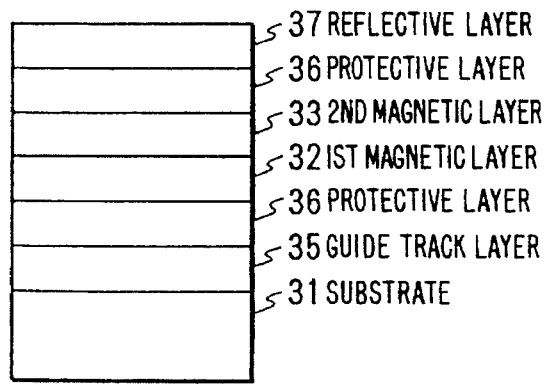
FIG. 29 is a schematic sectional view showing another example of the layer structure of the magnetooptical recording medium according to the fifth embodiment of the present invention.

FIG. 29 is a schematic sectional view showing another example of the layer structure of the magnetooptical recording medium used in the present invention. The magnetooptical recording medium shown in FIG. 29 is constituted by laminating a guide track layer 35, a protective layer 36, first and second magnetic layers 32 and 33, another protective layer 36, and a reflective layer 37 in turn on a substrate 31.

Furthermore, an intermediate layer having a function of adjusting the exchange-coupling force may be formed between the magnetic layers, and a magnetic layer for adding another function may be formed (e.g., a magnetic layer having a high Curie temperature and a large magnetooptical effect may be formed on the side of the substrate 31 with respect to the first magnetic layer 32).

Furthermore, two media each having the above-mentioned structure may be adhered to each other to constitute a double-side recordable medium.

Figure 31:
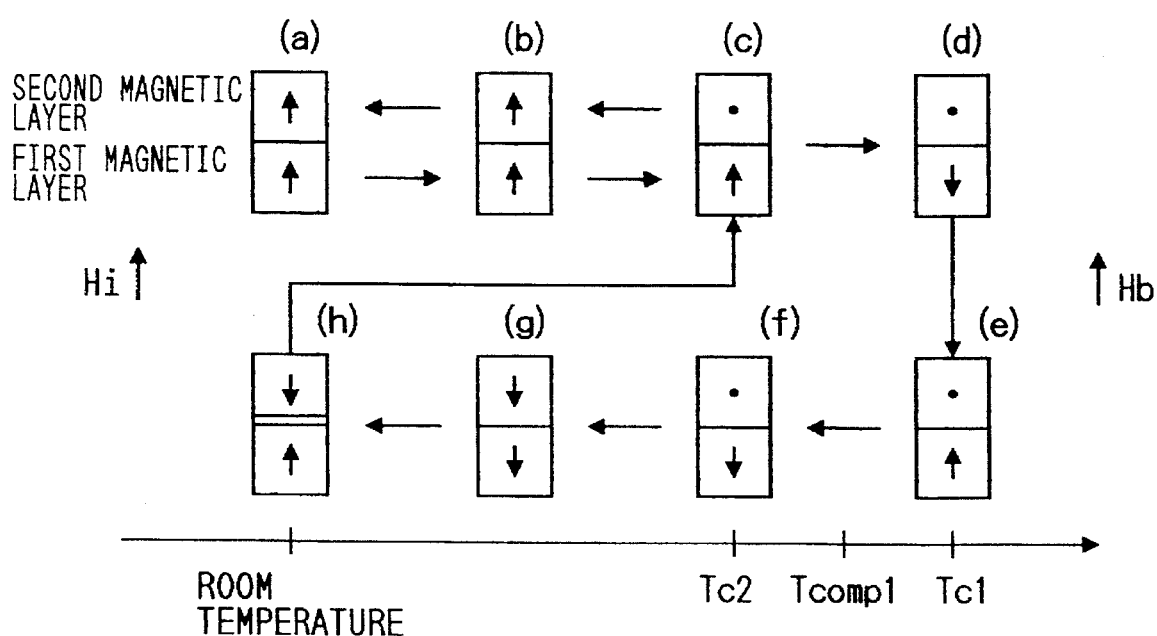
FIG. 31 is a state transition chart showing an example of a magnetooptical recording method according to the fifth embodiment of the present invention.

FIG. 31 is a state transition chart showing an example of a magnetooptical recording method of the present invention. Note that the sublattice magnetization of the rare earth element is dominant in both the first and second magnetic layers. When the magnetic moments of the two layers are parallel to each other, no interface magnetic wall is formed between the two layers.

Prior to magnetooptical recording, an external magnetic field Hi of 200 to 5,000 Oe is applied to align the magnetic moment of the first magnetic layer in one direction (upward in this case). This operation is so-called initialization processing ((a), (h) of FIG. 31).

When the strength of the magnetic field Hi required for initialization is smaller than, e.g., 500 Oe, a recording magnetic field Hb may be commonly used in place of the external magnetic field Hi.

Then, a laser beam whose laser power is changed between binary levels in correspondence with a recording signal irradiates the medium applying the recording magnetic field Hb of about 50 to 500 Oe in the same direction (upward) as the external magnetic field, thus achieving recording as follows.

When a laser beam of a low level Pb irradiates the medium (to be referred to as an L process hereinafter), the temperature of only a magnetic layer portion corresponding to the high-temperature portion of a laser spot rises to a temperature equal to or higher than the Curie temperature $T_{c2}$ of the second magnetic layer 33, and the magnetic moment of the second magnetic layer 33 disappears ((c) of FIG. 31).

When the laser spot moves and the temperature of the magnetic layer falls to room temperature, the state (a) in FIG. 31 is restored.

On the other hand, when a laser beam of a high level Pa irradiates the medium (to be referred to as an H process hereinafter), the temperature of only a magnetic layer portion corresponding to the high-temperature portion of the laser spot rises to a temperature equal to or higher than the compensation temperature $T_{comp1}$ of the first magnetic layer, and the sublattice magnetization of the transition metal becomes dominant in the first magnetic layer 32. As a result, the direction of the magnetic moment of the first magnetic layer 32 is reversed ((d) of FIG. 31). At this time, the direction of magnetization of the first magnetic layer 32 is reversed by the recording bias magnetic field Hb ((e) of FIG. 31). When the laser spot moves and the temperature of the corresponding portion falls to a temperature equal to or lower than the compensation temperature $T_{comp1}$ of the first magnetic layer 32, the sublattice magnetization of the rare earth element becomes dominant again in the first magnetic layer 32, and the direction of the magnetic moment of the first magnetic layer 32 is reversed ((f) of FIG. 31).

When the temperature of the magnetic layer portion further falls to a temperature equal to or lower than the Curie temperature $T_{c2}$ of the second magnetic layer, magnetization appears in the second magnetic layer in the same direction as that of the sublattice magnetization of the first magnetic layer (so as not to form an interface magnetic wall) ((g) of FIG. 31).

When the magnetooptical recording medium is rotated and the magnetic layer portion passes the external magnetic field Hi, the direction of magnetization of the first magnetic layer is aligned in the upward direction, as shown in a state (h) of FIG. 31.

Figure 33:
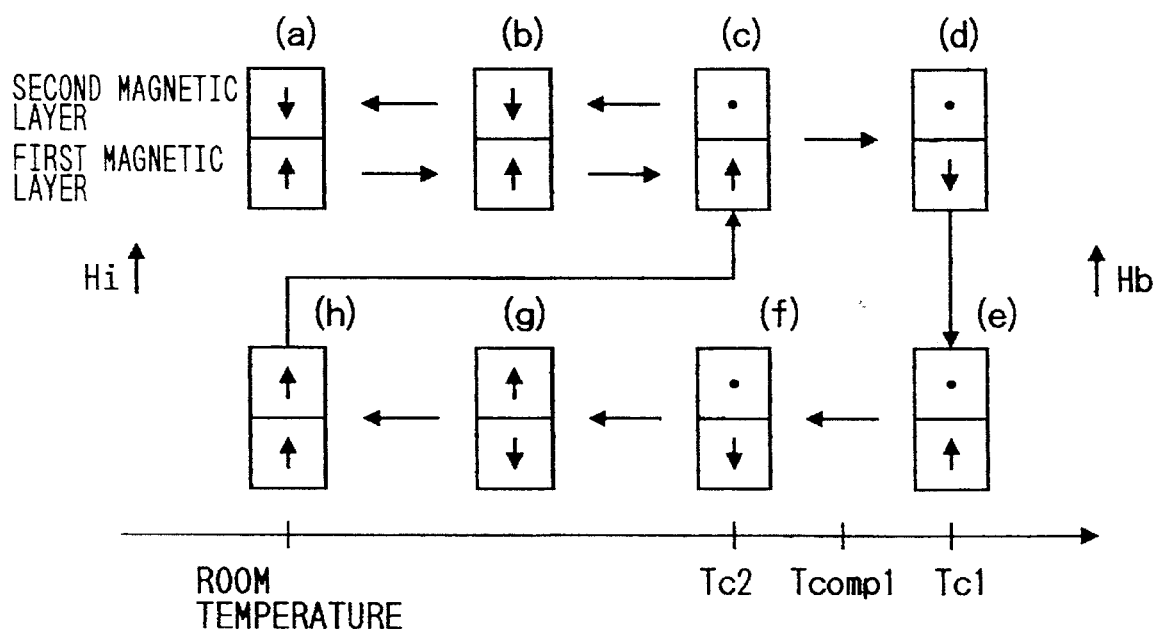
FIG. 33 is a state transition chart showing another example of the magnetooptical recording method according to the fifth embodiment of the present invention.

FIG. 33 is a state transition chart showing another example of the magnetooptical recording method of the present invention.

In this method, substantially the same recording operation as that shown in FIG. 31 is performed, except that a magnetooptical recording medium in which the sublattice magnetization of the rare earth element is dominant in the first magnetic layer and the sublattice magnetization of the transition metal is dominant in the second magnetic layer is used. In this case, when the magnetic moments of the two layers are anti-parallel to each other, no interface magnetic wall is formed between the two layers.

As shown in FIG. 33, states ((f) to (h) of FIG. 33) in a process wherein the temperature of the magnetic layer returns from the Curie temperature $T_{c2}$ of the second magnetic layer to room temperature in the H process are different from those shown in FIG. 31.

This is because the sublattice magnetization of the rare earth element is dominant in the first magnetic layer and the sublattice magnetization of the transition metal is dominant in the second magnetic layer, as described above.

Therefore, in a portion recorded in the H process, the magnetic moments of the first and second magnetic layers are parallel to each other (in the upward direction in this case), and an interface magnetic wall is formed between the two layers, as shown in a state (h) of FIG. 33.

With the above-mentioned recording method, according to the present invention, a recording bit having a size equal to or smaller than the diffraction limit of the laser beam can be formed by an overwrite method.

Figure 37A:
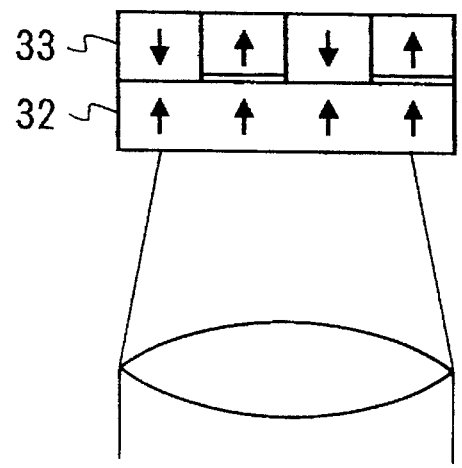
FIGS. 37A and 37B are views for explaining an example of a reproduction method of magnetooptically recorded information according to the fifth embodiment of the present invention.
Figure 37B:
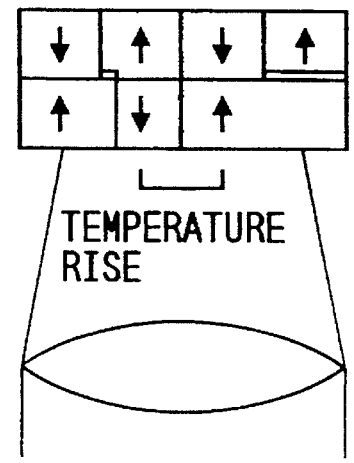

FIGS. 37A and 37B show an example of a reproduction method of a magnetooptical recording medium (based on FIG. 33) according to the present invention.

Upon completion of the above-mentioned recording operation of the present invention, the magnetic moments in all the recorded portions of the first magnetic layer are aligned upward, as shown in FIG. 37A, and it is difficult to reproduce recorded information from the second magnetic layer even when a reproduction beam is irradiated.

For this reason, upon irradiation by the reproduction beam, the direction of the recording magnetic field Hb shown in FIG. 31 or 33 is reversed to the downward direction, and the strength of the magnetic field is set to satisfy a condition:

$$H_{c1} - \sigma_w 12/2M_{s1}h_1 > Hb > H_{c1}(R) - \sigma_w 12(R)/2M_{s1}(R)h_1$$

where $H_{c1}(R)$ is the coercive force of the first magnetic layer at a reproduction temperature R; $\sigma_w(R)$, the interface magnetic wall energy between the first and second magnetic layers at the reproduction temperature R; and $M_{s1}(R)$, the magnitude of the saturation magnetization of the first magnetic layer at the reproduction temperature R.

Of the conditions of the magnetic field Hb given by the above relation, a condition $H_{c1} - \sigma_w/2M_{s1}h_1 > Hb$ defines a condition for preventing the magnetic moment of the first magnetic layer from being reversed by only the magnetic field applied upon reproduction.

Of the conditions of the magnetic field Hb Given by the above relation, a condition $Hb > H_{c1}(R) - \sigma_w(R)/2M_{s1}(R)h_1$ defines a condition for satisfactorily transferring a pit magnetic domain formed in the second layer to the first magnetic layer upon reproduction. In the recording medium of the present invention, the composition of the first magnetic layer changes in the direction of film thickness. More specifically, in the first magnetic layer, the sublattice magnetization of the rare earth element is dominant, and the ratio of the transition metal element increases as the position is separated farther from the interface between the first and second magnetic layers (as the position becomes closer to the substrate). As for the magnetic characteristics of the first magnetic layer, in a portion on the side of the substrate separated farther from the interface between the first and second magnetic layers, since the compensation temperature $T_{comp1}$ is lowered and close to room temperature (e.g., 50° C. to 100° C.), the coercive force $H_{c1}$ increases (e.g., 2 to 10 kOe).

In contrast to this, in a portion near the interface between the first and second magnetic layers, which portion has a conventional composition, the compensation temperature is set to be as high as 100° C. to 200° C. to allow stable binary recording, and the coercive force is set to be as high as 0.5 to 2 kOe to allow initialization.

In the first magnetic layer film, since these portions are strongly exchange-coupled in the direction of film thickness, they exhibit characteristics as a single magnetic film.

This effect will be explained below with reference to FIG. 35.

Figure 35:
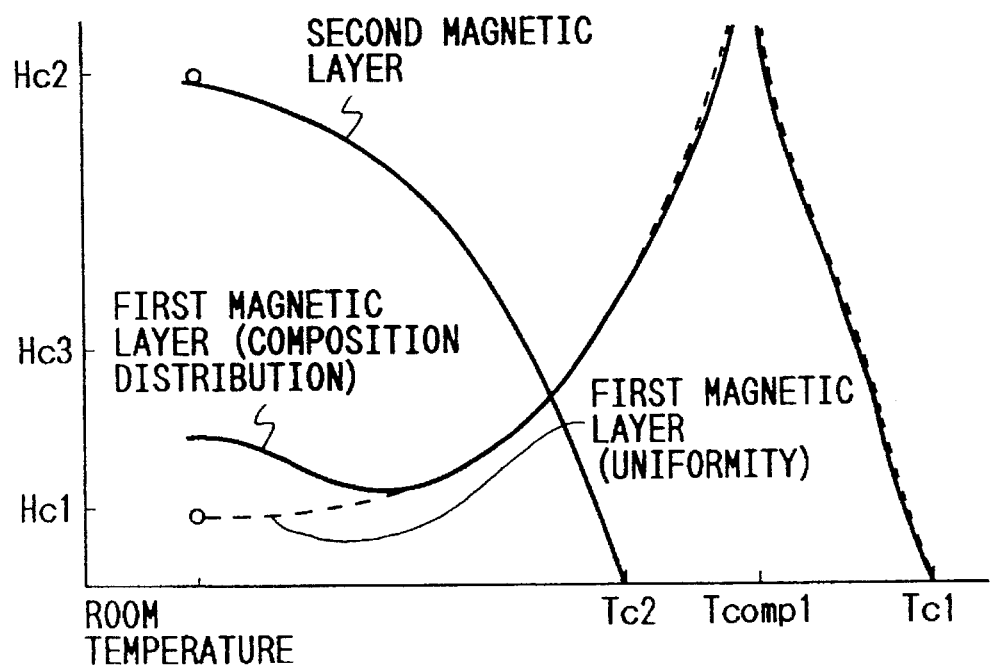
FIG. 35 is a graph showing the temperature characteristics of the coercive force of a magnetooptical recording layer according to the fifth embodiment of the present invention.

FIG. 35 shows changes in the coercive force of the respective magnetic layers upon an increase in temperature from the states (a) to (c) in FIG. 31 or 33.

In FIG. 35, solid curves represent the measurement results of single-layered film samples of the first and second magnetic layers, and a dotted curve represents the measurement result of the first magnetic film in a conventional uniform film state (the film composition is one located near the interface between the first and second magnetic layers).

As can be seen from FIG. 35, when the first magnetic layer is in a conventional uniform film state, the coercive force $H_{c1}$ increases up to the compensation temperature $T_{comp1}$, and the strength of the bias magnetic field $\sigma_w(t)/2M_{s1}(t)h_1$ by the exchange-coupling force between the first and second magnetic layers decreases to become zero at the Curie temperature of the second magnetic layer.

For this reason, the margin $H_{c1}(t)-\sigma_w(t)/2M_{s1}(t)h_1$ for the stable presence of a magnetic wall increases along with an increase in temperature if the temperature distribution in the reproduction beam spot and the like are not taken into consideration. In contrast to this, in a system with a composition distribution in the direction of film thickness in the first magnetic layer, as indicated by the solid curve, the coercive force abruptly decreases by the temperature rise from room temperature.

The coercive force, indicated by the solid curve, of the first magnetic layer exhibits a larger value than the coercive force (indicated by the dotted curve) $H_{c1}$ of the conventional first magnetic layer due to mixing of compositions having different compensation temperatures in the direction of film thickness. However, when the temperature increases and becomes higher than the compensation temperature of the film portion near the substrate, the coercive force abruptly decreases and assumes a minimal value, as shown in FIG. 35. Then, the coercive force approaches the value of $H_{c1}(t)$ (dotted curve).

In this case, the margin $H_{c1}(t)-\sigma_w(t)/2M_{s1}(t)h_1$ for the stable presence of a magnetic wall also assumes a minimal value at a temperature tmin at which the coercive force of the system having the composition distribution in the direction of film thickness becomes minimal. For this reason, a read magnetic field upon magnetic super-resolution reproduction is set to satisfy the following condition, so that the margin assumes a negative value (to transfer a pit formed in the second magnetic layer to the first magnetic layer) at this temperature:

$$Hb > H_{c1}(tmin) - \sigma_w 12(tmin)/2M_{s1}(tmin)h_1$$

As described above, overwrite recording and magnetic super-resolution reproduction can be realized under predetermined conditions and method using the recording medium having the first and second magnetic layers of the present invention.

[Experimental Example 5]

An experimental example of the present invention will be described in detail below.

A 60-nm thick dielectric protective film consisting of $Si_3N_4$ was formed by a sputtering method on a polycarbonate substrate having a thickness of 1.2 mm and a diameter of 130 mm, and a 50-nm thick Gd-Dy-Fe-Co first magnetic layer was formed thereon. Then, a 20-nm thick second magnetic layer consisting of $Dy_{12}Tb_{10}Fe_{70}Co_8$ (at %) was formed on the first magnetic layer, and a 40-nm Al heat sink layer was formed on the second magnetic layer. Furthermore, a 60-nm thick dielectric protective film consisting of $Si_3N_4$ was formed on the heat sink layer, thus ending sputtering. Finally, an acrylate-based resin protective layer was formed by spin coating, thus obtaining a magnetooptical recording medium.

The composition of the first magnetic layer was $(Gd_{50}DY_{50})_{20}(Fe_{80}Co_{20})_{80}$ (at %) at the interface with the $Si_3N_4$ film, and was $(Gd_{50}Dy_{50})_{24}(Fe_{80}Co_{20})_{76}$ (at %) at the interface with the second magnetic layer.

The characteristics and the like of this medium are as follows.

Film characteristics of first magnetic layer/second magnetic layer interface (those of $(Gd_{50}DY_{50})_{24}(Fe_{80}Co_{20})_{76}$ (at %) film)

Coercive force ($H_{c1}$): 500 Oe

Curie temperature ($T_{c1}$): 230° C.

Saturation magnetization ($M_{s1}$): 220 emu/cc

Compensation temperature ($T_{comp1}$): 180° C.

Film characteristics of first magnetic layer/$Si_3N_4$ film interface (those of $(Gd_{Dy50})_{20}(Fe_{80}Co_{20})_{80}$ (at %) film)

Coercive force ($H_{c1}$): 4,000 Oe

Curie temperature ($T_{c1}$): 250° C.

Saturation magnetization ($M_{s1}$): 150 emu/cc

Compensation temperature ($T_{comp1}$): 50° C.

Film characteristics of entire first magnetic layer

Coercive force ($H_{c1}$): 1,000 Oe

Curie temperature ($T_{c1}$): 240° C.

Saturation magnetization ($M_{s1}$): 190 emu/cc

Compensation temperature ($T_{comp1}$): 180° C.

Coercive force ($H_{c2}$) of second magnetic layer: 15,000 Oe

Curie temperature ($T_{c2}$) of second magnetic layer: 160° C.

Saturation magnetization ($M_{s2}$) of second magnetic layer: 40 emu/cc

Film thickness ($h_2$) of second magnetic layer: 20 nm

Interface magnetic wall energy ($\sigma_w 12$) between first and second magnetic layers: 2.2 erg/cm$^2$ This magnetooptical recording medium was rotated at 1,800 rpm, and recording was performed at a radial position of 35 mm by binary recording power (Pb: 6 mW, Pa: 12 mW) using a laser having a wavelength of 780 nm while applying a magnetic field of 200 Oe upward. Note that the strength of the external magnetic field for magnetizing (initializing) the first magnetic layer upward was 3 kOe.

Note that the apparent coercive force of the first magnetic layer film was about 1 kOe. Upon recording, the frequency of a recording signal was changed from 1.8 MHz to 7.4 MHz.

Upon reproduction of a recorded signal, the reproduction beam output was changed from 1 mW to 3 mW to obtain a reproduction beam spot, and a magnetic field was applied downward while changing its strength from 0 to 500 Oe.

As a result, high reproduced signal quality with a C/N ratio of 44 dB or higher could be obtained for, e.g., a recorded signal of 7.4 MHz (mark length of about 0.4 μm)

over wide ranges of the applied magnetic field (70 to 220 Oe) and the reproduction laser power (1.0 to 2.0 mW).

When the same recording/reproduction experiments were conducted for a sample disk in which the first magnetic layer was formed to have a uniform composition at the interface with the second magnetic layer and a thickness of 50 nm, a high reproduction C/N ratio was obtained from narrow ranges of the applied magnetic field (150 Oe) and the reproduction power (1.0 to 2.0 mw).

[Sixth Embodiment]

Figure 26:
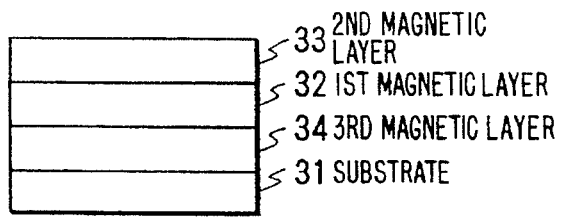
FIG. 26 is a schematic sectional view showing an example of the layer structure of a magnetooptical recording medium according to the sixth embodiment of the present invention.

FIG. 26 is a schematic sectional view showing an example of the layer structure of a magnetooptical recording medium used in the present invention. The magnetooptical recording medium shown in FIG. 26 is constituted by sequentially laminating a third magnetic layer 34, a first magnetic layer 32, and a second magnetic layer 33 on a substrate 31. In this recording medium, a recording/reproduction laser beam is incident from the side of the substrate 31. Note that these magnetic layers satisfy the following conditions.

$H_{c2} > Hi > H_{c1}$ $H_{c3} > H_{c1}$ $H_{c1} > \sigma_w 12/2M_{s1}h_1, \sigma_w 13/2M_{s1}h_1$ $H_{c2} > \sigma_w 12/2M_{s2}h_2$ $H_{c3} < \sigma_w 13/2M_{s3}h_3$ Room Temperature $< T_{comp1} < T_{c1}$ $H_{c1}(RT) - \sigma_w 12(RT)/2M_{s1}(RT)h_1$ (at room temperature) $> H_{c1}(R) - \sigma_w 12(R)/2M_{s1}(R)h_1$ (upon reading)

$T_{c1} > T_{c2}, T_{c3}$ where $H_{c1}$, $H_{c2}$, and $H_{c3}$ are respectively the coercive forces of the first, second, and third magnetic layers; $T_{c1}$, $T_{c2}$, and $T_{c3}$, are the Curie temperatures of the first, second, and third magnetic layers; $h_1$, $h_2$, and $h_3$, are the film thicknesses of the first, second, and third magnetic layers; $T_{comp1}$, is the compensation temperature of the first magnetic layer; and $\sigma_w 12$ and $\sigma_w 13$, are the interface magnetic wall energies between the first and second magnetic layers and between the first and third magnetic layers. $H_{c1}(RT)$ and $M_{s1}(RT)$ respectively represent the coercive force and saturation magnetization of the first magnetic layer at room temperature. $H_{c1}(R)$ and $M_{s1}(R)$ respectively represent the coercive force and saturation magnetization of the first magnetic layer at a temperature upon reading. $\sigma_w 12(RT)$ and $\sigma_w 12(R)$ represent the interface magnetic wall energy at the room temperature and at a temperature upon reading, respectively. Each of the first, second, and third magnetic layers 32, 33, and 34 comprises a perpendicular magnetic film consisting of an amorphous alloy of a rare earth element (Tb, Dy, Gd, Nd, Ho, or the like) and an iron-group transition metal (Fe, Co, Ni, or the like), and an exchange-coupling force acts between each two adjacent layers.

As the substrate 31, known materials such as glass, a glass member with a guide track consisting of an ultraviolet setting resin, polycarbonate, polymethyl methacrylate, an epoxy-based resin, and the like can be used without any limitations.

Figure 28:
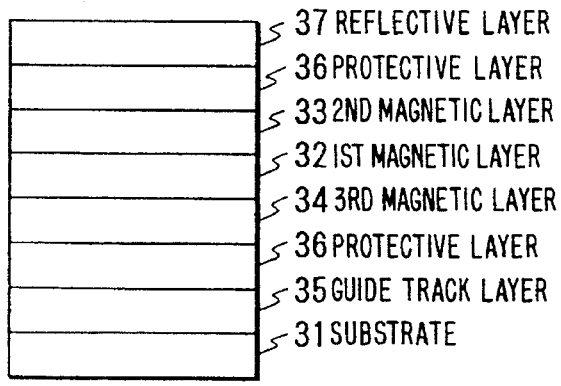
FIG. 28 is a schematic sectional view showing another example of the layer structure of the magnetooptical recording medium according to the sixth embodiment of the present invention.

FIG. 28 is a schematic sectional view showing another example of the layer structure of the magnetooptical recording medium used in the present invention. The magnetooptical recording medium shown in FIG. 28 is constituted by laminating a guide track layer 35, a protective layer 36, a third magnetic layer 34, a first magnetic layer 32, a second magnetic layer 33, another protective layer 36, and a reflective layer 37 in turn on a substrate 31.

Furthermore, an intermediate layer having a function of adjusting the exchange-coupling force may be formed between the magnetic layers, and a magnetic layer for adding another function may be formed (e.g., a magnetic layer having a high Curie temperature and a large magnetooptical effect may be formed on the side of the substrate 31 with respect to the third magnetic layer 34).

Furthermore, two media each having the above-mentioned structure may be adhered to each other to constitute a double-side recordable medium.

Figure 30:
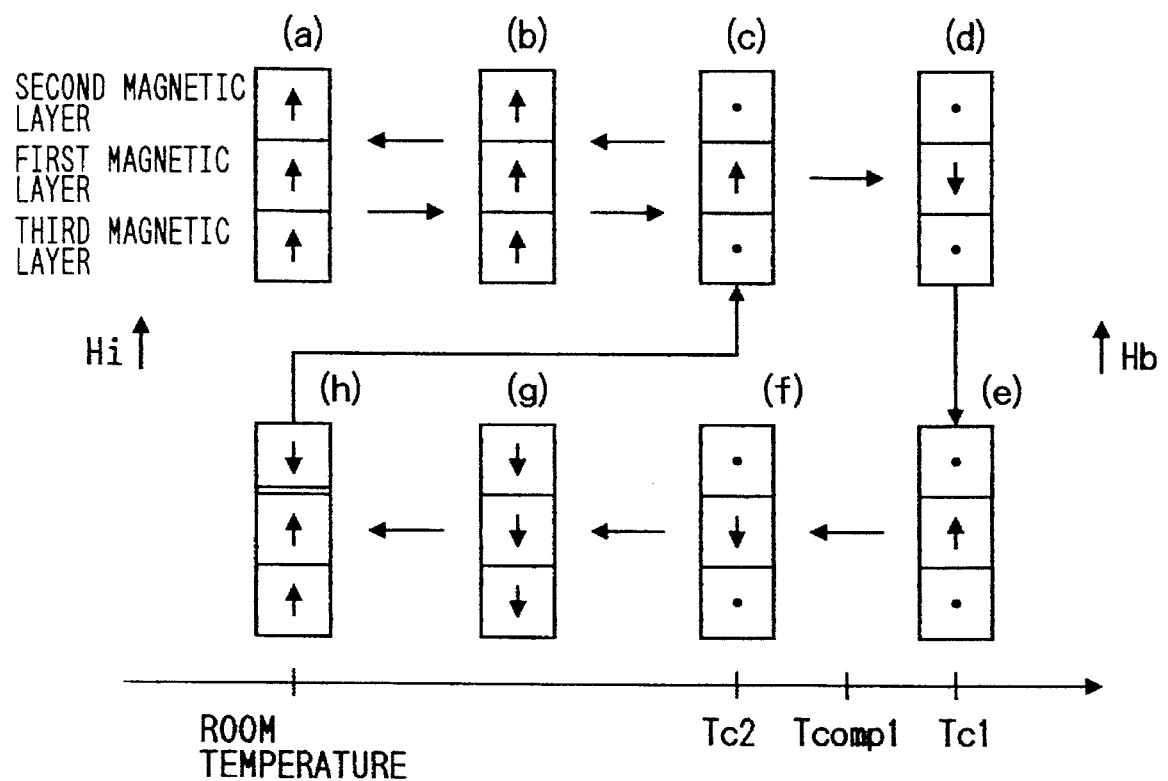
FIG. 30 is a state transition chart showing an example of a magnetooptical recording method according to the sixth embodiment of the present invention.

FIG. 30 is a state transition chart showing an example of a magnetooptical recording method of the present invention. Note that the sublattice magnetization of the rare earth element is dominant in all the first, second, and third magnetic layers. When the magnetic moments of each two adjacent layers are parallel to each other, no interface magnetic wall is formed between these two layers.

Prior to magnetooptical recording, an external magnetic field Hi of 200 to 5,000 Oe is applied to align the magnetic moment of the first magnetic layer 32 in one direction (upward in this case).

At this time, the magnetic moment of the third magnetic layer 34 which is strongly exchange-coupled to the first magnetic layer 32 is also aligned in that one direction. This processing is so-called initialization processing ((a), (h) of FIG. 30).

When the strength of the magnetic field Hi required for initialization is smaller than, e.g., 500 Oe, a recording magnetic field Hb may be commonly used in place of the external magnetic field Hi.

Then, a laser beam whose laser power is changed between binary levels in correspondence with a recording signal irradiates the medium while applying the recording magnetic field Hb of about 50 to 500 Oe in the same direction (upward) as the external magnetic field, thus achieving recording as follows.

When a laser beam of a low level Pb irradiates the medium (to be referred to as an L process hereinafter), the temperature of only a magnetic layer portion corresponding to the high-temperature portion of a laser spot rises to a temperature equal to or higher than the Curie temperature $T_{c2}$ of the second magnetic layer 33, and the magnetic moment of the second magnetic layer 33 disappears. At this time, since the third magnetic layer 34 has a Curie temperature lower than that of the second magnetic layer 33 in FIG. 28, the magnetic moment of the third magnetic layer 34 has already disappeared at a temperature lower than the temperature $T_{c2}$ ((c) of FIG. 30).

When the laser spot moves and the temperature of the magnetic layer falls to room temperature, the state (a) in FIG. 30 is restored.

On the other hand, when a laser beam of a high level Pa irradiates the medium (to be referred to as an H process hereinafter), the temperature of only a magnetic layer portion corresponding to the high-temperature portion of the laser spot rises to a temperature equal to or higher than the compensation temperature $T_{comp1}$ of the first magnetic layer 32, and the sublattice magnetization of the transition metal becomes dominant in the first magnetic layer 32. As a result, the direction of the magnetic moment of the first magnetic layer 32 is reversed ((d) of FIG. 30). At this time, the direction of magnetization of the first magnetic layer 32 is reversed by the recording bias magnetic field Hb ((e) of FIG. 30). When the laser spot moves and the temperature of the corresponding portion falls to a temperature equal to or lower than the compensation temperature $T_{comp1}$ of the first magnetic layer 32, the sublattice magnetization of the rare earth element becomes dominant again in the first magnetic layer 32, and the direction of the magnetic moment of the first magnetic layer 32 is reversed ((f) of FIG. 30).

When the temperature of the magnetic layer portion further falls to a temperature equal to or lower than the Curie temperature $T_{c2}$ of the second magnetic layer 33, magnetization appears in the second and third magnetic layers in the same direction as that of the sublattice magnetization of the first magnetic layer 32 (so as not to form an interface magnetic wall) ((g) of FIG. 30).

When the magnetooptical recording medium is rotated and the magnetic layer portion passes the external magnetic field Hi, the directions of magnetization of the first and third magnetic layers are aligned in the upward direction, as shown in a state (h) of FIG. 30.

Figure 32:
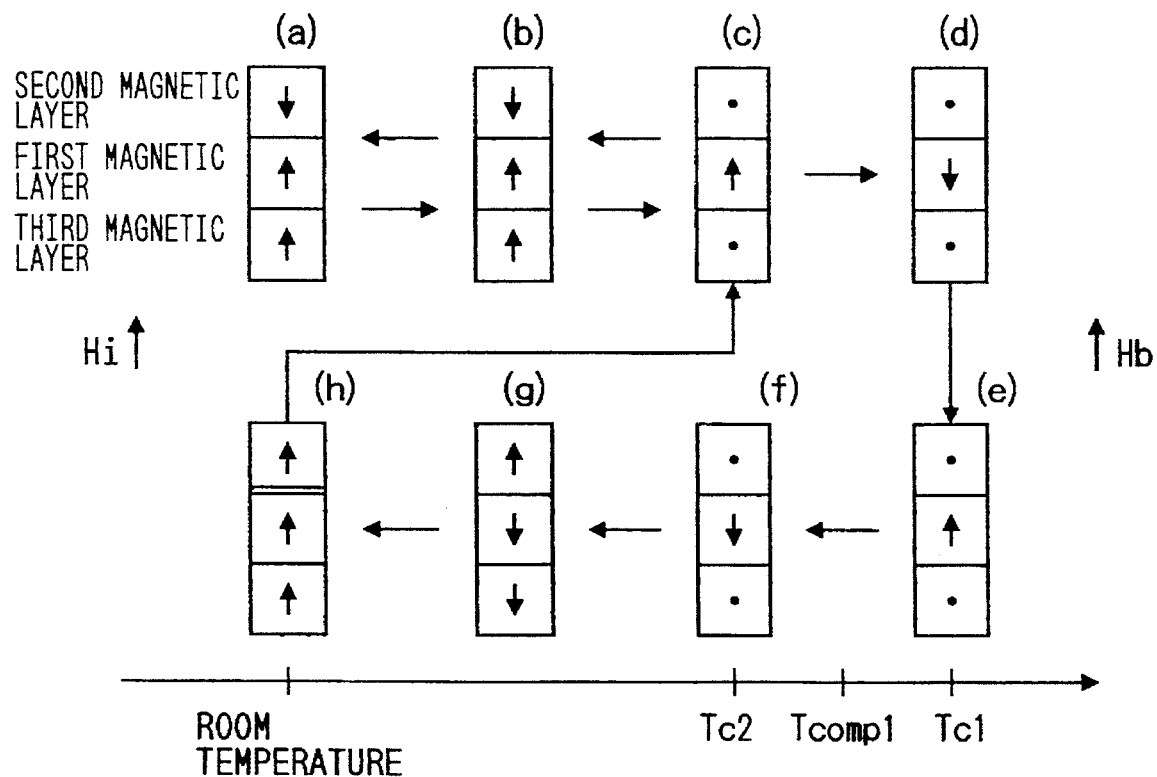
FIG. 32 is a state transition chart showing another example of the magnetooptical recording method according to the sixth embodiment of the present invention.

FIG. 32 is a state transition chart showing another example of the magnetooptical recording method of the present invention.

In this method, substantially the same recording operation as that shown in FIG. 30 is performed, except that a magnetooptical recording medium in which the sublattice magnetization of the rare earth element is dominant in the first and third magnetic layers and the sublattice magnetization of the transition metal is dominant in the second magnetic layer is used. In this case, when the magnetic moments of the first and third magnetic layers, and that of the second magnetic layer are anti-parallel to each other, no interface magnetic wall is formed between these layers.

As shown in FIG. 32, states ((f) to (h) of FIG. 32) in a process wherein the temperature of the magnetic layer returns from the Curie temperature $T_{c2}$ of the second magnetic layer to room temperature in the H process are different from those shown in FIG. 30.

This is because the sublattice magnetization of the rare earth element is dominant in the first and third magnetic layers and the sublattice magnetization of the transition metal is dominant in the second magnetic layer, as described above.

Therefore, in a portion recorded in the H process, the magnetic moments of the first and second magnetic layers are parallel to each other (in the upward direction in this case), and an interface magnetic wall is formed between the two layers, as shown in a state (h) of FIG. 32.

With the above-mentioned recording method, according to the present invention, a recording bit having a size equal to or smaller than the diffraction limit of the laser beam can be formed by an overwrite method.

Figure 36A:
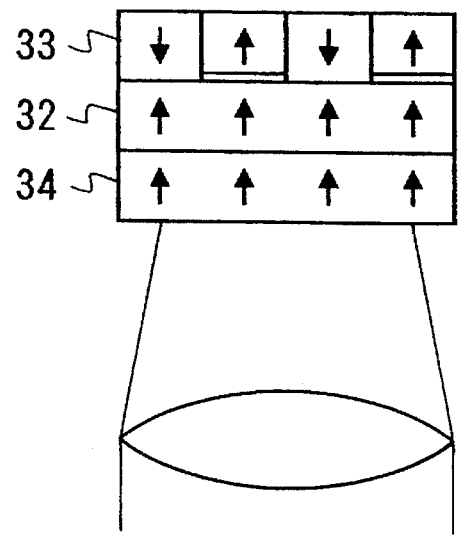
FIGS. 36A and 36B are views for explaining an example of a reproduction method of magnetooptically recorded information according to the sixth embodiment of the present invention.
Figure 36B:
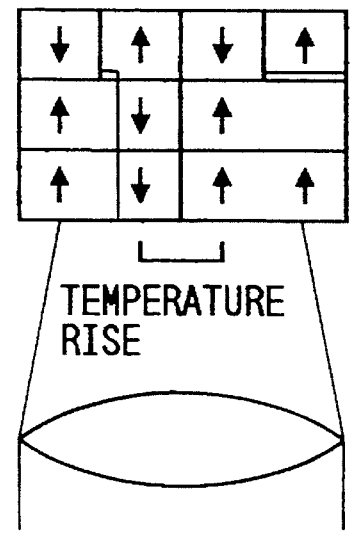

FIGS. 36A and 36B show an example of a reproduction method of magnetooptically recorded information (based on FIG. 32) according to the present invention.

Upon completion of the above-mentioned recording operation of the present invention, the magnetic moments in all the recorded portions of the third and first magnetic layers are aligned upward, as shown in FIG. 36A, and it is difficult to reproduce recorded information from the second magnetic layer even when a reproduction beam irradiates the medium.

For this reason, upon irradiation by the reproduction beam, the direction of the recording magnetic field Hb shown in FIG. 30 or 32 is reversed to the downward direction, and the strength of the magnetic field is set to satisfy a condition:

$$H_{c1}-\sigma_w 12/2M_{s1}h_1 > Hb > H_{c1}(t) - \sigma_w 12(t)/2M_{s1}(t)h_1$$

Similarly, the following relation must be satisfied as a condition:

$$\sigma_w 13(t)/2M_{s3}(t)h_3 > H_{c3}(t)$$

where $H_{c1}(t)$ and $H_{c3}(t)$ are respectively the coercive forces of the first and third magnetic layers at a reproduction temperature t; $\sigma_w 12(t)$ and $\sigma_w 13(t)$, the interface magnetic wall energies between the first and second magnetic layers and between the first and third magnetic layers at the reproduction temperature t; and $M_{s1}(t)$ and $M_{s3}(t)$, the magnitudes of the saturation magnetizations of the first and third magnetic layers at the reproduction temperature t.

Of the conditions of the magnetic field Hb given by the above relation, a condition $H_{c1}-\sigma_w 12/2M_{s1}h_1 > Hb$ defines a condition for preventing the magnetic moment of the first magnetic layer from being reversed by only the magnetic field applied upon reproduction.

Of the conditions of the magnetic field Hb given by the above relation, a condition $Hb > H_{c1}(t) - \sigma_w 12(t)/2M_{s1}(t)h_1$ defines the following condition.

With the reproduction beam to be described in detail later, the central portion of the beam spot has the highest temperature, and the temperature rise of a portion around the spot is small.

The power of the reproduction beam is gradually increased to increase the temperature of the recording layer. If the temperature t of the recording layer is equal to room temperature, $H_{c1}(t) - \sigma_w 12(t)/2M_{s1}(t)h_1$ equals $H_{c1} - \sigma_w 12/2M_{s1}h_1$, and means a margin for the stable presence of a magnetic wall. The margin is normally a positive value (e.g., 200 to 500 Oe). For this reason, if the temperature t of the recording layer rises from room temperature and the value $H_{c1}(t) - \sigma_w 12(t)/2M_{s1}(t)h_1$ decreases even slightly, $Hb > H_{c1}(t) - \sigma_w 12(t)/2M_{s1}(t)h_1$ is satisfied. As a result, the magnetic moment of the first magnetic layer is reversed by the applied magnetic field Hb, and recorded information in the second magnetic layer is transferred to the first magnetic layer (at the same time, to the third magnetic layer).

When the value of the term of the margin for the stable presence of a magnetic wall, i.e., $H_{c1}(t) - \sigma_w 12(t)/2M_{s1}(t)h_1$ is relatively large at room temperature, and largely changes along with the temperature rise, if the strength of the reproduction magnetic field and the reproduction laser power are properly selected, recorded information in the second magnetic layer is transferred to the first magnetic layer at only the central portion of the beam spot where the temperature rises upon reproduction, thus realizing magnetic super-resolution reproduction.

However, when a change in value of the margin $H_{c1}(t) - \sigma_w 12(t)/2M_{s1}(t)h_1$ is small, a pit magnetic domain formed in the second magnetic layer cannot be satisfactorily transferred, and magnetic super-resolution reproduction is disturbed.

In the recording medium of the present invention, the third magnetic layer which has a larger coercive force and a lower Curie temperature than those of the first magnetic layer at room temperature is formed adjacent to the first magnetic layer.

This effect will be explained below with reference to FIG. 34.

Figure 34:
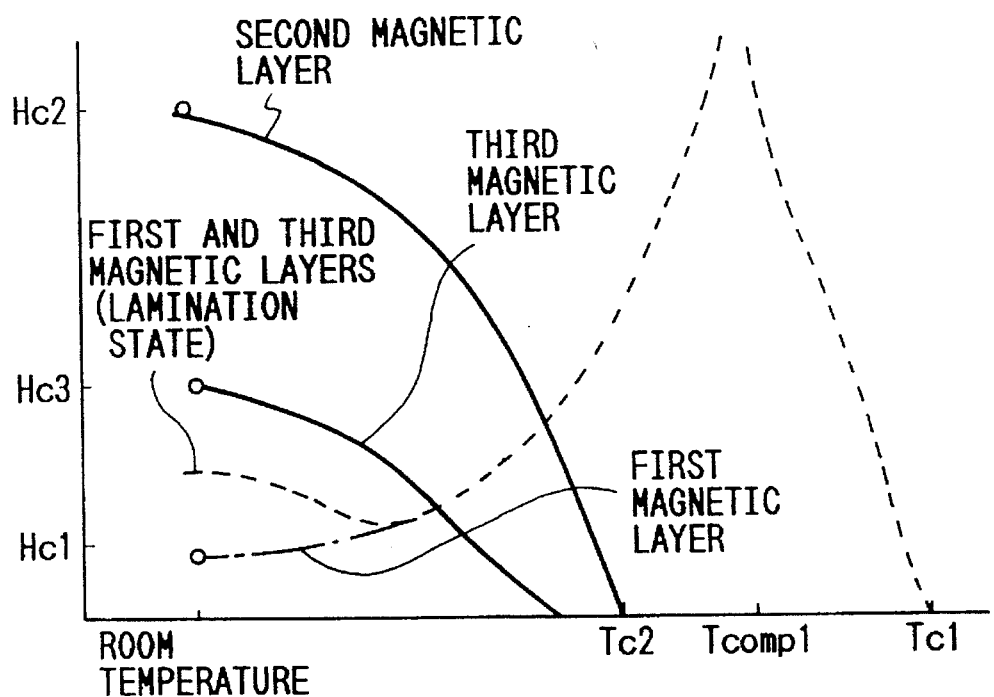
FIG. 34 is a graph showing the temperature characteristics of the coercive force of a magnetooptical recording layer according to the sixth embodiment of the present invention.

FIG. 34 shows changes in coercive force of the respective magnetic layers upon an increase in temperature from the states (a) to (c) in FIG. 30 or 32.

Since the first and third magnetic layers are strongly exchange-coupled to each other (the bias magnetic field based on exchange-coupling is larger than the difference between the coercive forces of the two layers), the directions of magnetization of the two layers are simultaneously reversed in measurement of a magnetization curve.

In FIG. 34, solid curves represent the measurement results of single-layered film samples of the first, second, and third magnetic layers. Also, a dotted curve represents the measurement result of a lamination state of the third and first magnetic layers.

As can be seen from FIG. 34, in the case of the first magnetic layer alone, its coercive force $H_{c1}$ increases up to the compensation temperature $T_{comp1}$, and the strength of the bias magnetic field $\sigma_w 12(t)/2M_{s1}(t)h_1$ by the exchange-coupling force between the first and second magnetic layers decreases to become zero at the Curie temperature of the second magnetic layer.

For this reason, it is difficult to consider that the margin $H_{c1}(t)-\sigma_w 12(t)/2M_{s1}(t)h_1$ for the stable presence of a magnetic wall decreases upon an increase in temperature if the temperature distribution in the reproduction beam spot is not taken into consideration.

Contrary to this, in a laminated system of the third and first magnetic layers indicated by the dotted curve, the coercive force and magnetization of the third magnetic layer abruptly decrease by the temperature rise from room temperature.

The apparent coercive force indicated by the dotted curve is $H_{c1}(t)+\sigma_w 13(t)/2M_{s1}(t)h_1$, and exhibits a larger value than $H_{c1}(t)$ by a bias based on the exchange-coupling force. However, $\sigma_w 13(t)$ abruptly increases by the temperature rise, and the coercive force of the laminated system indicated by the dotted curve assumes a minimal value, as shown in FIG. 34. Then, the coercive force approaches the value $H_{c1}(t)$.

The margin $H_{c1}(t)-\sigma_w 12(t)/2M_{s1}(t)h_1$ for the stable presence of a magnetic wall assumes a minimal value at a temperature tmin at which the coercive force of the laminated system indicated by the dotted curve becomes minimal. For this reason, a read magnetic field upon magnetic super-resolution reproduction is set to satisfy the following condition, so that the margin assumes a negative value (to transfer a pit formed in the second magnetic layer to the first magnetic layer) at this temperature:

$$Hb > H_{c1}(tmin) - \sigma_w 12(tmin)/2M_{s1}(tmin)h_1$$

As described above, overwrite recording and magnetic super-resolution reproduction can be realized under a predetermined condition and method using the recording medium having the first, second, and third magnetic layers of the present invention.

[Experimental Example 6]

An experimental example of the present invention will be described in detail below.

A 60-nm thick dielectric protective film consisting of $Si_3N_4$ was formed by a sputtering method on a polycarbonate substrate having a thickness of 1.2 mm and a diameter of 130 mm, and a 10-nm thick third magnetic layer consisting of $Dy_{25}Fe_{70}Co_5$ (at %) was formed on the protective film. A 25-nm thick first magnetic layer consisting of $Gd_{20}Dy_5Fe_{70}Co_8$ (at %) was formed on the third magnetic layer, and a 20-nm thick second magnetic layer consisting of $Dy_{12}Tb_{10}Fe_{70}Co_8$ (at %) was formed on the first magnetic layer. Furthermore, a 40-nm Al heat sink layer was formed on the second magnetic layer, and a 60-nm thick dielectric protective film consisting of $Si_3N_4$ was formed on the heat sink layer, thus obtaining a magnetooptical recording medium.

The characteristics and the like of this medium are as follows.

Coercive force ($H_{c1}$) of first magnetic layer: 500 Oe
Curie temperature ($T_{c1}$) of first magnetic layer: 230° C.
Saturation magnetization ($M_{s1}$) of first magnetic layer: 220 emu/cc
Film thickness ($h_1$) of first magnetic layer: 25 nm
Compensation temperature ($T_{comp1}$) of first magnetic layer: 180° C.
Coercive force ($H_{c2}$) of second magnetic layer: 15,000 Oe
Curie temperature ($T_{c2}$) of second magnetic layer: 160° C.
Saturation magnetization ($M_{s2}$) of second magnetic layer: 40 emu/cc
Film thickness ($h_2$) of second magnetic layer: 20 nm
Coercive force ($H_{c3}$) of third magnetic layer: 8,000 Oe
Curie temperature ($T_{c3}$) of third magnetic layer: 140° C.
Saturation magnetization ($M_{s3}$) of third magnetic layer: 120 emu/cc
Film thickness ($h_3$) of third magnetic layer: 10 nm
Interface magnetic wall energy ($\sigma_w 13$) between third and first magnetic layers: 2.5 erg/cm²
Interface magnetic wall energy ($\sigma_w 12$) between first and second magnetic layers: 2.2 erg/cm²

This magnetooptical recording medium was rotated at 1,800 rpm, and recording was performed at a radial position of 35 mm by binary recording power (Pb: 5 mW, Pa: 12 mW) using a laser having a wavelength of 780 nm while applying a magnetic field of 200 Oe upward. Note that the strength of the external magnetic field for magnetizing (initializing) the third and first magnetic layers upward was 2 kOe.

Note that the apparent coercive force of the laminated film of the third and first magnetic layers was about 1 kOe (this value is almost equal to $H_{c1}(500 \text{ Oe}) + \sigma_w 13/2M_{s1}h_1(500 \text{ Oe})$).

Also, a bias based on the exchange-coupling force from the interface with the second magnetic layer to the laminated film of the third and first magnetic layers was about 300 Oe (this value is almost equal to $\sigma_w 12/(2M_{s1}h_1 + 2M_{s3}h_3)$).

Upon recording, the frequency of a recording signal was changed from 1.8 MHz to 7.4 MHz. Upon reproduction of a recorded signal, the reproduction beam output was changed from 1 mW to 3 mW. Under such a reproduction beam spot, a magnetic field was applied downward while its strength was changed from 0 to 500 Oe.

As a result, high reproduced signal quality with a C/N ratio of 40 dB or higher could be obtained for, e.g., a recorded signal of 7.4 MHz (mark length of about 0.4 μm) over wide ranges of the applied magnetic field (50 to 200 Oe) and the reproduction laser power (1.0 to 2.0 mW).

When the same recording/reproduction experiments were conducted for a sample disk which was prepared following substantially the same procedures as above, except that no third magnetic layer was formed and the first magnetic layer was formed to have a thickness of 50 nm, a high reproduction C/N ratio was obtained from narrow ranges of the applied magnetic field (150 Oe) and the reproduction power (1.0 to 2.0 mW).

[Seventh Embodiment]

In the layer structure of a magnetooptical recording medium used in the present invention, a third magnetic layer 34, a first magnetic layer 32, and a second magnetic layer 33 are sequentially laminated on a substrate 31. In this recording medium, a recording/reproduction laser beam is incident from the substrate 31 side. Note that these magnetic layers satisfy the following conditions:

$$H_{c2} > Hb > H_{c1}$$

$$H_{c3} > H_{c1}$$

$H_{c1} > \sigma_w 12/2M_{s1}h_1, \sigma_w 13/2M_{s1}h_1$ $H_{c2} > \sigma_w 12/2M_{s2}h_2$ $H_{c3} < \sigma_w 13/2M_{s3}h_3$ Room Temperature $< T_{comp1} < T_{c1}$ $T_{comp3} < T_{comp1}$ $H_{c1}(RT) - \sigma_w 12(RT)/2M_{s1}(RT)h_1$ (at room temperature) $> H_{c1}(R) - \sigma_w 12(R)/2M_{s1}(R)h_1$ (upon reading)

$T_{c1} > T_{c2}, T_{c3}$ where $H_{c1}$, $H_{c2}$, and $H_{c3}$ are respectively the coercive forces of the first, second, and third magnetic layers; $T_{c1}$, $T_{c2}$, and $T_{c3}$, are the Curie temperatures of the first, second, and third magnetic layers; $h_1$, $h_2$, and $h_3$, are the film thicknesses of the first, second, and third magnetic layers; $T_{comp1}$ and $T_{comp3}$, are the compensation temperatures of the first and third magnetic layers; and $\sigma_w 12$ and $\sigma_w 13$, are the interface magnetic wall energies between the first and second magnetic layers and between the first and third magnetic layers. $H_{c1}(RT)$ and $M_{s1}(RT)$ respectively represent the coercive force and saturation magnetization of the first magnetic layer at room temperature. $H_{c1}(R)$ and $M_{s1}(R)$ respectively represent the coercive force and saturation magnetization of the first magnetic layer at a temperature upon reading. $\sigma_w 12(RT)$ and $\sigma_w 12(R)$ represent the interface magnetic wall energies between the first and second magnetic layers at the room temperature and at a temperature upon reading, respectively. Each of the first, second, and third magnetic layers 32, 33, and 34 comprises a perpendicular magnetic film consisting of an amorphous alloy of a rare earth element (Tb, Dy, Gd, Nd, Ho, or the like) and an iron-group transition metal (Fe, Co, Ni, or the like), and an exchange-coupling force acts between each two adjacent layers. As the substrate 31, known materials such as glass, a glass member with a guide track consisting of an ultraviolet setting resin, polycarbonate, polymethyl methacrylate, an epoxy-based resin, and the like can be used without any limitations. As another example of the layer structure of the magnetooptical recording medium used in the present invention, a medium constituted by laminating a guide track layer 35, a protective layer 36, a third magnetic layer 34, a first magnetic layer 32, a second magnetic layer 33, another protective layer 36, and a reflective layer 37 in turn on a substrate 31 may be used. Furthermore, an intermediate layer having a function of adjusting the exchange-coupling force may be formed between the magnetic layers, and a magnetic layer for adding another function may be formed (e.g., a magnetic layer having a high Curie temperature and a large magnetooptical effect may be formed on the side of the substrate 31 with respect to the third magnetic layer 34).

Moreover, two media each having the above-mentioned structure may be adhered to each other to constitute a double-sided recordable medium. A difference between this embodiment and the above-mentioned sixth embodiment is that the third magnetic layer has a larger coercive force than that of the first magnetic layer at room temperature, and has a lower compensation temperature than that of the first magnetic layer ($T_{comp3} < T_{comp1}$).

The effect of this embodiment will be described below with reference to FIG. 38.

Figure 38:
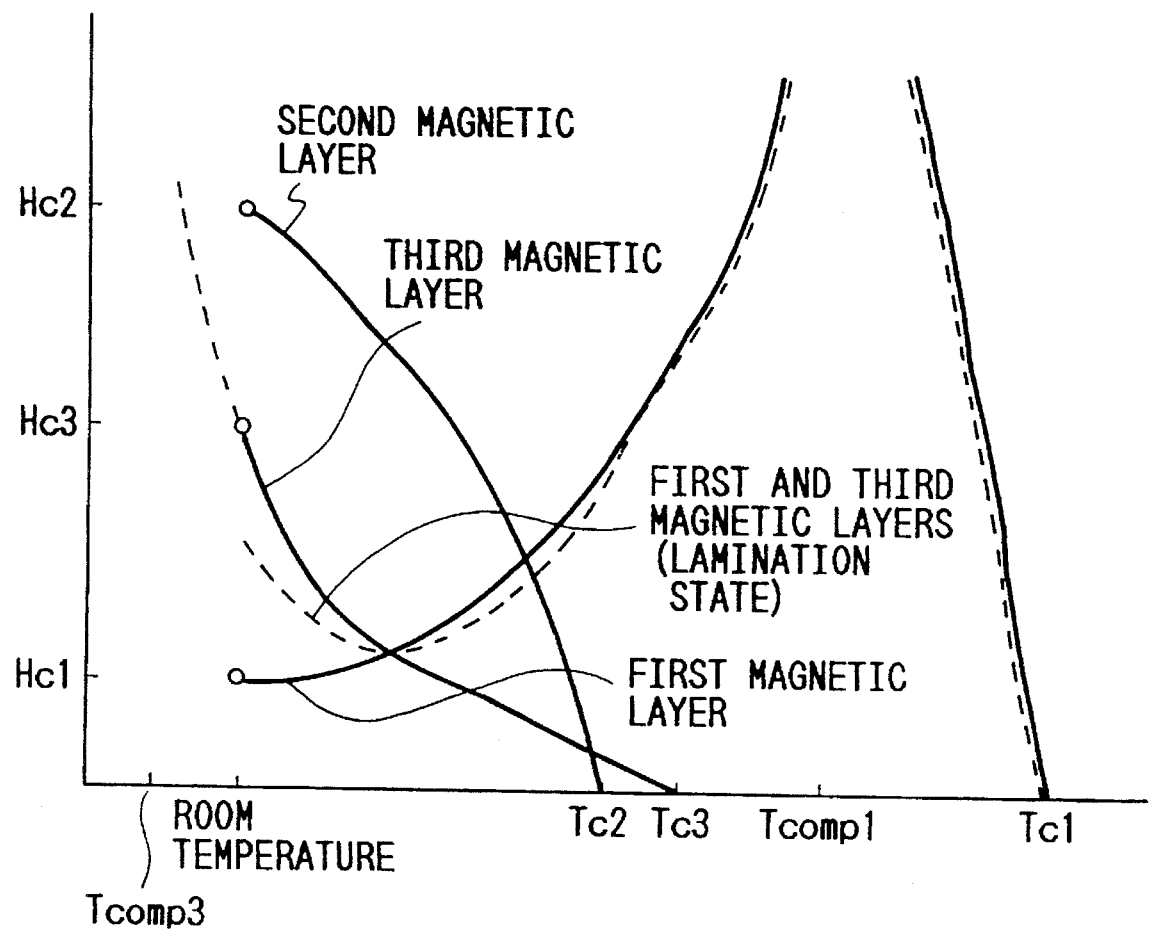
FIG. 38 is a graph showing the change in coercive force of magnetic layers upon a change in temperature according to the seventh embodiment of the present invention.

FIG. 38 shows changes in coercive force of the respective magnetic layers. Since the first and third magnetic layers are strongly exchange-coupled to each other (the bias magnetic field based on exchange-coupling is larger than the difference between the coercive forces of the two layers), the directions of magnetization of the two layers are simultaneously reversed in measurement of a magnetization curve.

In FIG. 38, solid curves represent the measurement results of single-layered film samples of the first, second, and third magnetic layers. Also, a dotted curve represents the measurement result of a lamination state of the third and first magnetic layers. As can be seen from FIG. 38, in the case of the first magnetic layer alone, its coercive force $H_{c1}$ increases up to the compensation temperature $T_{comp1}$, and the strength of the bias magnetic field $\sigma_w 12(t)/2M_{s1}(t)h_1$ by the exchange-coupling force between the first and second magnetic layers decreases to become zero at the Curie temperature of the second magnetic layer. For this reason, it is difficult to consider that the margin $H_{c1}(t) - \sigma_w 12(t)/2M_{s1}(t)h_1$ for the stable presence of a magnetic wall decreases upon an increase in temperature if the temperature distribution in the reproduction beam spot is not taken into consideration. Contrary to this, in a laminated system of the third and first magnetic layers indicated by the dotted curve, the coercive force and magnetization of the third magnetic layer abruptly decrease by the temperature rise from room temperature. The apparent coercive force indicated by the dotted curve is $H_{c1}(t) + \sigma_w 13(t)/2M_{s1}(t)h_1$, and exhibits a larger value than $H_{c1}(t)$ by a bias based on the exchange-coupling force. However, $H_{c3}(t)$ abruptly increases by a temperature rise, and the coercive force of the laminated system indicated by the dotted curve assumes a minimal value, as shown in FIG. 31. Then, the coercive force approaches the value $H_{c1}(t)$. In this case, the margin $H_{c1}(t) - \sigma_w 12(t)/2M_{s1}(t)h_1$ for the stable presence of a magnetic wall assumes a minimal value at a temperature tmin at which the coercive force of the laminated system indicated by the dotted curve becomes minimal. For this reason, a read magnetic field upon magnetic super-resolution reproduction is set to satisfy $Hb > H_{c1}(tmin) - \sigma_w 12(tmin)/2M_{s1}(tmin)h_1$, so that the margin assumes a negative value (to transfer a pit formed in the second magnetic layer to the first magnetic layer) at this temperature. The magnetization state during recording is the same as that in the fifth embodiment shown in FIG. 31 or 33. The magnetic super-resolution reproduction of a recording pit is the same as that in the fifth embodiment shown in FIGS. 36A and 36B. As described above, overwrite recording and magnetic super-resolution reproduction can be realized under a predetermined condition and method using the recording medium having the first, second, and third magnetic layers of the present invention.

[Experimental Example 7]

An experimental example of the present invention will be described in detail below.

A 60-nm thick dielectric protective film consisting of $Si_3N_4$ was formed by a sputtering method on a polycarbonate substrate having a thickness of 1.2 mm and a diameter of 130 mm, and a 10-nm thick third magnetic layer consisting of $Gd_{25}Fe_{60}Co_{15}$ (at %) was formed on the protective film. A 25-nm thick first magnetic layer consisting of $Gd_{20}Dy_5Fe_{70}Co_5$ (at %) was formed on the third magnetic layer, and a 20-nm thick second magnetic layer consisting of $Dy_{12}Tb_{10}Fe_{70}Co_8$ (at %) was formed on the first magnetic layer. Furthermore, a 40-nm Al heat sink layer was formed on the second magnetic layer, and a 60-nm thick dielectric protective film consisting of $Si_3N_4$ was formed on the heat sink layer, thus obtaining a magnetooptical recording medium.

The characteristics and the like of this medium are as follows.

Coercive force ($H_{c1}$) of first magnetic layer: 500 Oe

Curie temperature ($T_{c1}$) of first magnetic layer: 230° C.

Saturation magnetization ($M_{s1}$) of first magnetic layer: 220 emu/cc

Film thickness ($h_1$) of first magnetic layer: 25 nm

Compensation temperature ($T_{comp1}$) of first magnetic layer: 180° C.

Coercive force ($H_{c2}$) of second magnetic layer: 15,000 Oe

Curie temperature ($T_{c2}$) of second magnetic layer: 160° C.

Saturation magnetization ($M_{s2}$) of second magnetic layer: 40 emu/cc

Film thickness ($h_2$) of second magnetic layer: 20 nm

Coercive force ($H_{c3}$) of third magnetic layer: 8,000 Oe

Curie temperature ($T_{c3}$) of third magnetic layer: 165° C.

Saturation magnetization ($M_{s3}$) of third magnetic layer: 10 emu/cc

Compensation temperature ($T_{comp3}$) of third magnetic layer: 10° C.

Film thickness ($h_3$) of third magnetic layer: 10 nm

Interface magnetic wall energy ($\sigma_w 13$) between third and first magnetic layers: 2.0 erg/cm$^2$ Interface magnetic wall energy ($\sigma_w 12$) between first and second magnetic layers: 2.2 erg/cm$^2$ This magnetooptical recording medium was rotated at 1,800 rpm, and recording was performed at a radial position of 35 mm by binary recording power (Pb: 5 mW, Pa: 12 mW) using a laser having a wavelength of 780 nm while applying a magnetic field of 200 Oe upward. Note that the strength of the external magnetic field for magnetizing (initializing) the third and first magnetic layers upward was 2 kOe.

Note that the apparent coercive force of the laminated film of the third and first magnetic layers was about 1 kOe (this value is almost equal to $H_{c1}$(500 Oe)+$\sigma_w 13/2M_{s1}h_1$(400 Oe)).

Also, a bias based on the exchange-coupling force from the interface of the second magnetic layer with the laminated film of the third and first magnetic layers was about 300 Oe (this value is almost equal to $\sigma_w 12/(2M_{s1}h_1+2M_{s3}h_3)$).

Upon recording, the frequency of a recording signal was changed from 1.8 MHz to 7.4 MHz. Upon reproduction of a recorded signal, the reproduction beam output was changed from 1 mW to 3 mW. At the same time, in the reproduction beam spot, a magnetic field was applied downward while its strength was changed from 0 to 500 Oe.

As a result, high reproduced signal quality with a C/N ratio of 40 dB or higher could be obtained for, e.g., a recorded signal of 7.4 MHz (mark length of about 0.4 µm) over wide ranges of the applied magnetic field.

When the same recording/reproduction experiments were conducted for a sample disk which was prepared following substantially the same procedures as above, except that no third magnetic layer was formed and the first magnetic layer was formed to have a thickness of 50 nm, a high reproduction C/N ratio was obtained from narrow ranges of the applied magnetic field (150 Oe) and the reproduction power (1.0 to 2.0 mW).

What is claimed is:

1. A method of recording information on a magnetooptical recording medium, which is constituted by laminating at least a first magnetic layer and a second magnetic layer in an order named on a substrate which has transparency and on which receiving a laser beam is incident, and which satisfies the following relations (1) to (4):

$$H_{c2} > H_{c1} \quad (1)$$

$$H_{c2} > \sigma_w 12/2M_{s2}h_2 \quad (2)$$

$$H_{c1} > \sigma_w 12/2M_{s1}h_1 \quad (3)$$

$$T_{comp1} < T_{c1} \quad (4)$$

(where $H_{c1}$ and $H_{c2}$ are respectively the coercive forces of the first and second magnetic layers; $T_{c1}$ and $T_{c2}$ are respectively the Curie temperatures of the first and second magnetic layers; $M_{s1}$ and $M_{s2}$ are respectively saturation magnetizations of the first and second magnetic layers; $h_1$ and $h_2$ are respectively the film thicknesses of the first and second magnetic layers; $T_{comp1}$ is the compensation temperature of the first magnetic layer; and $\sigma_w 12$ is the interface magnetic wall energy between the first and second magnetic layers, said method comprising:

the step of aligning a direction of a magnetic moment of the first magnetic layer in one direction by an external magnetic field;

the step of irradiating a laser spot of low power while applying a recording bias magnetic field in the same direction as the direction of the external magnetic field so as to form a first recording bit only in a high-temperature region in the laser spot;

the step of irradiating a laser spot of high power while applying the recording bias magnetic field so as to form a second recording bit, in which a magnetic wall is present between the first and second magnetic layers, only in the high-temperature region in the laser spot; and the step of selecting one of the first recording bit forming step and the second recording bit forming step in correspondence with information.

2. A method according to claim 1, wherein the high-temperature region in the laser spot is a partial region in the laser spot.

3. A method according to claim 1, wherein the first magnetic layer is an in-plane magnetic film at room temperature, and becomes a perpendicular magnetic film when a temperature rises.

4. A method according to claim 1, wherein each of the first and second magnetic layers consists of a rare earth-transition metal element amorphous alloy, a sublattice magnetization of the first magnetic layer is rare earth element-dominant, and the first magnetic layer has a composition gradient in a direction of film thickness, such that a ratio of a transition metal element increases at a side near the substrate.

5. A method according to claim 1, wherein a third magnetic layer is formed between the first magnetic layer and the substrate.

6. A method according to claim 5, wherein said medium further satisfies the following conditions:

$$H_{c3} > H_{c1} \quad (5)$$

$$H_{c1} > \sigma_w 13/2M_{s1}h_1 \quad (6)$$

$$H_{c3} < \sigma_w 13/2M_{s3}h_3 \quad (7)$$

$$T_{c1} > T_{c2}, T_{c3} \quad (8)$$

$$H_{c1}(RT) - \sigma_w 12(RT)/2M_{s1}(RT)h_1 \text{ (at room temperature)} > H_{c1}(R) - \sigma_w 12(R)/2M_{s1}(R)h_1 \text{ (upon reading)} \quad (9)$$

where $H_{c3}$ is the coercive force of the third magnetic layer; $\sigma_w 13$ is the interface magnetic wall energy between the first and third magnetic layers; $M_{s3}$ is the saturation magnetization of the third magnetic layer; $h_3$ is the film thickness of the third magnetic layer; and $T_{c1}$, $T_{c2}$ and $T_{c3}$ are the Curie temperatures of the first, second, third magnetic layers, $H_{c1}(RT)$ and $M_{s1}(RT)$ are the coercive force and saturation magnetization of the first magnetic layer at room temperature; respectively; $H_{c1}(R)$ and $M_{s1}(R)$ are respectively the coercive force and saturation magnetization of the first magnetic layer at a temperature upon reading; and $\sigma_w 12(RT)$ and $\sigma_w 12(R)$ are the interface magnetic wall energies between the first and second magnetic layers at the room temperature and at a temperature upon reading, respectively.

7. A method according to claim 5, wherein said medium further satisfies the following conditions:

$$H_{c3} > H_{c1} \tag{5}$$

$$H_{c1} > \sigma_w 13/2M_{s1}h_1 \tag{6}$$

$$H_{c3} < \sigma_w 13/2M_{s3}h_3 \tag{7}$$

$$T_{c1} > T_{c2}, T_{c3} \tag{8}$$

$$H_{c1}(RT) - \sigma_w 12(RT)/2M_{s1}(RT)h_1 \text{ (at room temperature)} > H_{c1}(R) - \sigma_w 12(R)/2M_{s1}(R)h_1 \text{ (upon reading)} \tag{9}$$

$$T_{comp3} < T_{comp1} \tag{10}$$

where $T_{comp3}$ is the compensation temperature of the third magnetic layer, $H_{c3}$ is the coercive force of the third magnetic layer; $\sigma_w 13$ is the interface magnetic wall energy between the first and third magnetic layers; $M_{s3}$ is the saturation magnetization of the third magnetic layer; $h_3$ is the film thickness of the third magnetic layer; and $T_{c1}$, $T_{c2}$, and $T_{c3}$ are the Curie temperatures of the first, second, third magnetic layers; $H_{c1}$ (RT) and $M_{s1}$ (RT) are the coercive force and saturation magnetization of the first magnetic layer at room temperature, respectively, $H_{c1}$ (R) and $M_{s1}$ (R) are respectively the coercive force and saturation magnetization of the first magnetic layer at a temperature upon reading; and $\sigma_w 12$ (RT) and $\sigma_w 12$ (R) are the interface magnetic wall energies between the first and second magnetic layers at the room temperature and at a temperature upon reading, respectively.

8. A method of reproducing information from a magnetooptical recording medium, which is constituted by laminating at least a first magnetic layer and a second magnetic layer in an order named on a substrate having transparency, and which satisfies the following relations (1) to (4):

$$H_{c2} > H_{c1} \tag{1}$$

$$H_{c2} > \sigma_w 12/2M_{s2}h_2 \tag{2}$$

$$H_{c1} > \sigma_w 12/2M_{s1}h_1 \tag{3}$$

$$T_{comp1} < T_{c1} \tag{4}$$

where $H_{c1}$ and $H_{c2}$ are the coercive forces of the first and second magnetic layers; $T_{c1}$ and $T_{c2}$, the Curie temperatures of the first and second magnetic layers; $M_{s1}$ and $M_{s2}$, saturation magnetizations of the first and second magnetic layers; $h_1$ and $h_2$, the film thicknesses of the first and second magnetic layers; $T_{comp1}$, the compensation temperature of the first magnetic layer; and $\sigma_w 12$, the interface magnetic wall energy between the first and second magnetic layers, said method comprising:

the step of irradiating a laser spot from the transparent substrate side;

the step of applying a magnetic field in a direction opposite to a direction of a magnetic moment of the first magnetic layer so as to change the direction of the magnetic moment of the first magnetic layer only in a high-temperature region in the laser spot to a state wherein no magnetic wall is present between the first and second magnetic layers; and the step of reproducing recorded information by detecting reflected light of the laser spot.

9. A method according to claim 8, wherein the high-temperature region in the laser spot is a partial region in the laser spot.

10. A method according to claim 8, wherein the first magnetic layer is an in-plane magnetic film at room temperature, and becomes a perpendicular magnetic film when a temperature rises.

11. A method according to claim 8, wherein each of the first and second magnetic layers consists of a rare earth-transition metal element amorphous alloy, a sublattice magnetization of the first magnetic layer is rare earth element-dominant, and the first magnetic layer has a composition gradient in a direction of film thickness, such that a ratio of a transition metal element increases at a side near the substrate.

12. A method according to claim 8, wherein a third magnetic layer is formed between the first magnetic layer and the substrate.

13. A method according to claim 12, wherein said medium further satisfies the following conditions:

$$H_{c3} > H_{c1} \tag{5}$$

$$H_{c1} > \sigma_w 13/2M_{s1}h_1 \tag{6}$$

$$H_{c3} < \sigma_w 13/2M_{s3}h_3 \tag{7}$$

$$T_{c1} > T_{c2}, T_{c3} \tag{8}$$

$$H_{c1}(RT) - \sigma_w 12(RT)/2M_{s1}(RT)h_1 \text{ (at room temperature)} > H_{c1}(R) - \sigma_w 12(R)/2M_{s1}(R)h_1 \text{ (upon reading)} \tag{9}$$

where $H_{c3}$ is the coercive force of the third magnetic layer; $\sigma_w 13$ is the interface magnetic wall energy between the first and third magnetic layers; $M_{s3}$ is the saturation magnetization of the third magnetic layer; $h_3$ is the film thickness of the third magnetic layer; and $T_{c1}$, $T_{c2}$ and $T_{c3}$ are the Curie temperatures of the first, second, and third magnetic layers; $H_{c1}(RT)$ and $M_{s1}(RT)$ are the coercive force and saturation magnetization of the first magnetic layer at room temperature, respectively; $H_{c1}(R)$ and $M_{s1}(R)$ are respectively the coercive force and saturation magnetization of the first magnetic layer at a temperature upon reading; and $\sigma_w 12(RT)$ and $\sigma_w 12(R)$ are the interface magnetic wall energies between the first and second magnetic layers at the room temperature and at a temperature upon reading, respectively.

14. A method according to claim 12, wherein said medium further satisfies the following conditions:

$$H_{c3} > H_{c1} \tag{5}$$

$$H_{c1} > \sigma_w 13/2M_{s1}h_1 \tag{6}$$

$$H_{c3} < \sigma_w 13/2M_{s3}h_3 \tag{7}$$

$$T_{c1} > T_{c2}, T_{c3} \tag{8}$$

$$H_{c1}(RT) - \sigma_w 12(RT)/2M_{s1}(RT)h_1 \text{ (at room temperature)} > H_{c1}(R) - \sigma_w 12(R)/2M_{s1}(R)h_1 \text{ (upon reading)} \tag{9}$$

$$T_{comp3} < T_{comp1} \tag{10}$$

where $T_{comp3}$ is the compensation temperature of the third magnetic layer; $H_{c3}$ is the coercive force of the third magnetic layer; $\sigma_w 13$ is the interface magnetic wall energy between the first and third magnetic layers; $M_{s3}$ is the saturation magnetization of the third magnetic layer; $h_3$ is the film thickness of the third magnetic layer; and $T_{c1}$, $T_{c2}$ and $T_{c3}$ are the Curie temperatures of the first, second, and third magnetic layers; $H_{c1}(RT)$ and $M_{s1}(RT)$ are the coercive force and saturation magnetization of the first magnetic layer at room temperature, respectively; $H_{c1}(R)$ and $M_{s1}(R)$ are respectively the coercive force and saturation magnetization of the first magnetic layer at a temperature upon reading; and $\sigma_w 12(RT)$ and $\sigma_w 12(R)$ are the interface magnetic wall energies between the first and second magnetic layers at the room temperature and at a temperature upon reading, respectively.

15. A magnetooptical recording medium in which at least a first magnetic layer and a second magnetic layer each consisting of a rare earth-transition metal alloy are laminated in an order named on a substrate having transparency, and which satisfies the following conditions (1) and (2) and relations (3) to (8):

(1) a sublattice magnetization of the first magnetic layer is rare earth element-dominant (2) a composition of the first magnetic layer has a gradient in a direction of film thickness, such that a transition metal composition increases at a side near the substrate $$H_{c2} > H_{c1} \tag{3}$$

$$H_{c2} > \sigma_w/2M_{s2}h_2 \tag{4}$$

$$H_{c1} > \sigma_w/2M_{s1}h_1 \tag{5}$$

$$\text{Room Temperature} < T_{comp1} < T_{c1} \tag{6}$$

$$T_{c2} < T_{c1} \tag{7}$$

$$H_{c1}(RT) - \sigma_w(RT)/2M_{s1}(RT)h_1 \text{ (at room temperature) } [<T_{c1}]$$
$$> H_{c1}(R) - \sigma_w(R)/2M_{s1}(R)h_1 \text{ (upon reproduction)}$$

where $H_{c1}$ and $H_{c2}$ are respectively the coercive forces of the first and second magnetic layers; $T_{c1}$ and $T_{c2}$ are the Curie temperatures of the first and second magnetic layers, respectively; $h_1$ and $h_2$ are the film thicknesses of the first and second magnetic layers, respectively; $T_{comp1}$ is the compensation temperature of the first magnetic layer; and $\sigma_w$ is the interface magnetic wall energy between the first and second magnetic layers.

16. A magnetooptical recording medium in which at least a third magnetic layer, a first magnetic layer, and a second magnetic layer are laminated in an order named on a substrate having transparency, and which satisfies the following relations (1) to (8):

$$H_{c2} > H_{c1} \tag{1}$$

$$H_{c3} > H_{c1} \tag{2}$$

$$H_{c1} > \sigma_w 12/2M_{s1}h_1, \sigma_w 13/2M_{s1}h_1 \tag{3}$$

$$H_{c2} > \sigma_w 12/2M_{s2}h_2 \tag{4}$$

$$H_{c3} < \sigma_w 13/2M_{s3}h_3 \tag{5}$$

$$\text{Room Temperature} < T_{comp1} < T_{c1} \tag{6}$$

$$H_{c1}(RT) - \sigma_w 12(RT)/2M_{s1}(RT)h_1 \text{ (at room temperature)} > H_{c1}(R) - \sigma_w 12(R)/2M_{s1}(R)h_1 \tag{7}$$

$$T_{c1} > T_{c2}, T_{c3} \tag{8}$$

where $H_{c1}$, $H_{c2}$, and $H_{c3}$ are respectively the coercive forces of the first, second, and third magnetic layers; $T_{c1}$, $T_{c2}$, and $T_{c3}$ are the Curie temperatures of the first, second, and third magnetic layers, respectively; $h_1$, $h_2$, and $h_3$ are respectively the film thicknesses of the first, second, and third magnetic layers; $T_{comp1}$ is the compensation temperature of the first magnetic layer; and $\sigma_w 12$ and $\sigma_w 13$ are respectively the interface magnetic wall energies between the first and second magnetic layers and between the first and third magnetic layers; $H_{c1}(RT)$ and $M_{s1}(RT)$ are respectively the coercive force and saturation magnetization of the first magnetic layer at room temperature; $H_{c1}(R)$ and $M_{s1}(R)$ are respectively the coercive force and saturation magnetization of the first magnetic layer at a temperature upon reproduction; and $\sigma_w 12(RT)$ and $\sigma_w 12(R)$ represent the interface magnetic wall energies between the first and second magnetic layers at the room temperature and at a temperature upon reproduction, respectively.

17. A magnetooptical recording medium in which at least a third magnetic layer, a first magnetic layer, and a second magnetic layer are laminated in an order named on a substrate having transparency, and which satisfies the following relations (1) to (9):

$$H_{c2} > H_{c1} \tag{1}$$

$$H_{c3} > H_{c1} \tag{2}$$

$$H_{c1} > \sigma_w 12/2M_{s1}h_1, \sigma_w 13/2M_{s1}h_1 \tag{3}$$

$$H_{c2} > \sigma_w 12/2M_{s2}h_2 \tag{4}$$

$$H_{c3} < \sigma_w 13/2M_{s3}h_3 \tag{5}$$

$$\text{Room Temperature} < T_{comp1} < T_{c1} \tag{6}$$

$$T_{comp3} < T_{comp1} \tag{7}$$

$$H_{c1}(RT) - \sigma_w 12(RT)/2M_{s1}(RT)h_1 \text{ (at room temperature)} > H_{c1}(R) - \sigma_w 12(R)/2M_{s1}(R)h_1 \tag{8}$$

$$T_{c1} > T_{c2}, T_{c3} \tag{9}$$

where $H_{c1}$, $H_{c2}$, and $H_{c3}$ are respectively the coercive forces of the first, second, and third magnetic layers; $T_{c1}$, $T_{c2}$, and $T_{c3}$ are respectively the Curie temperatures of the first, second, and third magnetic layers; $h_1$, $h_2$, and $h_3$ are respectively the film thicknesses of the first, second, and third magnetic layers; $T_{comp1}$ and $T_{comp3}$ are respectively the compensation temperatures of the first and third magnetic layers; and $\sigma_w 12$ and $\sigma_w 13$ are respectively the interface magnetic wall energies between the first and second magnetic layers and between the first and third magnetic layers, $H_{c1}(RT)$ and $M_{s1}(RT)$ are respectively the coercive force and saturation magnetization of the first magnetic layer at room temperature; $H_{c1}(R)$ and $M_{s1}(R)$ are respectively the coercive force and saturation magnetization of the first magnetic layer at a temperature upon reading; and $\sigma_w 12(RT)$ and $\sigma_w 12(R)$ represent the interface magnetic wall energies between the first and second magnetic layers at the room temperature and at a temperature upon reading, respectively.

18. A magnetooptical recording medium which is constituted by laminating at least two magnetic layers on a transparent substrate, wherein a first magnetic layer, exhibiting in-plane magnetic anisotropy at room temperature and exhibiting perpendicular magnetic anisotropy at raised temperatures, and a second magnetic layer exhibiting perpendicular magnetic anisotropy, are laminated in an order named on the substrate, and the first and second magnetic layers satisfy the following relations (I) to (IV):

$$H_{c2} > H_{c1} \quad (I)$$

$$H_{c2} > \sigma_w/(2M_{s2} \cdot h_2) \quad (II)$$

$$H_{c1} > \sigma_w/(2M_{s1} \cdot h_1) \quad (III)$$

$$RT < T_{comp1} < T_{c1} \quad (IV)$$

where $H_{c1}$ is the coercive force of the first magnetic layer; $T_{c1}$ is the Curie temperature of the first magnetic layer; $T_{comp1}$ is the compensation temperature of the first magnetic layer; $M_{s1}$ is the saturation magnetization of the first magnetic layer; $h_1$ is the film thickness of the first magnetic layer; $H_{c2}$ is the coercive force of the second magnetic layer; $T_{c2}$ is the Curie temperature of the second magnetic layer; $M_{s2}$ is the saturation magnetization of the second magnetic layer; $h_2$ is the film thickness of the second magnetic layer; $\sigma_w$ is the interface magnetic wall energy between the first and second magnetic layers; and RT is room temperature.

19. A method of reproducing, from a magnetooptical recording medium which is constituted by laminating at least a first magnetic layer and a second magnetic layer in turn on a substrate, and which satisfies the following conditions:

$$H_{c2} > H_{c1} \quad (1)$$

$$H_{c2} > \sigma_w/(2M_{s2}h_2) \quad (2)$$

$$H_{c1} > \sigma_w/(2M_{s1}h_1) \quad (3)$$

$$T_r < T_{comp1} < T_{c1} \quad (4)$$

where $H_{c1}$ and $H_{c2}$ are respectively the coercive forces of the first and second magnetic layers; $\sigma_w$ is the interface magnetic wall energy between the first and second magnetic layers; $M_{s1}$ and $M_{s2}$ are respectively the saturation magnetizations of the first and second magnetic layers; $h_1$ and $h_2$ are respectively the film thicknesses of the first and second magnetic layers; $T_r$ is room temperature; $T_{comp1}$ is the compensation temperature of the first magnetic layer; and $T_{c1}$ is the Curie temperature of the first magnetic layer, binary information which is recorded by selectively executing:

(1) the step of aligning a direction of a magnetic moment of the first magnetic layer in one direction by an external magnetic field, and thereafter, irradiating a laser spot of low power while applying a recording bias magnetic field in the same direction as the direction of the external magnetic field so as to form a state, wherein no interface magnetic wall is present between the first and second magnetic layers, only in a portion of the laser spot; and (2) the step of aligning a direction of a magnetic moment of the first magnetic layer in one direction by an external magnetic field, and thereafter, irradiating a laser spot of high power while applying a recording bias magnetic field in the same direction as the direction of the external magnetic field so as to form a state, wherein an interface magnetic wall is present between the first and second magnetic layers, only in a portion of the laser spot, by applying a reproduction magnetic field while irradiating a laser spot of power lower than the low power to transfer recorded information in the second magnetic layer to a portion of the first magnetic layer corresponding to a portion in the laser spot, thereby reproducing the recorded information, said method comprising:

the steps of, prior to reproduction of the recorded information, recording a pit string including at least a shortest mark pit corresponding to recording information at a predetermined position of the magnetooptical recording medium, reproducing the pit string while changing the reproduction magnetic field and reproduction laser power, and determining an optimal combination of the reproduction magnetic field and reproduction laser power by detecting the reproduced signal.

20. A method according to claim 19, wherein the determination step includes the step of detecting an amplitude of the reproduced signal and determining a combination of the reproduction magnetic field and reproduction laser power, which combination corresponds to a maximal modulation factor of the amplitude of the reproduction signal.

21. A method according to claim 19, wherein the determination step includes the step of determining a combination of the reproduction magnetic field and reproduction laser power in correspondence with an inner temperature of a recording/reproduction apparatus and a radial position on the recording medium.

22. A method according to claim 19, wherein the determination step includes the step of determining a combination of the reproduction magnetic field and reproduction laser power, which combination can reduce jitter of the reproduced signal to a predetermined value or less.

23. A method according to claim 19, further comprising:

the step of recording the optimal combination of the reproduction magnetic field and reproduction laser power determined in the determination step in the medium as data; and the step of reading out the data from the medium upon reproduction, and adjusting the reproduction magnetic field and reproduction laser power on the basis of the readout data.

* * * * *

UNITED STATES PATENT AND TRADEMARK OFFICE
CERTIFICATE OF CORRECTION

PATENT NO. : 5,596,555  
DATED : January 21, 1997  
INVENTOR(S) : YOICHI OSATO, ET AL.

Page 1 of 4

It is certified that error appears in the above-indentified patent and that said Letters Patent is hereby corrected as shown below:

ON THE COVER PAGE:

References Cited

[56] FOREIGN PATENT DOCUMENTS

Insert:

| | | |
|---|---|---|
| --376680 | 7/1990 | European Pat |
| 509836 | 10/1992 | European Pat |
| 524315 | 1/1993 | European Pat |
| 549138 | 6/1993 | European Pat -- . |

COLUMN 3

Line 67, "$\sigma_w 12(R)/2M_{s1}(R)h_1,$" should read --$\sigma_w 12(R)/2M_{s1}(R)h_1$, and--.

COLUMN 4

Line 1, "are" should be deleted.  
Line 4, "$T_{C3}$," should read --$T_{C3}$, are--.  
Line 37, "is" should be deleted.

COLUMN 7

Line 20, "Graph" should read --graph--.

UNITED STATES PATENT AND TRADEMARK OFFICE
CERTIFICATE OF CORRECTION

PATENT NO. : 5,596,555
DATED : January 21, 1997
INVENTOR(S) : YOICHI OSATO, ET AL.

It is certified that error appears in the above-indentified patent and that said Letters Patent is hereby corrected as shown below:

COLUMN 10

Line 2, "is irradiated" should read --irradiates the medium--.

COLUMN 14

Line 46, "is" should be deleted.

COLUMN 23

Line 15, "irradiation" should read --irradiation of--.

COLUMN 26

Line 57, in Table 2, third column, "Strenght" should read --Strength--.

Line 67, "smaller. The" should read --smaller. ¶ The--.

COLUMN 32

Line 52, "Given" should read --given--.

UNITED STATES PATENT AND TRADEMARK OFFICE
CERTIFICATE OF CORRECTION

PATENT NO. : 5,596,555
DATED : January 21, 1997
INVENTOR(S) : YOICHI OSATO, ET AL.

It is certified that error appears in the above-indentified patent and that said Letters Patent is hereby corrected as shown below:

COLUMN 34

Line 31, "$(Gd_{Dy50})_{20}$" should read --$(Gd_{50}Dy_{50})_{20}$--.

COLUMN 45

Line 1, "third magnetic layers," should read --and third magnetic layers;--.

Line 4, "ture;" should read --ture,--.

Line 25, "layer," should read --layer;--.

Line 30, "third" should read --and third--.

Line 33, "respectively," should read --respectively;--.

COLUMN 47

Line 35, "$[<T_{C1}]$" should be deleted.

UNITED STATES PATENT AND TRADEMARK OFFICE
CERTIFICATE OF CORRECTION

PATENT NO. : 5,596,555
DATED : January 21, 1997
INVENTOR(S) : YOICHI OSATO, ET AL.

It is certified that error appears in the above-indentified patent and that said Letters Patent is hereby corrected as shown below:

<u>COLUMN 48</u>

Line 37, "$\sigma_w 12(R)/2M_{s1}(R)h_1$ (8)" should read --$\sigma_w 12(R)/2M_{s1}(R)h_1$ (upon reading) (8)--.

Line 49, "layers," should read --layers;--.

Signed and Sealed this

Twelfth Day of August, 1997

Attest:

Attesting Officer

BRUCE LEHMAN

Commissioner of Patents and Trademarks